(12) United States Patent  
Sasaki

(10) Patent No.: US 6,731,460 B2  
(45) Date of Patent: May 4, 2004

(54) THIN FILM MAGNETIC HEAD, METHOD OF MANUFACTURING THE SAME AND METHOD OF FORMING MAGNETIC LAYER PATTERN

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 246 days.

(21) Appl. No.: 09/951,731

(22) Filed: Sep. 14, 2001

(65) Prior Publication Data

US 2002/0034045 A1 Mar. 21, 2002

(30) Foreign Application Priority Data

Sep. 18, 2000 (JP) .......................... 2000-281975

(51) Int. Cl.[7] .............................................. G11B 5/127
(52) U.S. Cl. ........................................................ 360/126
(58) Field of Search .......................................... 360/126

(56) References Cited

U.S. PATENT DOCUMENTS 5,438,747 A    8/1995   Krounbi et al.

6,407,892 B2 *  6/2002  Shiroishi ................... 360/317

FOREIGN PATENT DOCUMENTS

JP          7-262519      10/1995

* cited by examiner

*Primary Examiner*—A. J. Heinz  
(74) *Attorney, Agent, or Firm*—Oliff & Berridge, PLC

(57) ABSTRACT

Provided are a thin film magnetic head capable of local minimization of a pole width with high accuracy, a method of manufacturing the same, and a method of forming a magnetic layer pattern, which is capable of forming a long, narrow magnetic layer pattern with high accuracy. A precursory magnetic layer is formed so that the layer has a greater width and an edge extending in a width direction of a rear edge portion of the layer forms a straight line, and then the precursory magnetic layer is selectively etched by RIE using as a mask a top magnetic layer (a first pole front end portion) formed on the precursory magnetic layer. The use of this method allows forming a second pole front end portion having a locally minimum uniform width (e.g., 0.1 μm) and a straight edge extending in a width direction of a rear edge surface.

28 Claims, 38 Drawing Sheets

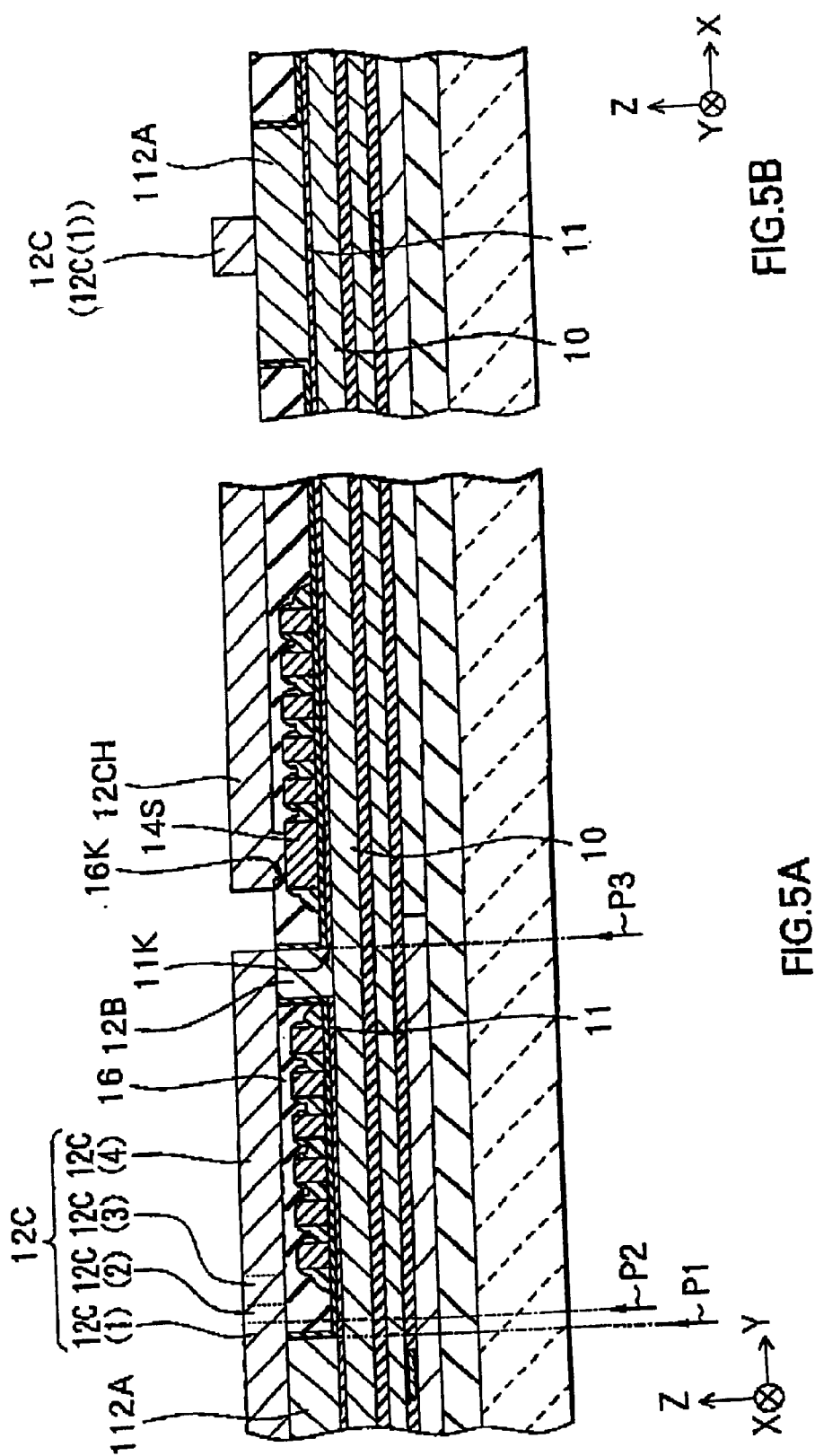

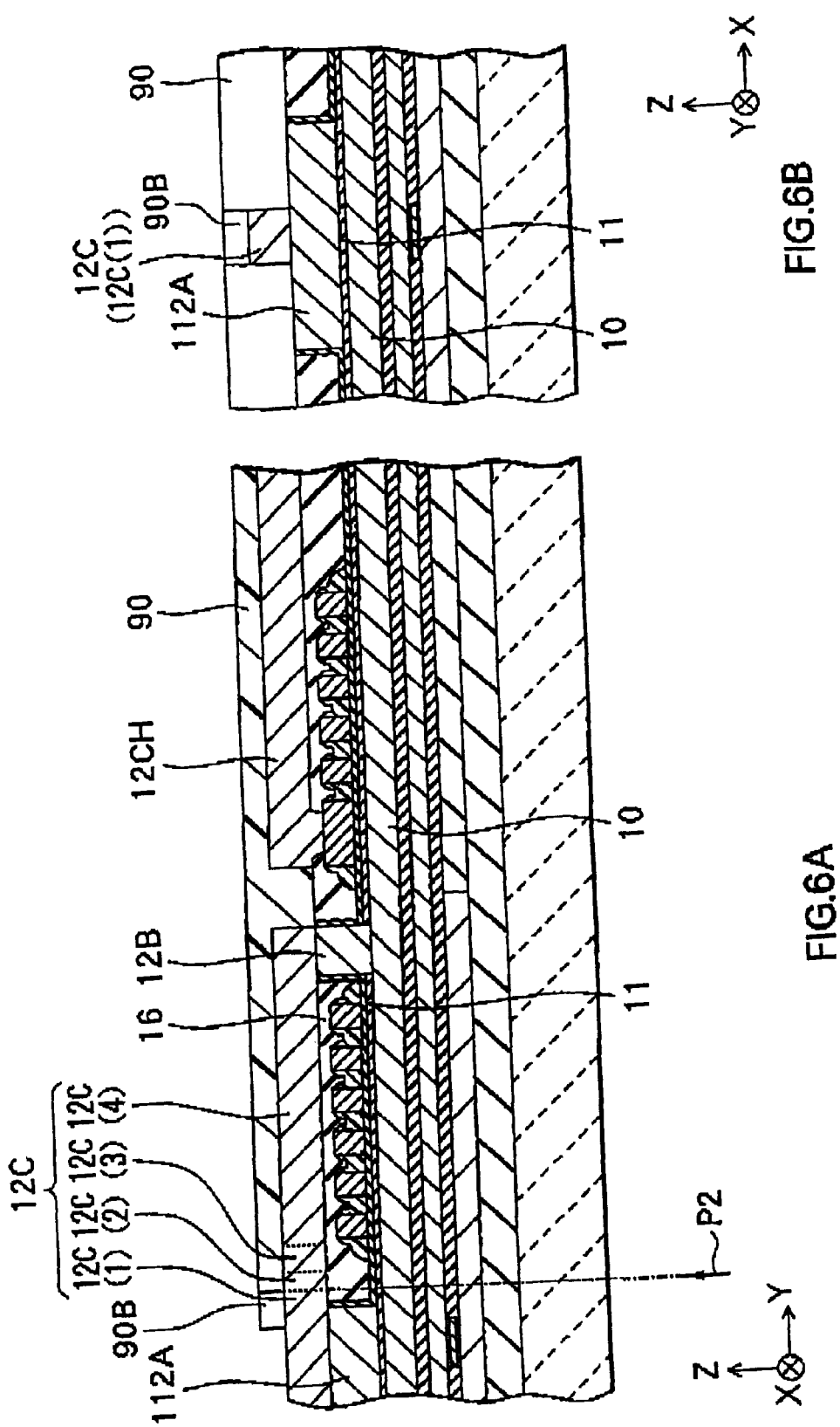

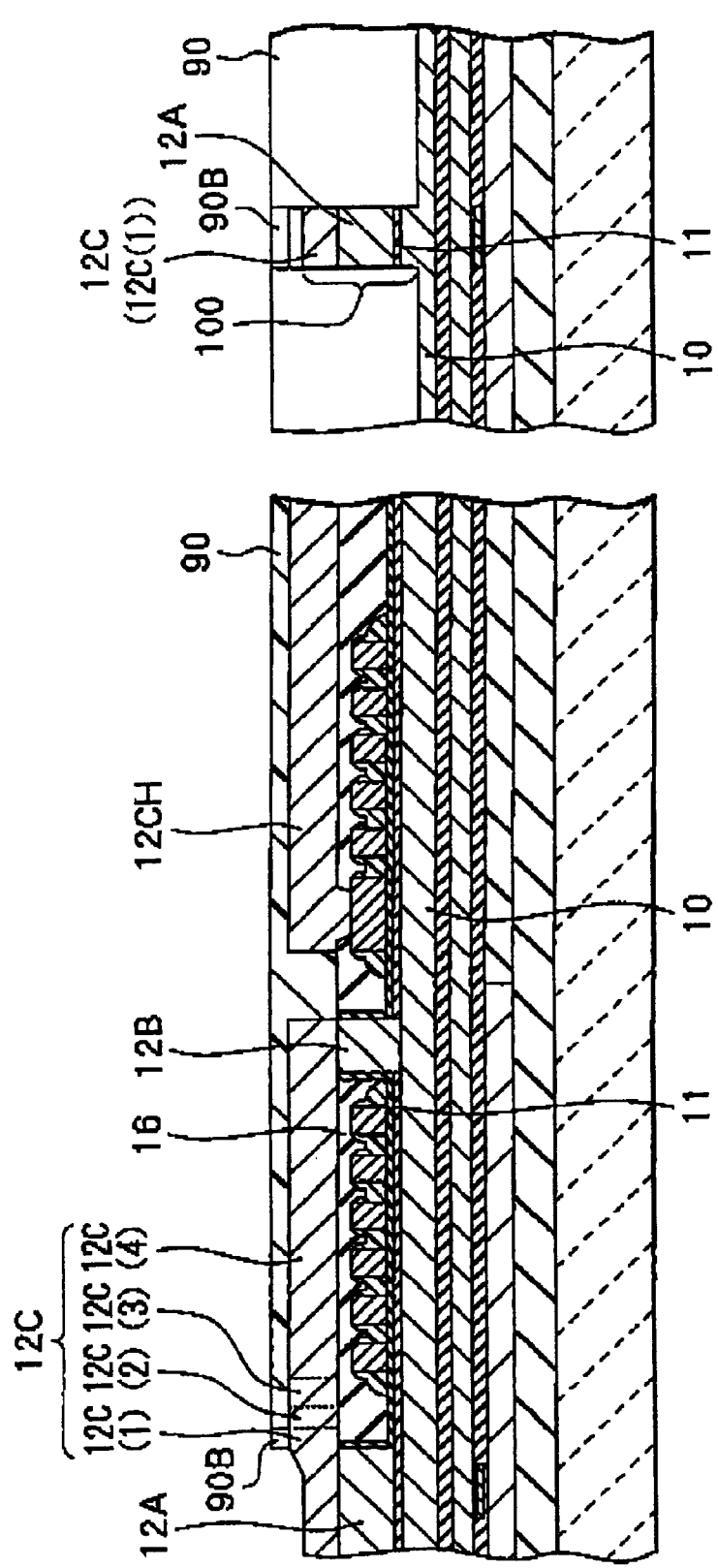
FIG. 8A
FIG. 8B

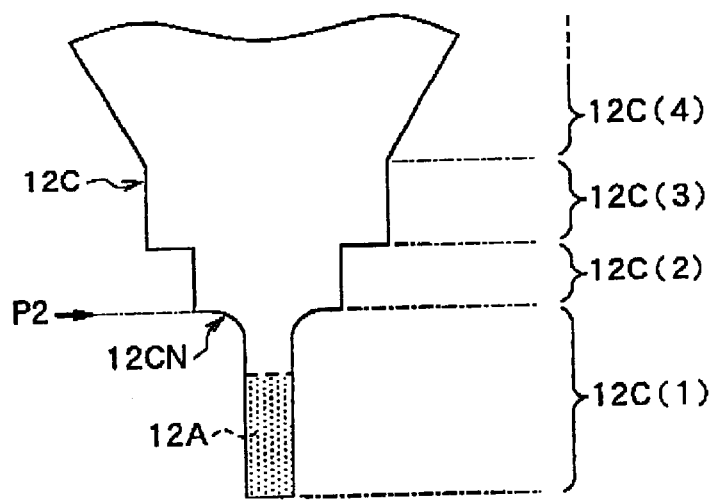
FIG.20A
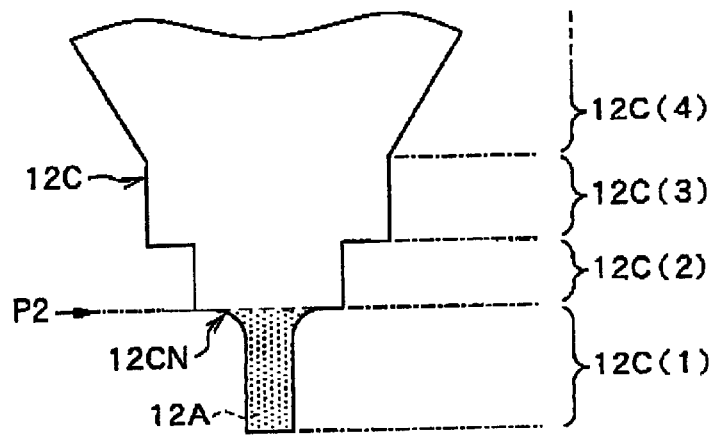
FIG.20B
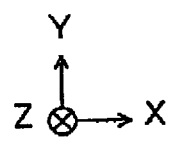

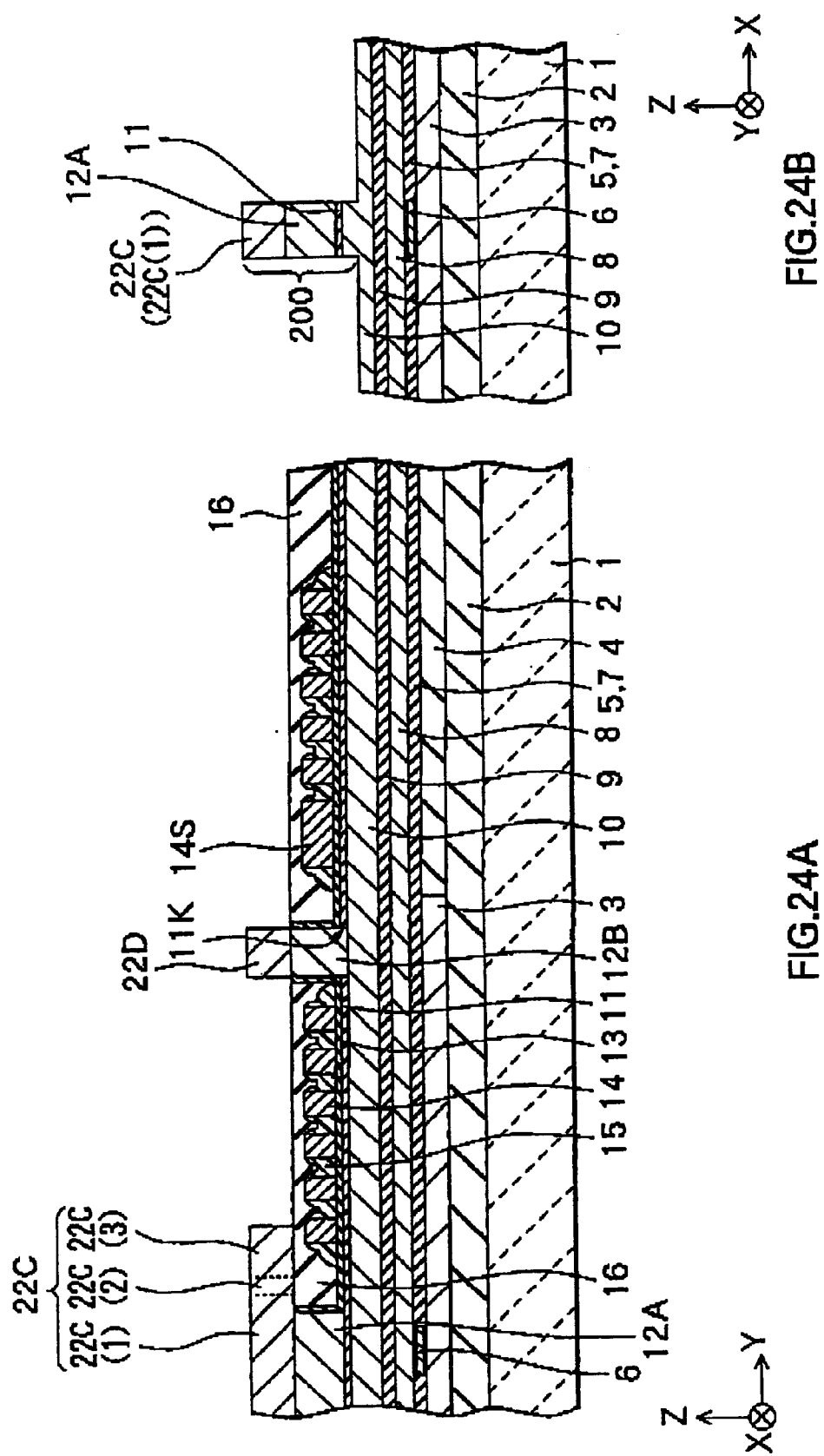

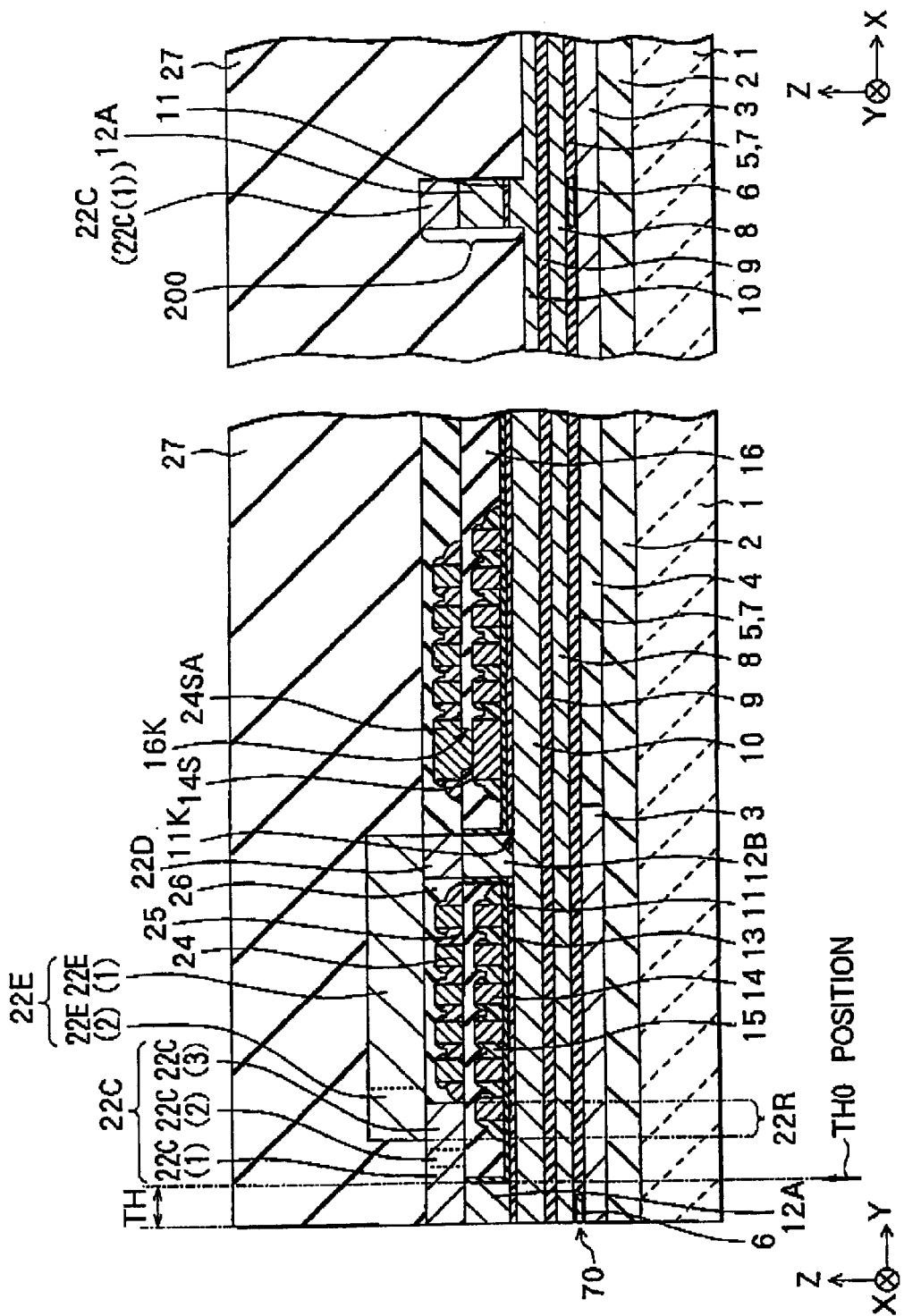

THIN FILM MAGNETIC HEAD, METHOD OF MANUFACTURING THE SAME AND METHOD OF FORMING MAGNETIC LAYER PATTERN

BACKGROUND OF THE INVENTION

1. Field of the Invention

The invention relates to a thin film magnetic head having at least an inductive magnetic transducer for writing, a method of manufacturing the same and a method of forming a magnetic layer pattern in other technical fields.

2. Description of the Related Art

Recently, an improvement in performance of a thin film magnetic head has been sought in accordance with an increase in a surface recording density of a hard disk drive. A composite thin film magnetic head, which has a stacked structure comprising a recording head having an inductive magnetic transducer for writing and a reproducing head having a magnetoresistive (hereinafter referred to as MR) element for reading, is widely used as the thin film magnetic heads.

To increase a recording density of the performance of the recording head, it is necessary to increase a track density on a magnetic recording medium. For this purpose, it is necessary to realize a recording head having a narrow track structure in which a top pole and a bottom pole, which are formed on and under a write gap therebetween, respectively, have a narrow width of from a few microns to the submicron order on an air bearing surface, and semiconductor fabrication technology is used in order to achieve the recording head having the above-mentioned structure.

The description is now given with reference to FIGS. 39 to 44 with regard to a method of manufacturing a composite thin film magnetic head as an example of a method of manufacturing a thin film magnetic head of the related art.

In the manufacturing method, first of all, as shown in FIG. 39, an insulating layer 102 made of, for example, aluminum oxide ($Al_2O_3$, hereinafter referred to as "alumina") is deposited with a thickness of about 5.0 µm to 10.0 µm on a substrate 101 made of for example, altic ($A_2O_3$—TiC). Then, a bottom shield layer 103 for a reproducing head is formed on the insulating layer 102. Then, an alumina layer, for example, is deposited with a thickness of 100 nm to 200 nm on the bottom shield layer 103 by means of sputtering, and thus a shield gap film 104 is formed. Then, an MR film 105 for constituting an MR element for reproducing is formed into a desired pattern with a thickness of a few tens of nanometers on the shield gap film 104 by means of high-accuracy photolithography. Then, lead layers (not shown) for functioning as lead electrode layers to be electrically connected to the MR film 105 are formed on both sides of the MR film 105. After that, a shield gap film 106 is formed on the lead layers, the shield gap film 104 and the MR film 105, and thus the MR film 105 is sandwiched in between the shield gap films 104 and 106. Then, a top shield-cum-bottom pole (hereinafter referred to as "a bottom pole") 107 made of a magnetic material for use in both reproducing and recording heads, e.g., a nickel-iron alloy (NiFe, hereinafter referred to as "Permalloy trade name)"), is formed on the shield gap film 106.

Next, as shown in FIG. 40, a write gap layer 108 made of an insulating material, e.g., alumina, is formed on the bottom pole 107. Then, a photoresist film 109 is formed into a predetermined pattern on the write gap layer 108 by means of high-accuracy photolithography. Then, a thin film coil 110 made of, for example, copper (Cu) for an inductive recording head is formed on the photoresist film 109 by means of electroplating. Then, a photoresist is formed into a predetermined pattern by means of high-accuracy photolithography so as to coat the photoresist film 109 and the thin film coil 110, and thereafter the photoresist is subjected to heat treatment at a temperature of 250 degrees, for example. By this heat treatment, a photoresist film 111 for providing insulation between windings of the thin film coil 110 is formed.

Next, as shown in FIG. 41, a part of the write gap layer 108, which is located rearward with respect to the thin film coil 110 (on the right side in FIG. 41), is partly etched in order to form a magnetic path, whereby an opening 108A is formed and thus a part of the bottom pole 107 is exposed. Then, a top yoke-cum-top pole (hereinafter referred to as "a top pole") 112 made of a magnetic material for the recording head, e.g., Permalloy, is formed by means of electroplating so as to coat an exposed surface of the bottom pole 107, the photoresist film 111 and the write gap layer 108. For example, the top pole 112 has a planar shape shown in FIG. 44 to be described later and includes a yoke portion 112A and a pole chip portion 112B. The top pole 112 is in contact with and magnetically coupled to the bottom pole 107 in the opening 108A. Then, the respective parts of the write gap layer 108 and the bottom pole 107, which are located in a peripheral region around the pole chip portion 112B, are selectively etched and removed by about 0.5 µm by means of ion milling using the pole chip portion 112B of the top pole 112 as a mask (see FIG. 43). Then, an overcoat layer 118 made of, for example, alumina is formed so as to coat the top pole 112. Finally, a track surface of the recording head and the reproducing head, i.e., an air bearing surface 120, is formed through the steps of machining and polishing, and thus a thin film magnetic head is completed.

FIGS. 42 to 44 show a structure of the completed thin film magnetic head. FIG. 42 shows a cross section of the thin film magnetic head in a direction perpendicular to the air bearing surface 120. FIG. 43 shows an enlarged view of a cross section of a pole portion 500 in a direction parallel to the air bearing surface 120. FIG. 44 shows a planar structure of the thin film magnetic head. FIG. 41 corresponds to a cross section viewed in the direction of the arrows along the line XXXXI—XXXXI of FIG. 44. FIGS. 42 to 44 do not show the overcoat layer 113 and so forth. FIG. 44 shows the thin film coil 110 and the photoresist film 111 whose outermost ends alone are shown.

In FIGS. 42 and 44, "TH" indicates a throat height, and "MRH" indicates an MR height. The "throat height (TH)" refers to one of factors that determine the performance of the recording head, and refers to a length between the position of an edge of an insulating layer (the photoresist film 111) for electrically isolating the thin film coil 110 from the other conductive portions, more specifically, an edge closest to the air bearing surface 120, that is, a throat height zero position (a TH0 position), and the position of the air bearing surface 120. An optimization of the throat height (TH is desired for an improvement in the performance of the recording head. The throat height (TH) is controlled by the amount of polishing of the air bearing surface 120. The "MR height (MRH)" refers to a length between the position of an edge of the MR film 105, more specifically, an edge furthest from the air bearing surface 120, that is, an MR height zero position (an MRH0 position), and the position of the air bearing surface 120. The MR height (MRH) is also controlled by the amount of polishing of the air bearing surface 120.

Factors that determine the performance of the thin film magnetic head include an apex angle (θ) shown in FIG. 42, as well as the throat height (TH), the MR height (MRH) and so on. The apex angle θ refers to an average degree of inclination of an inclined surface of the photoresist film 111 close to the air bearing surface 120.

As shown in FIG. 43, a structure in which the respective parts of the write gap layer 108 and the bottom pole 107 are etched in self-alignment with the pole chip portion 112B of the top pole 112 is called a trim structure. The trim structure allows preventing an increase in an effective track width resulting from a spread of a magnetic flux generated during the writing of data on a narrow track. "P2W" indicates a width of a portion (hereinafter referred to as "a pole portion 500") having the trim structure, namely, a pole width (or "a track width"). "P2L" indicates a thickness of the pole chip portion 112B constituting a part of the pole portion 500, namely, a pole length. Lead layers 121 or functioning as lead electrode layers to be electrically connected to the MR film 105 are provided on both sides of the MR film 105. The lead layers 121 are not shown in FIGS. 39 to 42.

As shown in FIG. 44, the top pole 112 has the yoke portion 112A occupying most of the top pole 112, and the pole chip portion 112B having a substantially uniform width as the pole width P2W. An outer edge of the yoke portion 112A forms an angle a with a surface parallel to the air bearing surface 120 in a coupling portion between the yoke portion 112A and the pole chip portion 112B. An outer edge of the pole chip portion 112B forms an angle β with the surface parallel to the air bearing surface 120 in the above-mentioned coupling portion. FIG. 44 shows the case where α and β are, for example, about 45 degrees and about 90 degrees, respectively. As described above, the pole chip portion 112B is a portion for functioning as a mask for forming the pole portion 500 having the trim structure. As can be seen from FIGS. 42 and 44, the pole chip portion 112B lies on the flat write gap layer 108, and the yoke portion 112A lies on a coil portion (hereinafter referred to as "an apex portion"), which is coated with the photoresist film 111 and rises like a hill.

Detailed structural features of the top pole are described in Unexamined Japanese Patent Application Publication No. Hei 8-249614, for example. The publication gives the description about the top pole having a structure in which a width of the top pole becomes gradually greater rearward with respect to the TH0 position (that is, away from the air bearing surface 120).

The pole width P2W of the pole portion 500 defines a write track width on the magnetic recording medium. To increase the recording density, it is necessary that the pole portion 600 be formed with high accuracy so as to make the pole width P2W minutely small. Too great a pole width P2W causes the occurrence of a phenomenon in which data is written on not only a predetermined write track region on the magnetic recording medium but also regions adjacent to the predetermined write track region, namely, a aide erase phenomenon, which makes it impossible to increase the recording density. In recent years in particular, the local minimization of the pole width P2W to about 0.3 µm or less has been required in order to enable recording at a high surface recording density, that is, in order to form the recording head having the narrow track structure, and therefore an urgent necessity is to establish manufacturing technology associated with the local minimization of the pole width P2W.

Frame plating is used as a method of forming the top pole, as described in Unexamined Japanese Patent Application Publication No. Hei 7-262519, for example. The top pole 112 is formed by using frame plating in the following manner. First, a thin electrode film made of, for example, Permalloy is formed on the overall underlayer including the apex portion by means of sputtering, for instance. Then, the electrode film is coated with a photoresist so as to form a photoresist film, and thereafter the photoresist film is patterned by means of photolithography, whereby a frame pattern (an outer frame) for plating is formed. The frame pattern has an opening pattern corresponding to the planar shape of the top pole 112. Then, the top pole 112 made of, for example, Permalloy is formed in the opening pattern of the frame pattern by means of electroplating using the frame pattern as a mask and using as a seed layer the electrode film formed in the preceding step.

The apex portion is located higher than the other portions by 7 to 10 µm or more, for example. The apex portion is coated with a photoresist of 3 µm to 4 µm in thickness. When a film thickness of the photoresist on the apex portion must be at least 3 µm or more, a photoresist film having a thickness of, for example, 8 to 10 µm or more is formed under the apex portion because the fluidic photoresist flows intensively to a lower place.

To realize a locally minimum pole width P2W, it is necessary to form a frame pattern having an opening pattern having a locally minimum width (e.g., 1.0 µm or less) corresponding to the pole width P2W. That is, the opening pattern having a locally minimum width of 1.0 µor less must be formed by the photoresist film having a thickness of 8 to 10 µm or more. However, it is very difficult in manufacturing process to form the frame pattern having the opening pattern having the locally minimum width by using the photoresist film having such a great film thickness.

When the top pole 112 is formed on a region having an uneven structure comprising the apex portion and so on, there is, moreover, a problem that the accuracy in forming the top pole 112 deteriorates greatly for the following reason. That is, when the photoresist film formed on the region having the uneven structure is exposed to light in the step of forming the frame pattern for forming the top pole 112, the light is reflected obliquely or transversely from an inclined surface portion or the like of the underlayer (the electrode film). The reflected light causes an increase or a reduction in an exposed region in the photoresist film. Therefore, in the photoresist film, the width of the opening pattern having the locally minimum width corresponding to the pole chip portion 112B of the top pole 112 increases in a width direction.

SUMMARY OF THE INVENTION

The invention is designed to overcome the foregoing problems. It is an object of the invention to provide a thin film magnetic head capable of local minimization of a pole width with high accuracy, a method of manufacturing the same, and a method of forming a magnetic layer pattern, which is capable of forming a long, narrow magnetic layer pattern with high accuracy.

In a thin film magnetic head according to a first aspect of the invention including: a first magnetic layer and a second magnetic layer magnetically coupled to each other and having two magnetic poles facing each other with a gap layer in between near and in a recording-medium-facing surface to be faced with a recording medium; a thin film coil provided between the first and second magnetic layers; and an insulating layer for insulating the thin film coil from the first and second magnetic layers, the first magnetic layer includes a laminate of a first magnetic layer portion and a second magnetic layer portion, the first magnetic layer portion being located away from the gap layer and the second magnetic layer portion being located close to the gap layer, the second magnetic layer portion extends adjacent to the gap layer from the recording-medium-facing surface to a first position, while maintaining a uniform width for defining a write track width on the recording medium, and the first magnetic layer portion includes a uniform width portion and a widened portion, the uniform portion extending from the recording-medium-facing surface or its neighborhood to a second position located at or near the first position, while maintaining the same width as the uniform width of the second magnetic layer portion, and the widened portion extending from the second position to a third position, and having a width greater than that of the uniform width portion.

In the thin film magnetic head according to the first aspect of the invention, the first magnetic layer portion is located away from the gap layer, and the second magnetic layer portion is located close to the gap layer, and the first magnetic layer includes these two magnetic layer portions. The uniform width portion of the first magnetic layer portion and the second magnetic layer portion have the same uniform width and define the write track width on the recording medium.

In the thin film magnetic head according to the first aspect of the invention, an edge on the recording-medium-facing surface side of the uniform width portion of the first magnetic layer portion may fall on the recording-medium-facing surface or may falls on a position away from the recording-medium-facing surface.

In the thin film magnetic head according to the first aspect of the invention, it is preferable that a thickness of an end, close to the recording-medium-facing surface, of the uniform width portion of the first magnetic layer portion be less than a thickness of an end, far from the recording-medium-facing surface, of the uniform width portion.

In the thin film magnetic head according to the first aspect of the invention, a boundary surface between the first magnetic layer portion and the second magnetic layer portion may be a plane.

In the thin film magnetic head according to the first aspect of the invention, the insulating layer may be in contact with the second magnetic layer portion at the first position. In this case, a boundary surface between the second magnetic layer portion and the insulating layer may be a plane, and the boundary surface may be perpendicular to a direction in which the second magnetic layer portion extends.

In the thin film magnetic head according to the first aspect of the invention, the thin film coil may include a first thin film coil, most of the first thin film coil may be included in a space defined by a thickness of the second magnetic layer portion. In this case, it is preferable that the thickness of the second magnetic layer portion be larger than a thickness of the first thin film coil.

In the thin film magnetic head according to the first aspect of the invention, a recessed area may be provided on a surface of the second magnetic layer close to the first magnetic layer, and the first thin film coil may be located in the recessed area.

In the thin film magnetic head according to the first aspect of the invention, when the thin film coil further includes a second thin film coil electrically connected to the first thin film coil, most of the second thin film coil may be included in a space defined by a thickness of the uniform width portion of the first magnetic layer portion.

In the thin film magnetic head according to the first aspect of the invention, the third position may be located between the recording-medium-facing surface and the first thin film coil, and the first magnetic layer may further include a third magnetic layer portion partially overlapping and magnetically coupled to the first magnetic layer portion. In this case, it is preferable that a part of the insulating layer be located adjacent to the gap layer in an overlap area in which the first magnetic layer portion overlaps the third magnetic layer portion.

In the thin film magnetic head according to the first aspect of the invention, a magnetic material of the second magnetic layer portion may have a saturation magnetic flux density equal to or higher than that of a magnetic material of the first magnetic layer portion. In this case, it is preferable that the first magnetic layer portion be made of a magnetic material containing iron, nickel and cobalt and the second magnetic layer portion be made of a magnetic material containing either a nickel-iron alloy or a cobalt-iron alloy.

In the thin film magnetic head according to the first aspect of the invention, at least one of the first and second magnetic layer portions may be made of a magnetic material containing iron nitride, a nickel-iron alloy or an amorphous alloy. Preferably, the amorphous alloy is a cobalt-iron alloy, a zirconium-cobalt-iron alloy oxide or a zirconium-iron alloy nitride.

In the thin film magnetic head according to the first aspect of the invention, at least one of the first and second magnetic layer portions may be made of a magnetic material containing iron, nickel and cobalt.

In a thin film magnetic head according to a second aspect of the invention including: a first magnetic layer and a second magnetic layer magnetically coupled to each other and having two magnetic poles facing each other with a gap layer in between near and in a recording-medium-acing surface to be faced with a recording medium; a thin film coil provided between the first and second magnetic layers; and an insulating layer for insulating the thin film coil from the fist and second magnetic layers, the it magnetic layer includes a track width defining portion extending adjacent to the gap layer away from the recording-medium-facing surface and defining a write track width on the recording medium, and the track width defining portion has a multilayer structure comprising a plurality of magnetic layers.

In the thin film magnetic head according to the second aspect of the invention, the track width defining portion is adapted to have the multilayer structure comprising a plurality of magnetic layers, and the track width defining portion defines the write track width on the recording medium.

In a method of manufacturing a thin film magnetic head according to a first aspect of the invention including: a first magnetic layer and a second magnetic layer magnetically coupled to each other and having two magnetic poles facing each other with a gap layer in between near and in a recording-medium-facing surface to be faced with a recording medium; a thin film coil provided between the first and second magnetic layers; and an insulating layer for insulating the thin film coil from the first and second magnetic layers, the first magnetic layer including a laminate of a first magnetic layer portion and a second magnetic layer portion, the first magnetic layer portion being located away from the gap layer and the second magnetic layer portion being located close to the gap layer, the second magnetic layer portion extending adjacent to the gap layer from the recording-medium-facing surface to a first position while maintaining a uniform width for defining a write track width on the recording medium, the first magnetic layer portion including a uniform width portion and a widened portion, the uniform width portion extending from the recording-medium-facing surface or its neighborhood to a second position located at or near the first position, while maintaining the same width as the uniform width of the second magnetic layer portion, and the widened portion extending from the second position to a third position and having a width greater than that of the uniform width portion, the step of forming the first magnetic layer includes: a first step of selectively forming a precursory magnetic layer having a width greater than the uniform width of the second magnetic layer portion and a straight edge extending in a width direction of the second magnetic layer portion at the first position and functioning as a preparatory layer for the second magnetic layer portion, on the gap layer in a region from a position nearby which the recording-medium-facing surface is to be formed to the first position; a second step of forming a precursory insulating layer covering at least the precursory magnetic layer and a periphery thereof and functioning as a preparatory layer for a part of the insulating layer; a third step of polishing and flattening the precursory insulating layer until at least the precursory magnetic layer is exposed, thereby forming the part of the insulating layer; a fourth step of selectively forming the first magnetic layer portion on a polished and flattened surface so that the second position of the uniform width portion is located further from the recording-medium-facing surface than the first position; and a fifth step of selectively etching the precursory magnetic layer with the uniform width portion of the first magnetic layer portion as a mask, thereby forming the second magnetic layer portion.

In the method of manufacturing a thin film magnetic head according to the first aspect of the invention, the first step includes selectively forming a precursory magnetic layer having a width greater than the uniform width of the second magnetic layer portion and a straight edge extending in a width direction of the second magnetic layer portion at the first position, and functioning as a preparatory layer for the second magnetic layer portion, on the gap layer in a region from a position nearby which the recording-medium-facing surface is to be formed to the first position. Then, the second step includes forming a precursory insulating layer covering at least the precursory magnetic layer and a periphery thereof and functioning as a preparatory layer for a part of the insulating layer. Then, the third step includes polishing and flattening the precursory insulating layer until at least the precursory magnetic layer is exposed, thereby forming the part of the insulating layer. Then, the fourth step includes selectively forming the first magnetic layer portion on a polished and flattened surface so that the second position of the uniform width portion is located farther from the recording-medium-facing surface than the first position. Finally, the fifth step includes selectively etching the precursory magnetic layer with the uniform width portion of the first magnetic layer portion as a mask, thereby forming the second magnetic layer portion, and thus the first magnetic layer is formed through the above-mentioned steps.

In the method of manufacturing a thin film magnetic head according to the fist aspect of the invention, it is preferable that the fifth step include using reactive ion etching to form the second magnetic layer portion.

In the method of manufacturing a thin film magnetic head according to the first aspect of the invention, it is preferable that the first step include using reactive ion etching to form the precursory magnetic layer.

In the method of manufacturing a thin film magnetic head according to the first aspect of the invention, the fifth step may include removing the gap layer and the second magnetic layer to a predetermined depth in a thickness direction, except for a region where the uniform width portion of the first magnetic layer portion is formed.

In the method of manufacturing a thin film magnetic head according to the first aspect of the invention, it is preferable that the precursory magnetic layer be formed by steps of depositing a magnetic material layer on the gap layer with sputtering and selectively etching the magnetic material layer, and the first magnetic layer portion be formed with plating.

In a method of manufacturing a thin film magnetic head according to a second aspect of the invention including: a first magnetic layer and a second magnetic layer magnetically coupled to each other and having two magnetic poles facing each other with a gap layer in between near and in a recording-medium-facing surface to be faced with a recording medium; a thin film coil provided between the first and second magnetic layers; and an insulating layer for insulating the thin film coil from the first and second magnetic layers, a step of forming the first magnetic layer includes a step of forming a laminate including a first magnetic layer portion, the first magnetic layer portion being located away from the gap layer and the second magnetic layer portion being located close to the gap layer, the second magnetic layer portion is formed so as to extend adjacent to the cap layer from the recording-medium-facing surface to a first position with a uniform width for defining a write track width on the recording medium, and the first magnetic layer portion is formed so as to include a uniform width portion and a widened portion, the uniform width portion from the recording-medium-facing surface or its neighborhood to a second position located at or near the first position, while maintaining the same width as the uniform width of the second magnetic layer portion, the widened portion extending from the second position to a third position, and having a width greater than the width of the uniform width portion.

In the method of manufacturing a thin film magnetic head according to the second aspect of the invention, the first magnetic layer is formed by forming a laminate of a first magnetic layer portion and a second magnetic layer portion, the first magnetic layer portion is located away from the gap layer and the second magnetic layer portion is located dose to the gap layer. The step of forming the second magnetic layer portion includes forming the second magnetic layer portion which extends adjacent to the gap layer from the recording-medium-facing surface to a first position, while maintaining a uniform width for defining a write track width on the recording medium. The step of forming the first magnetic layer portion includes forming a uniform width portion and widened portion, for constituting parts of the first magnetic layer portion, the uniform portion extending from the recording-medium-facing surface or it neighborhood to a second position located at or near the first position, while maintaining the same width as the uniform width of the second magnetic layer portion, and the widened portion extending from the second position to a third position and having a width greater than that of the uniform width portion, thereby forming the first magnetic layer portion including the uniform width portion and the widened portion.

In the method of manufacturing a thin film magnetic head according to the second aspect of the invention, when the thin film coil includes a first thin film coil the first thin film coil may be formed so that most of the first thin film coil is included in a space defined by a thinness of the second magnetic layer portion. In this case, a recessed area may be formed on a surface of the second magnetic layer dose to the first magnetic layer by etching a part of the second magnetic layer to a predetermined depth, and the first thin film coil may be formed in the recessed area.

In the method of manufacturing a thin film magnetic head according to the second aspect of the invention, when the thin film coil further includes a second thin film coil electrically connected to the first thin film coil, the second thin film coil may be formed so that most of the second thin film coil is included in a space defined by a thickness of the first magnetic layer portion.

A method of forming a magnetic layer pattern of the invention, for forming a slim magnetic layer pattern extending with a uniform width on a predetermined underlayer, includes the steps of: selectively forming, on the underlayer, a precursory magnetic layer having a width greater than the uniform width of the magnetic layer pattern and a straight edge extending in a width direction of the magnetic layer pattern and functioning as a preparatory layer for the magnetic layer pattern; forming a nonmagnetic layer covering at least the precursory magnetic layer and a periphery thereof polishing and flattening the nonmagnetic layer until at least the precursory magnetic layer is exposed; selectively forming, on a polished and flattened surface, an etching mask which crosses the straight edge of the precursory magnetic layer, extends from a surface region of the nonmagnetic layer to a surface region of the precursory magnetic layer and has the same width as the uniform width of the magnetic layer pattern to be formed; and selectively etching the precursory magnetic layer with the etching mask, thereby forming the magnetic layer pattern.

In the method of forming a magnetic layer pattern of the invention, first, a precursory magnetic layer which has a width greater than the uniform width of the magnetic layer pattern and a straight edge extending in a width direction of the magnetic layer pattern and functions as a preparatory layer for the magnetic layer pattern is selectively formed on the underlayer. Then, a nonmagnetic covering at least the precursory magnetic layer and a periphery thereof is formed. Then, the nonmagnetic layer is polished and flattened until at least the precursory magnetic layer is exposed. Then, an etching mask, which crosses the straight edge of the precursory magnetic layer, extends from a surface region of the nonmagnetic layer to a surface region of the precursory magnetic layer and has the same width as the uniform width of the magnetic layer pattern to be formed, is selectively formed on a polished and flattened surface. Finally, the precursory magnetic layer is selectively etched with the etching mask, thereby the magnetic layer pattern is formed.

Other and further objects, features and advantages of the invention will appear more fully from the following description.

BRIEF DESCRIPTION OF THE DRAWINGS

FIGS. 5A and 5B are cross sectional views for describing a stop following the step of FIGS. 4A and 4B;

FIGS. 6A and 6B are cross sectional views for describing a step following the step of FIGS. 5A and 5B;

FIGS. 8A and 8B are cross sectional views for describing a step following the step of FIGS. 7A and 7B;

FIGS. 20A and 20B are illustrations for describing another function of the method of manufacturing a thin film magnetic head according to the first embodiment of the invention;

FIGS. 24A and 24B are cross sectional views for describing a step following the step of FIGS. 23A and 23B;

FIGS. 27A and 27B are cross sectional views for describing a step following the step of FIGS. 26A and 26B;

DETAILED DESCRIPTION OF THE PREFERRED EMBODIMENTS

Embodiments of the invention will be described in detail below with reference to the drawings.
First Embodiment Firstly, the description is given with reference to FIGS. 1A to 18 with regard to an example of a method of manufacturing a composite thin film magnetic head as a method of manufacturing a thin fin magnetic head according to a first embodiment of the invention.

Figure 15:
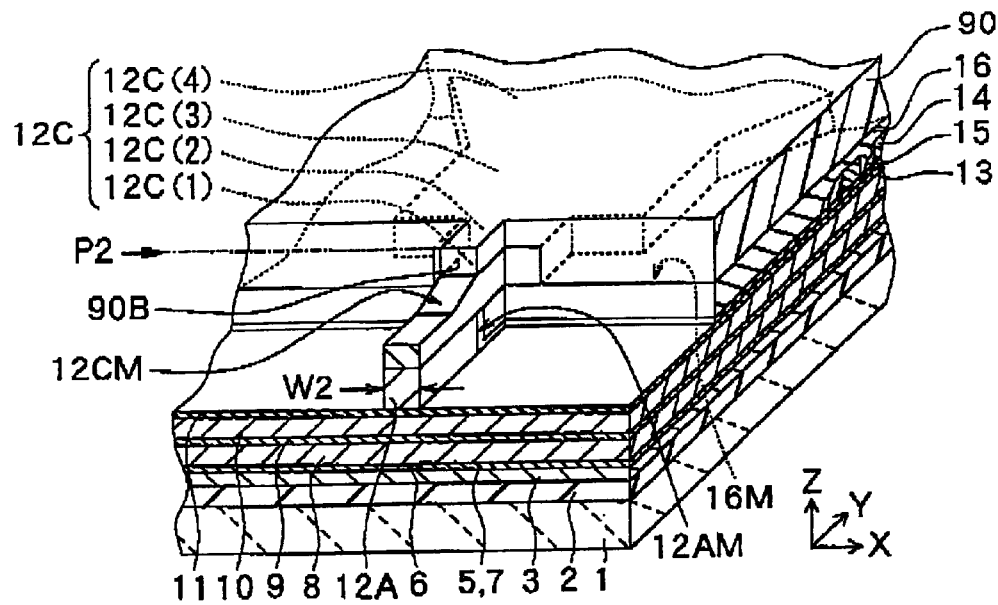
FIG. 15 is a perspective view corresponding to the cross sectional views shown in FIGS. 7A and 7B.
Figure 16:
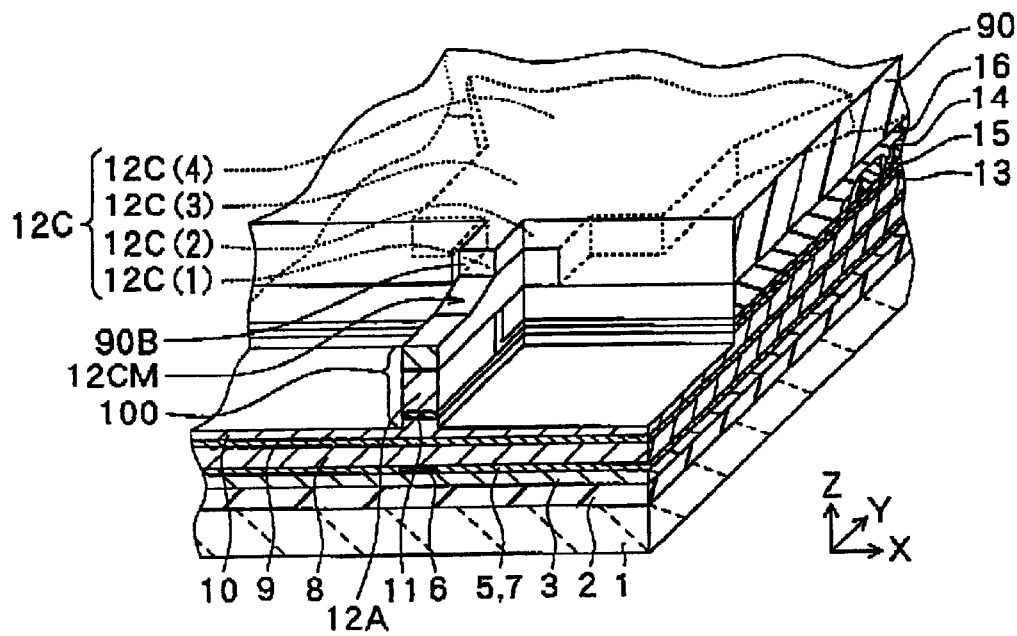
FIG. 16 is a perspective view corresponding to the cross sectional views shown in FIGS. 8A and 8B.
Figure 17:
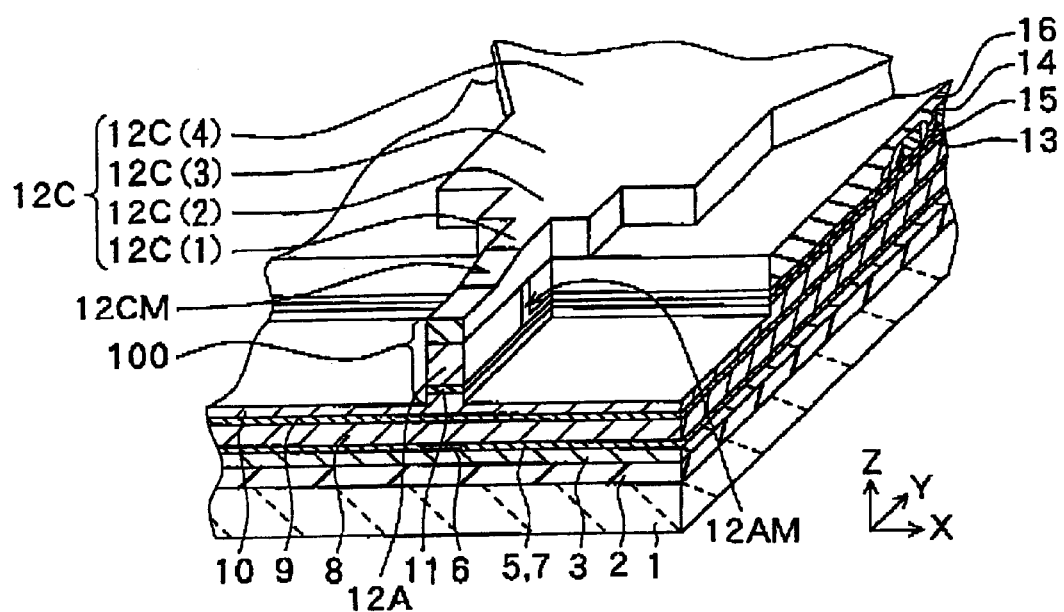
FIG. 17 is a perspective view corresponding to the cross sectional views shown in FIGS. 9A and 9B.
Figure 18:
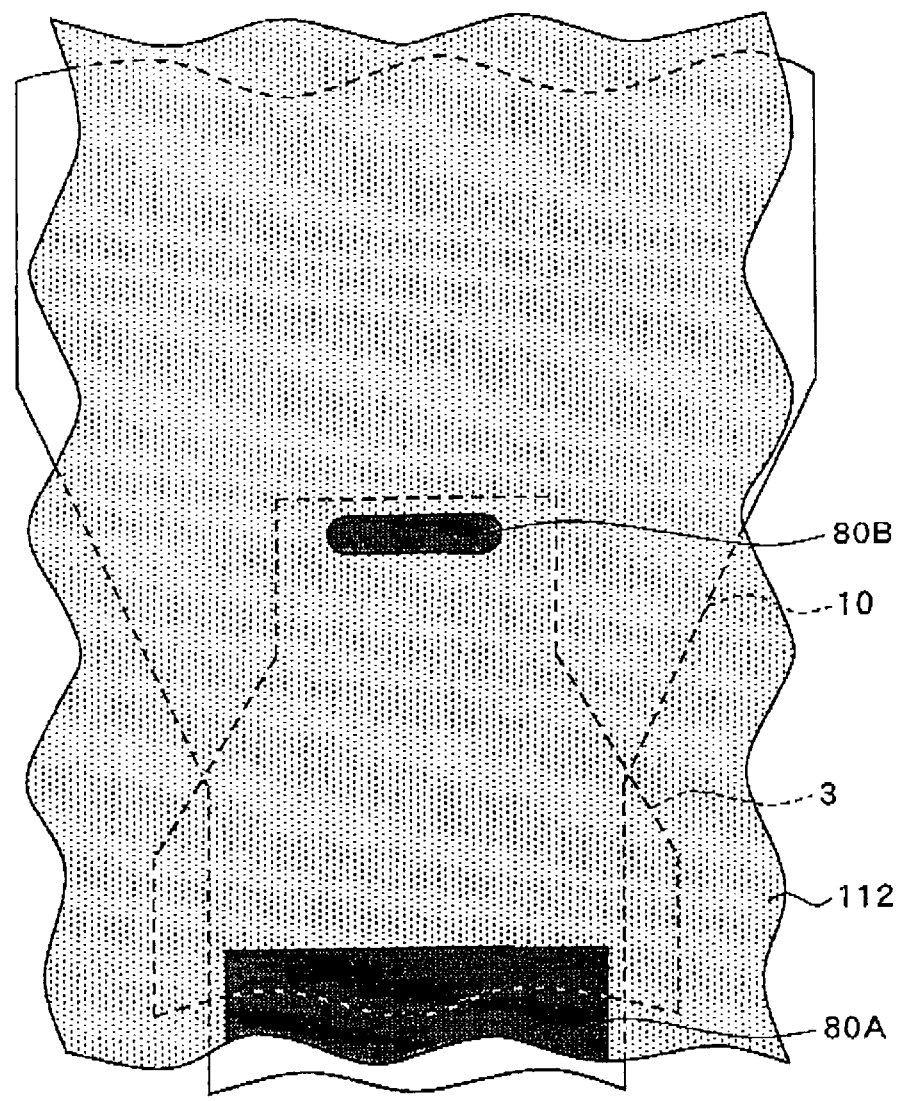
FIG. 18 is a plan view corresponding to the cross sectional views shown in FIGS. 2A and 2B.

FIGS. 1A, 2A, 3A, 4A, 5A, 6A, 7A, 8A, 9A and 10A show a cross section perpendicular to an air bearing surface, and FIGS. 1B, 2B, 3B, 4B, 5B, 6B, 7B, 8B, 9B and 10B show a cross section of a pole portion parallel to the air bearing surface. FIGS. 11 to 17 show perspective structures corresponding to main manufacturing steps. FIG. 11 corresponds to a state shown in FIGS. 1A and 1B, FIG. 12 corresponds to a state shown in FIGS. 2A and 2B, and FIG. 13 corresponds to a state shown in FIGS. 5A and 5B. FIG. 14 corresponds to a state shown in FIGS. 6A and 6B, FIG. 15 corresponds to a state shown in FIGS. 7A and 7B, FIG. 16 corresponds to a state shown in FIGS. 8A and 8B, and FIG. 17 corresponds to a state shown in FIGS. 9A and 9B. FIG. 17 does not show an overcoat layer 17 and the like shown in FIGS. 9A and 9B. FIG. 18 shows a planar structure corresponding to the state shown in FIGS. 2A and 2B.

In the following description, an X-axis direction, a Y-axis direction and a Z-axis direction in FIGS. 1A to 18 are expressed as "a width direction", "a length direction" and "a thickness (depth) direction or a height direction" respectively. The side dose to an air bearing surface 70 in the Y-axis direction (or the side to form the air bearing surface 70 in the following step) is expressed as "front (or frontward)", and the opposite side is expressed as "rear (or rearward)".

Method of Manufacturing Thin Film Magnetic Head

Figure 1A:
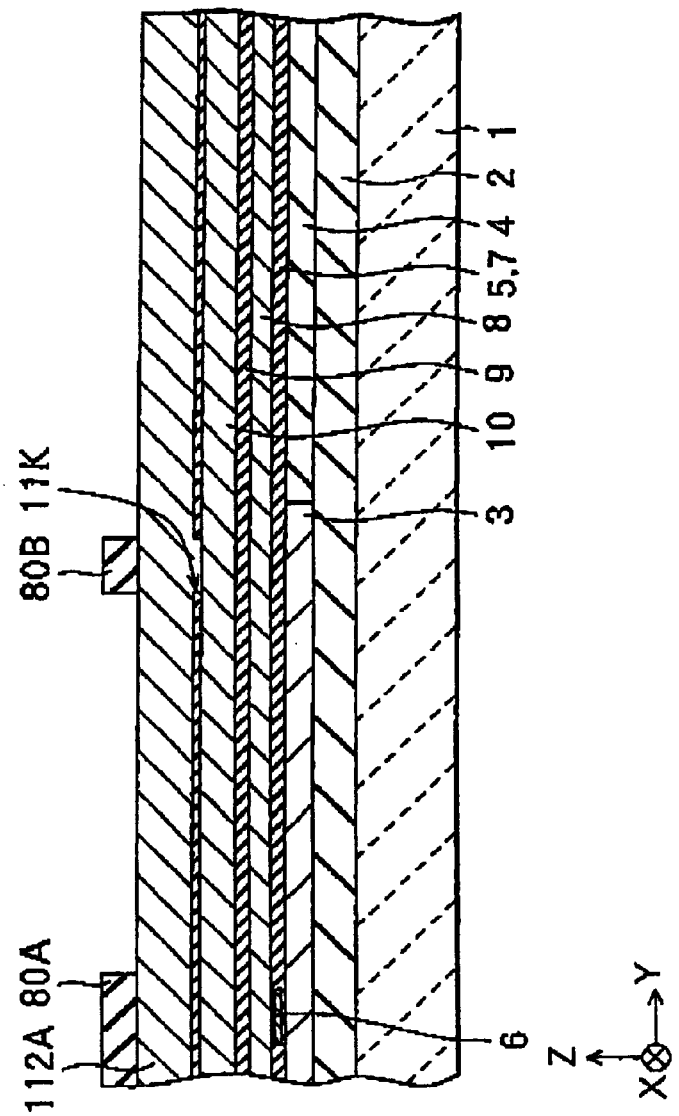
FIGS. 1A and 1B are cross sectional views for describing a step of a method of manufacturing a thin film magnetic head according to a first embodiment of the invention.
Figure 1B:
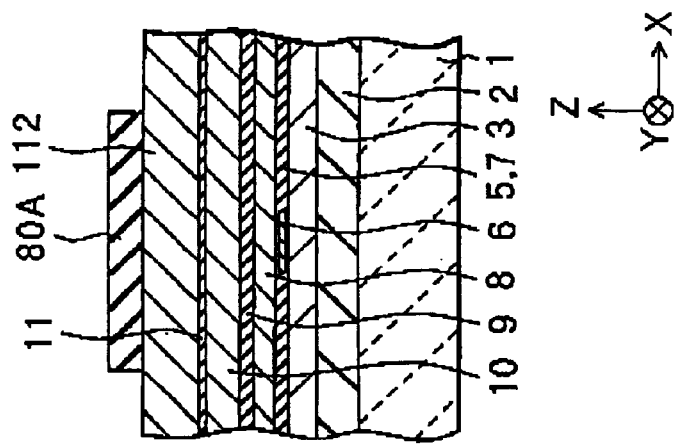

In the manufacturing method according to the embodiment, first of all, as shown in FIGS. 1A and 1B, an insulating layer 2 made of, for example, alumna is deposited with a thickness of about 3.0 $\mu$M to 5.0 $\mu$m on a substrate 1 made of, for example, attic ($Al_2O_3$—TiC). Then Permalloy Ni: 80 wt %, Fe: 20 wt %), for example, is selectively formed with a thickness of about 2.0 $\mu$m to 3.0 $\mu$m on the insulating layer 2 by use of for example, frame plating, and thus a bottom shield layer a for a reproducing head is formed. The description is given later with regard to details about frame plating. The bottom shield layer 3 is formed so as to have a planar shape shown in FIG. 21 to be described later, for example. For instance, Permalloy having the composition of 45 wt % Ni and 55 wt % Fe, as well as the above-mentioned Permalloy having the composition of 80 wt % Ni and 20 wt % Fe, may be used as Permalloy for forming the bottom shield layer 3. Then, an alumina layer, for example, is formed with a thickness of about 4.0 $\mu$m to 5.0 $\mu$m so as to coat the overall surface, and thereafter a surface of the alumina layer is polished by means of, or example, CMP (chemical mechanical polishing) until the bottom shield layer 3 is exposed, whereby the overall surface becomes flattened. Thus, an insulating film 4 is formed so that a peripheral region around the bottom shield layer 3 is filled in with the insulating film 4.

Next, as shown in FIGS. 1A and 1B, a shield gap film 5 made of for example, alumina is formed with a thickness of about 100 nm to 200 nm on the bottom shield layer 3 by means of sputtering, for example. Then, an MR film 6 for constituting an MR element that is a principal pan of the reproducing head is formed into a desired shape on the shield gap film 5 by use of high-accuracy photolithography. Then, lead layers (not shown) for functioning as lead electrode layers to be electrically connected to the MR film 6 are formed on both sides of the MR film 6. Then, a shield gap film 7 is formed on the lead layers, the shield gap film 5 and the MR film 6, and thus the MR film 6 is sandwiched in between the shield gap films 5 and 7. A material of the shield gap film 7, a method of forming the shield gap film 7 and the like are substantially the same as those of the shield gap film 5.

Next, as shown in FIGS. 1A and 1B a top shield layer 8 is selectively formed with a thickness of about 1.0 $\mu$m to 1.5 $\mu$m on the shield gap film 7. A material of the top shield layer 8, a method of forming the top shield layer 8 and the like are substantially the same as those of the bottom shield layer 3. Then, an insulating film 9 made of, for example, alumina is formed with a thickness of about 0.15 $\mu$m to 0.2 $\mu$m on the top shield layer 8 by means of sputtering, for example.

Next, as shown in FIGS. 1A and 1B, a bottom pole 10 made of a magnetic material having a high saturation magnetic flux density, e.g., iron nitride (FeN), is selectively formed on the insulating film 9. The bottom pole 10 is formed so as to have a planar shape shown in FIG. 21 to be described later, for example.

The bottom pole 10 is formed through the following procedure. That is, first, an iron nitride layer, for example, is formed with a thickness of about 2.0 $\mu$m to 2.5 $\mu$m on the insulating film 9 by means of sputtering, for example. Then, the iron nitride layer is etched and patterned by means of, for example, reactive ion etching (hereinafter referred to as "RIE") using a mask having a predetermined shape and material (e.g., a metallic material such as chromium), and thus the bottom pole 10 is selectively formed. The bottom pole 10 becomes substantially flat throughout the overall surface thereof. In general, the rate of etching using RIE is higher than the rate of etching using ion milling. Therefore, the use of RIE as an etching method allows forming the bottom pole 10 in a shorter time, as compared to the use of ion milling. To form the bottom pole 10 by use of an etching process using RIE, etching conditions such as the type of etching gas to be used for etching and a processing temperature for etching, in particular, are optimized, and thus the time required to form the bottom pole 10 can be further reduced. The description is given later with regard to details about the optimization of the etching conditions. Besides iron nitride, a magnetic material having a high saturation magnetic flux density similarly to iron nitride, e.g., an amorphous alloy such as a cobalt-iron alloy (FeCo), a zirconium-cobalt-iron alloy oxide (FeCoZrO) or a zirconium-iron alloy nitride (FeZrN), may be used as a material of the bottom pole 10. RIE is not necessarily used as an etching method for patterning the iron nitride layer, and ion milling may be used. The bottom pole 10 corresponds to a specific example of "a second magnetic layer" of the thin film magnetic head or the method of manufacturing the same according to first and second aspects of the invention.

Next, as shown in FIGS. 1A and 1B, a write gap layer 11 made of a nonmagnetic material, e.g., alumina, is flatly formed with a thickness of about 0.1 µm to 0.15 µm on the bottom pole 10 by means of sputtering, for example. The write gap layer 11 is formed so as not to coat a region where a magnetic path connecting portion 12B is to be formed in the following step. The region is an opening 11K for connecting the bottom pole 10 to a top pole 12 to be formed in the following step. Besides alumina mentioned above, the same nonmagnetic metallic material as alumina, e.g., a nickel-copper alloy (NiCu) or the like, may be used as a material of the write gap layer 11. The write gap layer 11 corresponds to a specific example of "a gap layer" of the thin film magnetic head or the method of manufacturing the same according to the first and second aspects of the invention, and corresponds to a specific example of "an underlayer" of a method of forming a magnetic layer pattern of the invention.

Next, as shown in FIGS. 1A and 1B, a basic magnetic layer 112 made of a magnetic material having a high saturation magnetic flux density, e.g., iron nitride, is formed with a thickness of about 0.8 µm to 2.0 µm by means of for example, sputtering so as to coat the overall surface, For example, a magnetic material having a higher saturation magnetic flux density than a saturation magnetic flux density of a magnetic material (e.g., an iron-nickel-cobalt alloy) for constituting a top magnetic layer 12C to be formed in the following step is used as a magnetic material for constituting the basic magnetic layer 112. Besides iron nitride, for example, an amorphous alloy or the like such as a cobalt-iron alloy (FeCo), a zirconium-cobalt-iron alloy oxide (FeCoZrO) or a zirconium-iron alloy nitride (FeZrN), which has a high saturation magnetic flux density similarly to iron nitride, may be used as a material of the basic magnetic layer 112. The basic magnetic layer 112 corresponds to a specific example of "a magnetic material layer" of the method of manufacturing a thin film magnetic head according to the first aspect of the invention Next, as shown in FIGS. 1A, 1B, 11 and 18, masks 80A and 80B made of an inorganic material, e.g., alumina, are selectively formed at predetermined positions on the basic magnetic layer 112. The mask 80A is formed so that a region where the mask 80A is armed includes a region where a top pole chip 12A is to be formed in the following step. More specifically, for example, the mask 80A is formed so that the position of a rear edge of the mask 80A is located rearward by less than about 0.5 µm with respect to the position of a rear edge of the MR film 6 and so that a width W1 of the mask 80A is much greater than a width W2 of a second pole front end portion 12A to be described later (see FIGS. 7A, 7B and 15). The mask 80B is formed so that a region where the mask 80B is formed corresponds to the region where the magnetic path connecting portion 12B is to be formed in the following step (not shown in FIG. 11). The position of the rear edge of the mask 80A is not necessarily located rearward with respect to the position of the rear edge of the MR film 6, and both the positions may be matched to each other. Besides alumina mentioned above, aluminum nitride or the like may be used as a material of the masks 80A and 80B.

The masks 80A and 80B are formed through the following procedure, for example. That is, fist, an alumina layer is formed by means of, for example, sputtering so as to coat a surface of the basic magnetic layer 112. Then, a mask made of, for example, Permalloy (Ni: 80 wt %, Fe: 20 wt %) is formed on the alumina layer by means of frame plating, for example. The mask is formed so that a planar shape of the mask is substantially the same as a planar shape of each of the masks 80A and 80B to be finally formed. Then, the alumina layer is etched by means of, for example, RIE using the mask made of Permalloy, and thus the masks 80A and 80B are formed.

Figure 2B:
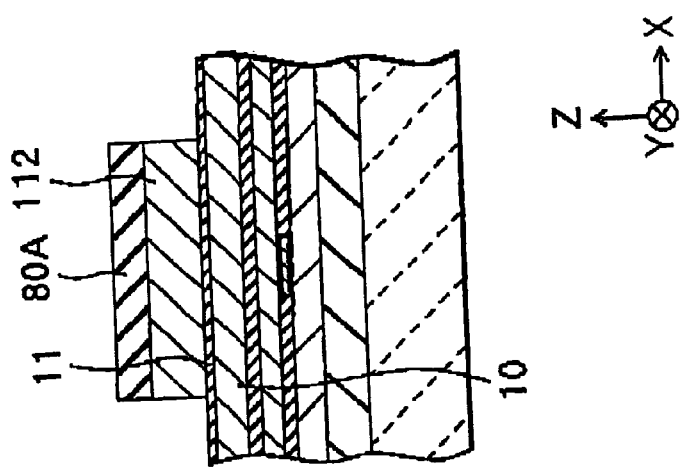
FIGS. 2A and 2B are cross sectional views for describing a step following the step of FIGS. 1A and 1B.
Figure 2A:
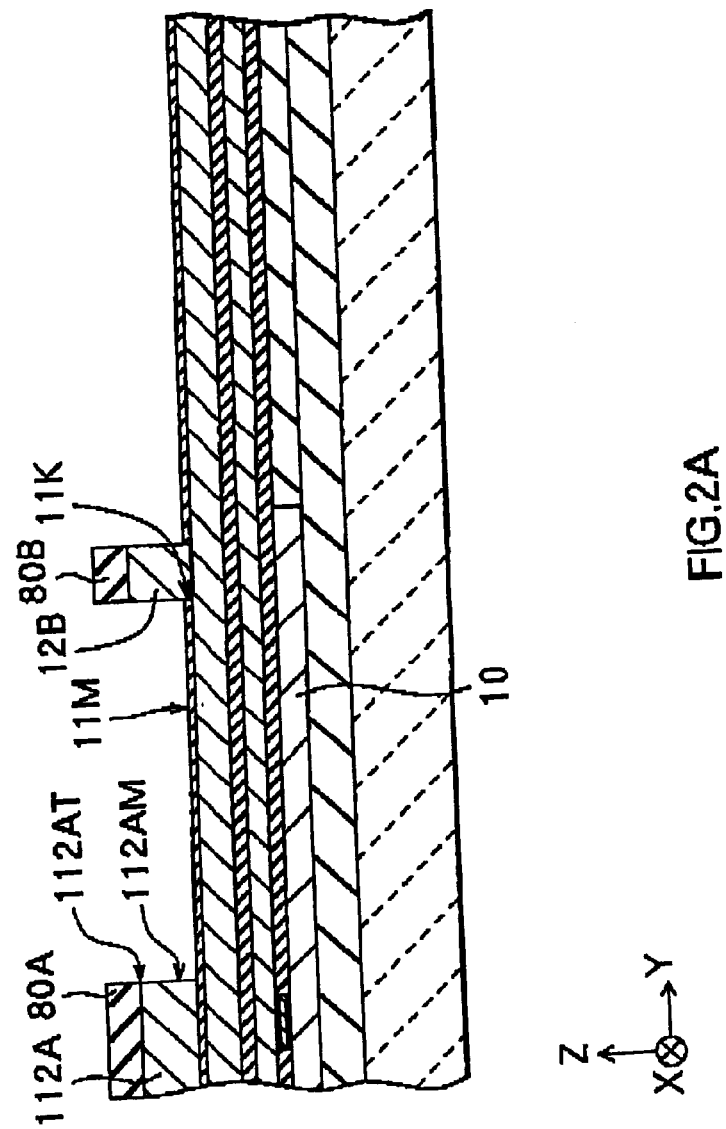
Figure 12:
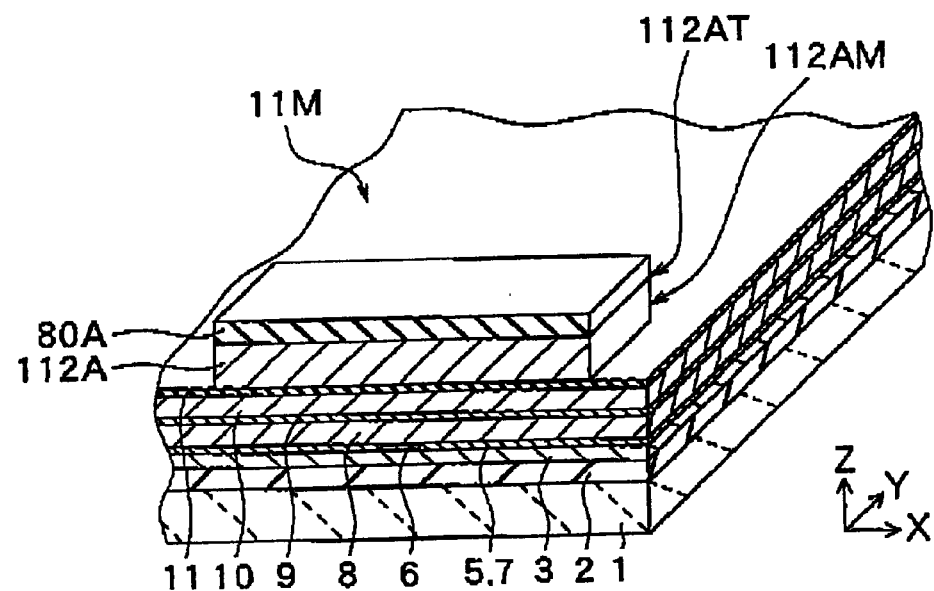
FIG. 12 is a perspective view corresponding to the cross sectional views shown in FIGS. 2A and 2B.

Next, the basic magnetic layer 112 is etched and patterned by means of, for example, RIE using the masks 80A and 80B. This etching process selectively removes the basic magnetic layer 112 except for the regions where the masks 80A and 80B are formed, thereby selectively forming a precursory magnetic layer 112A on a frontward region on the write gap layer 11 and also selectively forming the magnetic path connecting portion 12B for constituting a part of the top pole 12 in the opening 11K as shown in FIGS. 2A, 2B and 12. The precursory magnetic layer 112A is formed so that an edge 112AT extending in the width direction of a rear edge portion of the layer 112A forms a straight line. In particular, the use of RIE as a method for etching the basic magnetic layer 112 allows a rear edge surface 112AM of the precursory magnetic layer 112A to be a plane and become perpendicular to a plane 11M of the write gap layer 11. The precursory magnetic layer 112A is a preparatory layer that is to be etched and patterned into the second pole front end portion 12A in the following step. In the following description, a preparatory layer to be patterned into a predetermined shape in the following step as mentioned above is called "a precursory layer", which is expressed in the same manner. The use of RIE as an etching method for patterning the basic magnetic layer 112 permits forming the precursory magnetic layer 112 and the magnetic path connecting portion 12B with higher accuracy in a shorter time. The masks 80A and 80B in themselves are also etched by the etching process for forming the precursory magnetic layer 112A, so that the thicknesses of the masks 80A and 80B decrease. At the time of completion of the etching process, the masks 80A and 80B may remain (see FIGS. 2A, 2B and 12 or may avoid remaining.

Figures 3A, 3B:
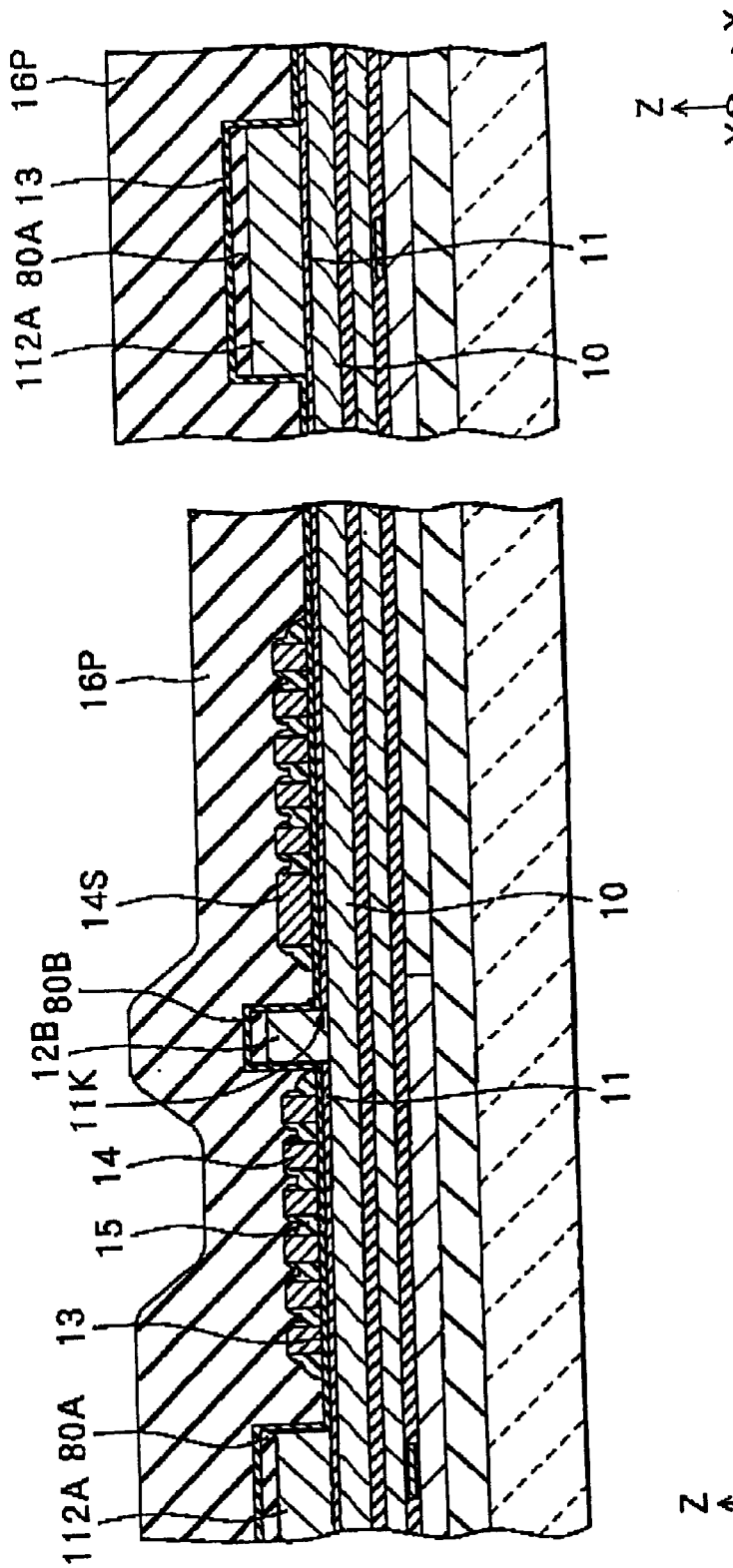
FIGS. 3A and 3B are cross sectional views for describing a step following the step of FIGS. 2A and 2B.

Next, as shown in FIGS. 3A and 3B, an insulating film 13 made of, for example, alumina is formed with a thickness of about 0.2 µm to 0.5 µm so as to coat the overall surface.

Next, as shown in FIGS. 3A and 3B, a thin film coil 14 made of, for example, copper (Cu) for an inductive recording head is selectively formed with a thickness of about 0.8 µm to 1.5 µm on the flat insulating film 13 in a region located rearward with respect to the region where the precursory magnetic layer 112A is formed (except for the region where the magnetic path connecting portion 12B is located), by means of electroplating, for example. The thin film coil 14 is formed so as to have a winding structure shown in FIG. 21 to be described later, for example. The thin film coil 14 is, only in part, shown in FIGS. 3A and 3B. At the same time when the thin film coil 14 is formed, a coil connecting portion 14S for constituting an inner terminal end of the thin film coil 14 is integrally formed with the thin film coil 14 on the insulating film 13. The coil connecting portion 14S serves to electrically connect the thin film coil 14 to a coil connecting wiring 12CH to be formed in the following step (see FIGS. 5A and 5B). The thin film coil 14 corresponds to a specific example of "a thin film coil" or a first thin film coil of the thin film magnetic head or the method of manufacturing the same according to the first and second aspects of the invention.

Next, a material exhibiting fluidity during heating, e.g., an organic insulating material such as a photoresist, is formed into a predetermined pattern between and around windings of the thin film coil 14 including the coil connecting portion 14S) by mesa of high-accuracy photolithography. Then, this photoresist film is subjected to heat treatment at a temperature between 200 and 250 degrees, for example. This heat treatment allows the photoresist to flow and fill up a gap between the windings of the thin film coil 14 and the like, thereby forming an insulating film 15 for providing insulation between the windings of the thin film coil 14 and the like, as shown in FIGS. 3A and 3B. The insulating film 15 can be formed in such a manner that the insulating film 15 does not coat the top surfaces of the thin film coil 14 and the coil connecting portion 14S (see FIGS. 3A and 3B) or the insulating film 15 coats the top surfaces thereof.

Next, as shown in FIGS. 3A and 3B, a precursory insulating layer 16P, for example, is formed with a thickness of about 2.0 µm to 3.0 µm by means of, for instance, sputtering so as to coat the overall surface, and thus a region having an uneven structure comprising the precursory magnetic layer 112A, the magnetic path connecting portion 12B, the thin film coil 14 and so forth is filled with the precursory insulating layer 16P. The precursory insulating layer 16P corresponds to a specific example of "a nonmagnetic layer" of the method of forming a magnetic layer pattern of the invention.

Figures 4A, 4B:
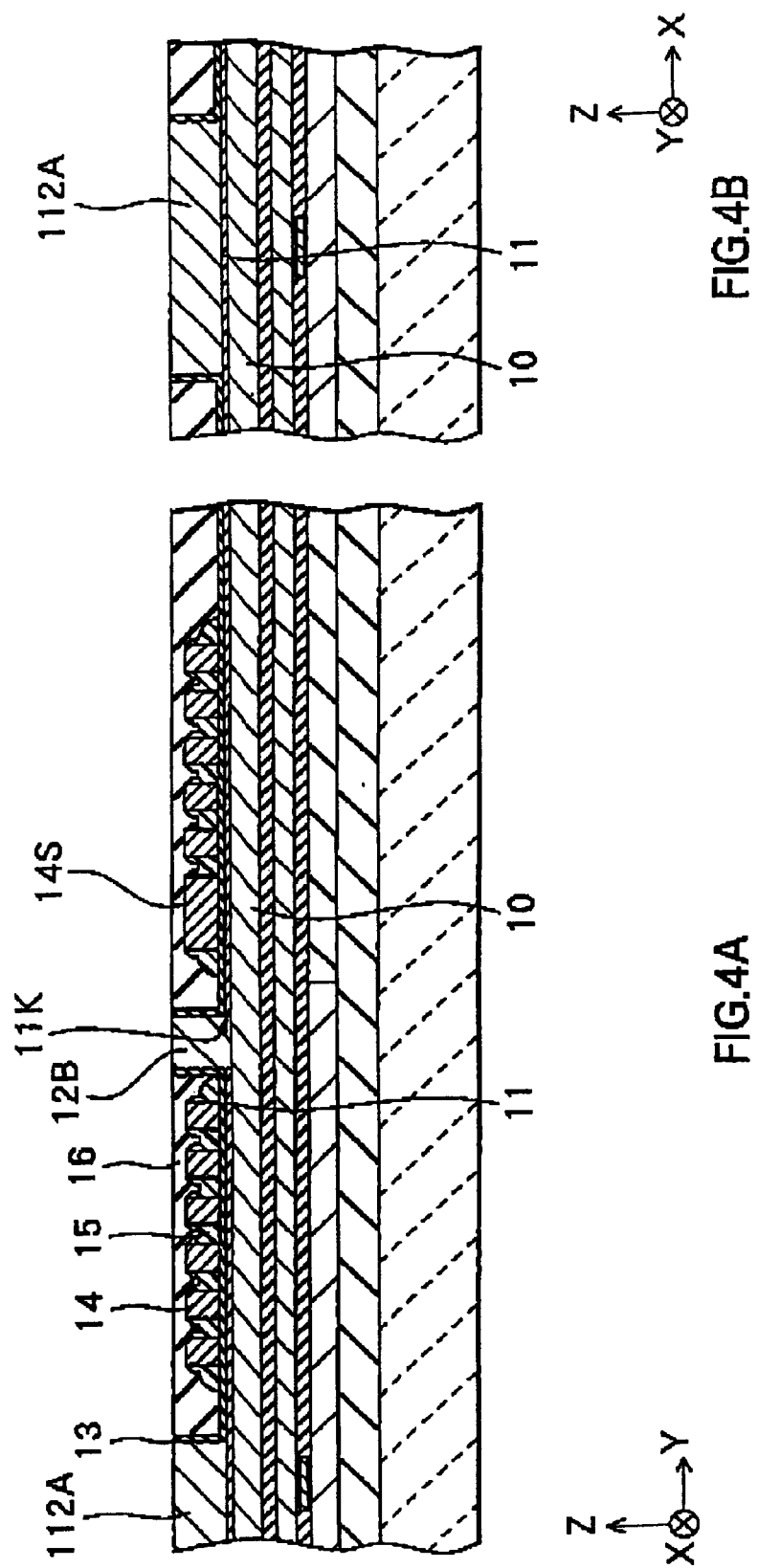
FIGS. 4A and 4B are cross sectional views for describing a step following the step of FIGS. 3A and 3B.

Next, the overall surface of the precursory insulating layer 16P is polished and flattened by means of CMP, for example. By this polishing, an insulating film 16 for coating the thin film coil 14 and so on is formed as shown in FIGS. 4A and 4B. The polishing takes place until at least the precursory magnetic layer 112A and the magnetic path connecting portion 12B are exposed. A boundary surface between an insulator (the insulating films 13, 15 and 16) for coating the thin film coil 14 and the precursory magnetic layer 112A is a plane and becomes perpendicular to the surface of the flat write gap layer 11. The position of a front edge of the above-mentioned insulator (the insulating film 13) is the reference position for determining a throat height (TH) that is one of factors that determine the performance of the recording head, namely, a throat height zero position (a TH0 position). The insulating films 13, 15 and 16 correspond to a specific example of "an insulating layer" of the thin film magnetic head or the method of manufacturing the same according to the first and second aspects of the invention.

Next, as shown in FIGS. 5A and 5B, the insulating film 16 coating the coil connecting portion 14S is partly etched by means of, for example, RIE or ion milling, and thus an opening 16K for connecting the coil connecting portion 14S to the coil connecting wiring 12CH to be formed in the following step is formed.

Figure 13:
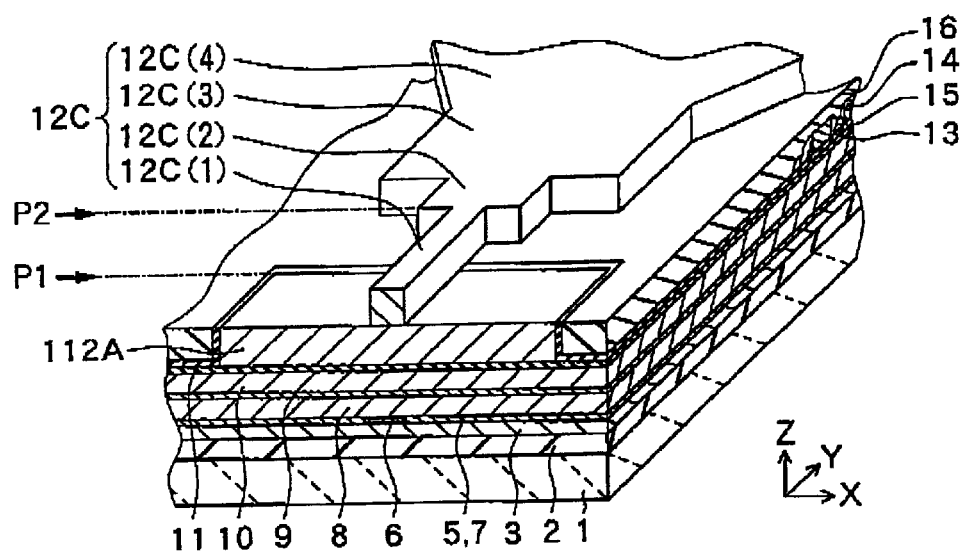
FIG. 13 is a perspective view corresponding to the cross sectional views shown in FIGS. 5A and 5B.
Figure 14:
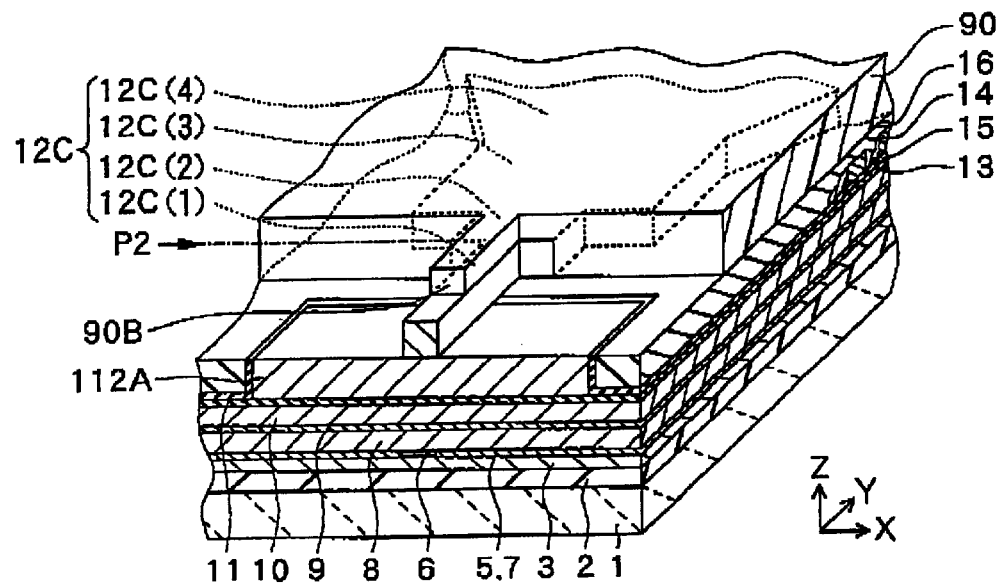
FIG. 14 is a perspective view corresponding to the cross sectional views shown in FIGS. 6A and 6B.

Next, as shown in FIGS. 5A, 5B and 13, the top magnetic layer 12C made of a magnetic material containing iron (Fe), nickel (Ni) and cobalt (Co) and having a high saturation magnetic flux density, e.g., an iron-nickel-cobalt alloy (CoNiFe, Co: 45 wt %, Ni: 80 wt %, Fe: 25 wt %), is selectively formed with a thickness of about 2.0 µm to 3.0 µm on a flat region extending from on the precursory magnetic layer 112A to on the magnetic path connecting portion 12B by means of fame plating, for example. At the same time when the top magnetic layer 12C is formed, the coil connecting wiring 12CH is formed on a region extending from on an exposed surface of the coil connecting portion 14S in the opening 16K to an external circuit (not shown). The top magnetic layer 12C constitutes a part of the top pole 12. A material containing at least one of chromium (Cr), boron (B), phosphorus (P) and copper, as well as the above-mentioned three metallic elements, may be used as a material of the top magnetic layer 12C and the like.

Figure 21:
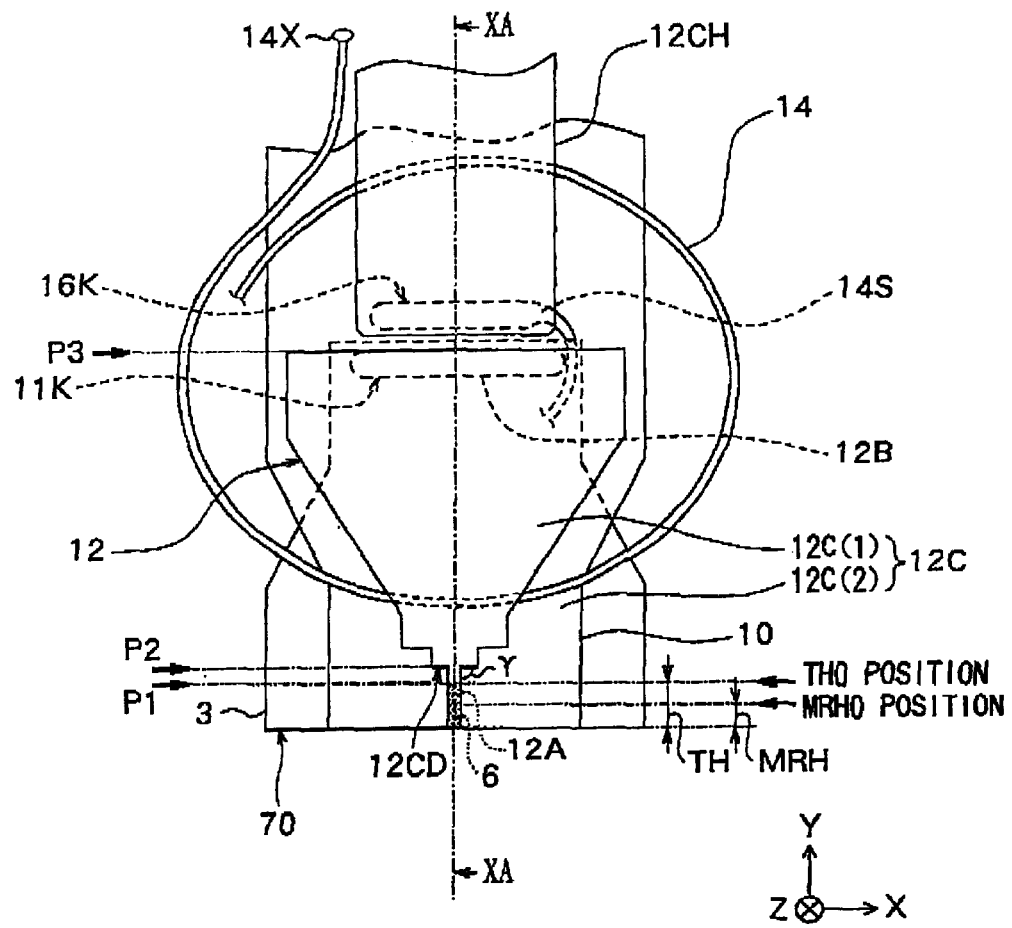
FIG. 21 is a plan view of a planar structure of a thin film magnetic head according to the first embodiment of the invention.

The top magnetic layer 12C is formed so as to include a first pole front end portion 12C(1), a middle portion 12C(2), a rear end portion 12C(3) and a yoke portion 12C(4), which are located in this order when viewed at the side to form the air bearing surface 70 in the following step (the left side in FIG. 5A), as shown in FIG. 21 to be described later, for example. The first pole front end portion 12C(1) has a uniform width (about 0.1 µm to 0.2 µm that defines a write track width on a recording medium. For example, the top magnetic layer 12C is formed so that a coupling position P2 (a second position) between the first pole front end portion 12C(1) and the middle portion 12C(2) is located rearward with respect to a position P1 (a first position) of a rear edge of the precursory magnetic layer 112A For example, the top magnetic layer 12C is also formed so that a position P3 (a third position) of a rear edge of the rear end portion 12C(3) matches a position of a rear edge of the magnetic path connecting portion 12B. A rearward portion of the top magnetic layer 12C is magnetically coupled to the bottom pole 10 with the magnetic path connecting portion 12B in between via the opening 11K. Structural features of the top magnetic layer 12C will be described later.

The first pole front end portion 12C(1) corresponds to a specific example of "a uniform width portion" of the thin film magnetic head according to the first aspect of the invention or the method of manufacturing a thin film magnetic head according to the first and second aspects of the invention, and corresponds to a specific example of "an etching mask" of the method of forming a magnetic layer pattern of the invention. The middle portion 12C(2), the rear end portion 12C(3) and the yoke portion 12C(4) correspond to a specific example of "a widened portion" of the thin film magnetic head or the method of mannufacturing the same according to the first and second aspects of the invention. The top magnetic layer 12C corresponds to a specific example of "a first magnetic layer portion" of the thin film magnetic head or the method of manufacturing the same according to the first and second aspects of the invention.

The top magnetic layer 12C is formed by means of frame plating in the following manner. First, an electrode film (not shown) for functioning as a seed layer for electroplating is formed with a thickness of about 70 µm by means of sputtering, for example. For instance, an iron-nickel-cobalt alloy (Co: 45 wt %, Ni: 30 wt %, Fe: 25 wt %) having a high saturation magnetic flux density, or the like is used as a material of the electrode film. Then, the electrode film is coated with, for example, a positive photoresist (hereinafter referred to as "a photoresist"), and thus a photoresist film (not shown) is formed. Then, a predetermined region of the photoresist film is selectively exposed to light by use of a mask (not shown) having a predetermined shape pattern. Then, a frame pattern (an outer frame) (not shown) for use in plating by means of frame plating is formed through the development of the exposed region of the photoresist film. The frame pattern has an opening corresponding to the above-mentioned exposed region. Then, the top magnetic layer 12C made of an iron-nickel-cobalt alloy (Co: 45 wt %, Ni: 30 wt %, Fe: 25 wt %) is formed by means of electroplating using the frame pattern as a mask and the electrode film formed in the preceding step as the seed layer. Finally, the frame pattern is removed The coil connecting wiring 12CH is formed by using the same material and method as the above-described material and method for forming the top magnetic layer 12C.

Next, as shown in FIGS. 6A, 6B and 14, a photoresist film 90 is selectively formed so as to coat a part of the top magnetic layer 12C, the coil connecting wiring 12CH and so on. For example, the photoresist film 90 is formed so that most of the photoresist film 90 coats a portion located rearward with respect to the coupling position P2 between the first pole front end portion 12C(1) and the middle portion 12C(2) of the top magnetic layer 12C and so that a portion (a portion 90B) of the photoresist film 90 projects frontward with respect to the above-mentioned coupling position P2 and pad lies on the first pole front end portion 12C(1).

Figures 7A, 7B:
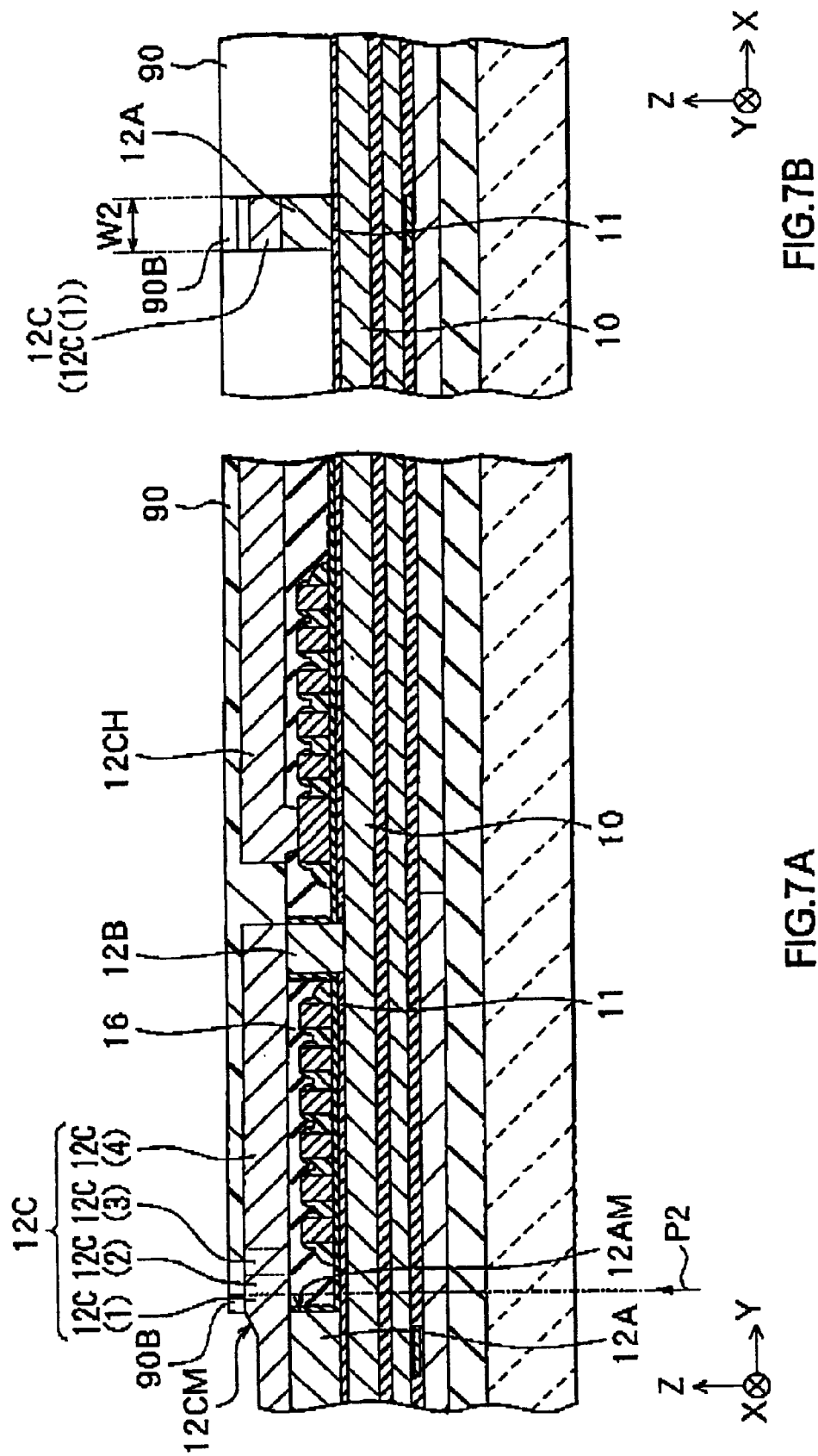
FIGS. 7A and 7B are cross section views for describing a step following the step of FIGS. 6A and 6B.

Next, the precursory magnetic layer 112A and a peripheral region around the layer 112A are selectively etched by means of, for example, RIE using both the top magnetic layer 12C and the photoresist film 90 as a mask. This etching process selectively removes the precursory magnetic layer 112A, the insulating film 16 and the like in a region located frontward with respect to the coupling position P2 between the first pole front end portion 12C(1) and the middle portion 12C(2) of the top magnetic layer 12C, and thus the second pole front end portion 12A for constituting a part of the top pole 12 is formed as shown in FIGS. 7A, 7B and 15. The use of RIE as an etching method for patterning the precursory magnetic layer 112A allows forming the second pole front end portion 12A with higher accuracy in a shorter time. The second pole front end portion 12A has a uniform width that defines the write track width on the recording medium, in the same manner as the first pole front end portion 12C(1) of the top magnetic layer 12C. The mask in itself, i.e., the top magnetic layer 12C and the photoresist film 90 in themselves, is also etched by the etching process for forming the second pole front end portion 12A, so that a film thickness of the mask decreases. Therefore, a thickness of a front portion of the first pole front end portion 12C(1) becomes less than a thickness of a rear portion of the first pole front end portion 12C(1), so that the first pole front end portion 12C(1) is stepped At this time, a frontward portion of the photoresist film 90 (the portion 90B) is also gradually etched, thus the position of a font edge of the portion 90B gradually shifts rearward, thus the amount of etching of a portion of the first pole front end portion 12C(1) near the portion 90B changes continuously, and therefore a step surface 12CM of a stepped portion of the first pole front end portion 12C(1) is inclined to a plane 16M of an underlayer (the insulating film 16).

The second pole front end portion 12A corresponds to a specific example of "a second magnetic layer portion" of the thin film magnetic head or the method of manufacturing the same according to the first aspect of the invention, and corresponds to a specific example of "a magnetic layer pattern" of the method of forming a magnetic layer pattern of the invention. The top pole 12 comprising the second pole front end portion 12A the magnetic path connecting portion 12B and the top magnetic layer 12C corresponds to a specific example of "a first magnetic layer" of the thin film magnetic head or the method of manufacturing the same according to the first and second aspects of the invention. The first pole front end portion 12C(1) of the top magnetic layer 12C and the second pole front end portion 12A correspond to a specific example of "a track width defining portion" of the thin film magnetic head according to the second aspect of the invention.

For the etching process using RIE for forming the second pole front end portion 12A, for example, it is particularly preferable that an etching gas containing at least one of chlorine ($Cl_2$), boron trichloride ($BCl_3$), hydrogen chloride (HCl), carbon tetrafluoride ($CF_4$), sulfur hexafluoride ($SF_6$) and boron tribromide ($BBr_3$) and an additive such as hydrogen ($H_2$), oxygen ($O_2$), nitrogen ($N_2$) or argon (Ar) be used and that the processing temperature lie between 50 and 300 degrees inclusive. The etching process using RIE at such a temperature in such a gaseous atmosphere allows accelerating a chemical reaction of the etching process for, in particular, the precursory magnetic layer 112A made of iron nitride, and thus permits further reducing the time required to form the second pole front end portion 12A.

Furthermore, the respective parts of the write gap layer 11 and the bottom pole 10 are etched by about 0.3 $\mu$m to 0.4 $\mu$m by means of, for example, RIE using the top magnetic layer 12C and the photoresist film 90 as the mask. This etching process selectively removes and trenches the write gap layer 11 and the bottom pole 10 in the region located frontward with respect to the coupling position P2 between the first pole front end portion 12C(1) and the middle portion 12C(2) of the top magnetic layer 12C, except for a region where the first pole front end portion 12C(1) is located. By the etching process, a pole portion 100 having a trim structure is formed as shown in FIGS. 8A, 8B and 16. The pole portion 100 comprises the first pole front end portion 12C(1) of the top magnetic layer 12C, a portion of the write gap layer 11, the second pole front end portion 12A, and a portion of the bottom pole 10 corresponding to the second pole front end portion 12A and so on. The above-mentioned portions constituting the pole portion 100 have substantially the same width. The use of RIE as an etching method allows forming the pole portion 100 with higher accuracy in a shorter time.

For the etching process using RIE for forming the pole portion 100, for example, it is particularly preferable that a mixed gas of chlorine and boron trichloride be used as an etching gas and that the processing temperature lie between 100 and 200 degrees inclusive. The etching process using RIB at such a temperature in such a gaseous atmosphere allows further reducing the time required to form the pole portion 100.

Figures 9A, 9B:
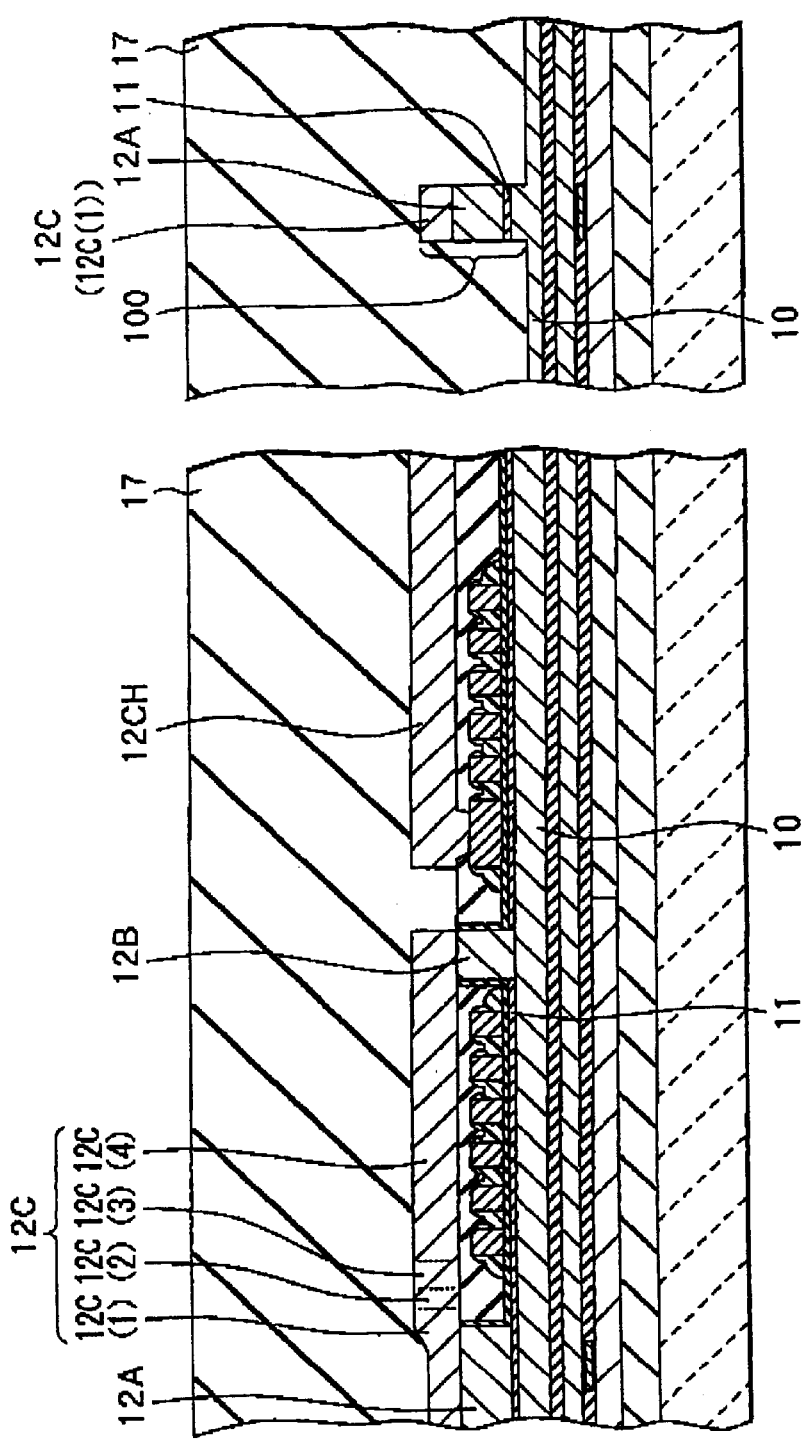
FIGS. 9A and 9B are cross sectional views for describing a step following the step of FIGS. 8A and 8B.

Next, as shown in FIGS. 9A and 9B, an overcoat layer 17 made of an insulating material, e.g., an inorganic insulating material such as alumina, is formed with a thickness of about 20 $\mu$m to 40 $\mu$m so as to coat the overall surface. A structure around the top magnetic layer 12C is as shown in FIG. 17.

Figures 10A, 10B:
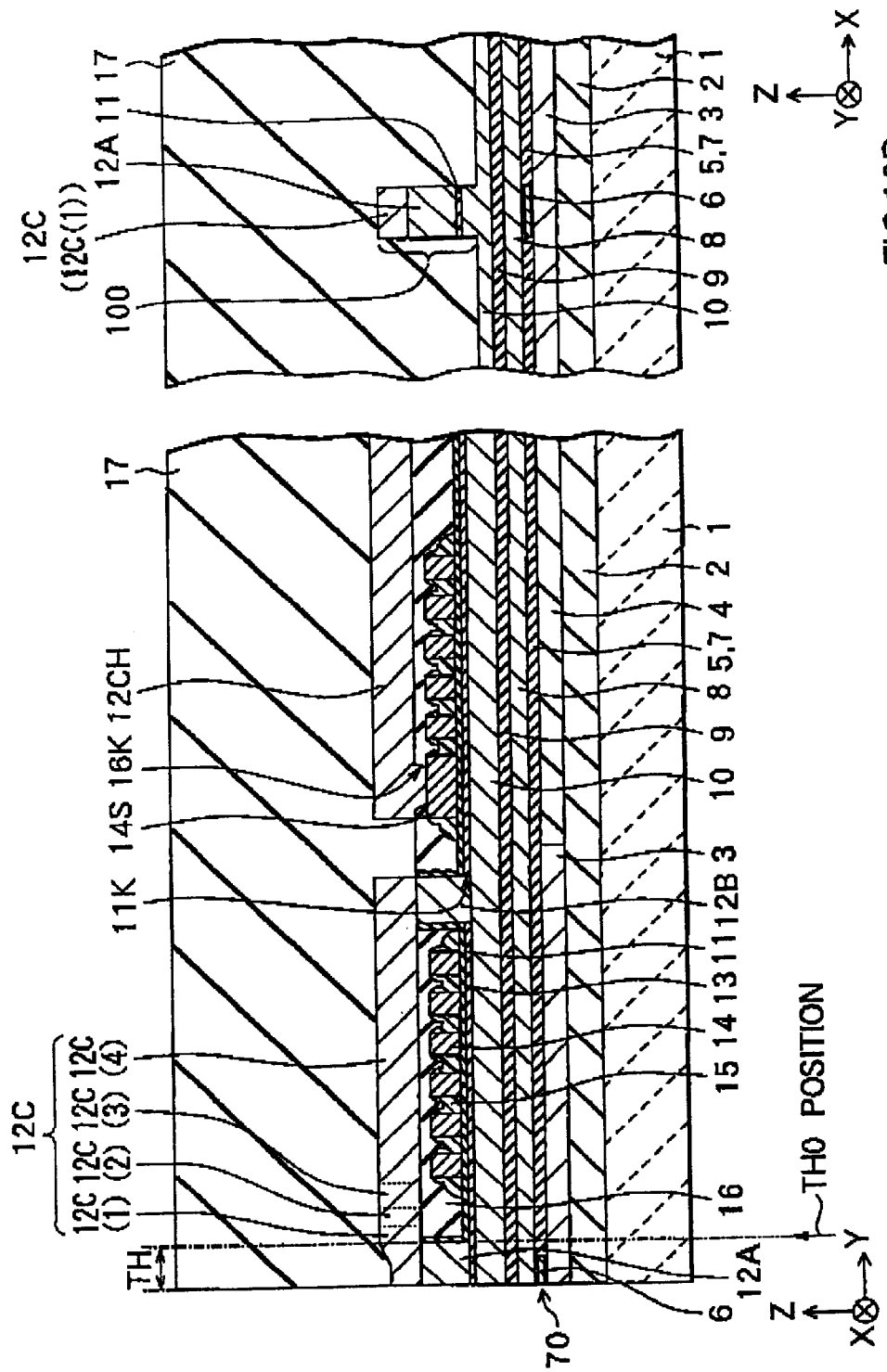
FIGS. 10A and 10B are cross sectional views for describing a step following the step of FIGS. 9A and 9B.
Figure 11:
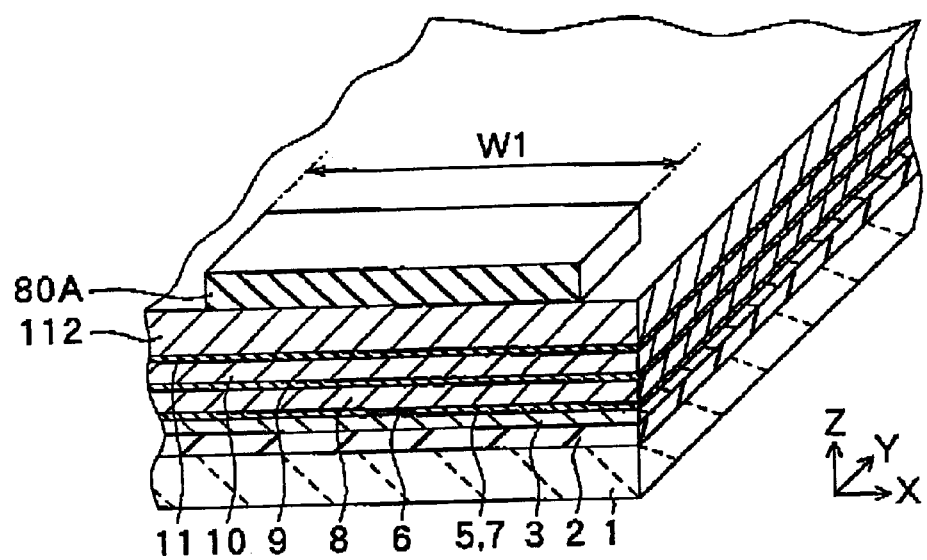
FIG. 11 is a perspective view corresponding to the cross sectional views shown in FIGS. 1A and 1B.

Finally, as shown in FIGS. 10A and 10B, the air bearing surface 70 of the recording head and the reproducing head is formed through the steps of machining and polishing, and thus a thin film magnetic head is completed. The first pole front end portion 12C(1) of the top magnetic layer 12C and the second pole front end portion 12A are exposed to the air bearing surface 70.

Functions and Advantages of Method of Manufacturing Thin Film Magnetic Head

Next, the description is given with regard to functions and advantages of the method of manufacturing a thin film magnetic head according to the embodiment.

Figures 19A, 19B:
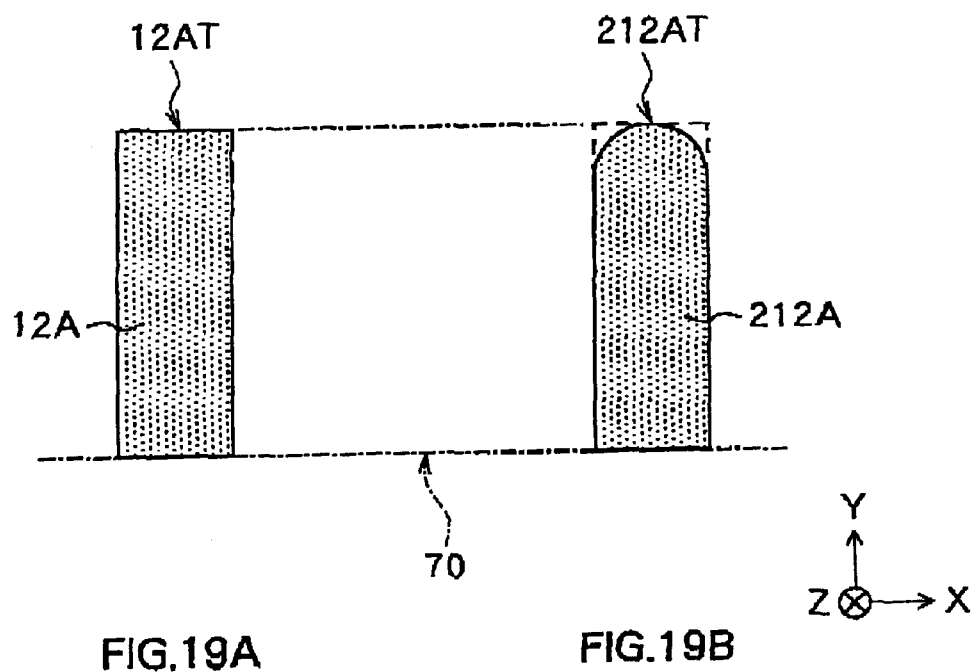
FIGS. 19A and 19B are illustrations for describing a function of the method of manufacturing a thin film magnetic head according to the first embodiment of the invention.

In the embodiment, the top magnetic layer 12C is formed on the precursory magnetic layer 112A which is formed so that the edge 112AT extending in the width direction of the rear edge portion of the layer 112 forms the straight line, in such a manner that the Coupling position P2 (the second position) between the first pole front end portion 12C(1) and the middle portion 12C(2) is located rearward with respect to the position P1 (the first position) of the rear edge of the precursory magnetic layer 112A, and thereafter the second pole front end portion 12A is formed by etching and patterning the precursory magnetic layer 112A by use of the first pole front end portion 12C(1) as a mask. In this case, the second pole front end portion 12A can be formed with higher accuracy for the following reason FIGS. 19A and 19B are illustrations for describing a function of the method of manufacturing a thin film magnetic head according to the embodiment. FIG. 19A shows an enlarged view of a planar structure of the second pole front end portion 12A formed by the method of manufacturing a thin film magnetic head accord to the embodiment, and FIG. 19B shows an enlarged view of a planar structure of a second pole front end portion 212A formed by a method of manufacturing a thin film magnetic head of a comparison (e.g., frame plating). To manufactured a thin film magnetic head, it is particularly necessary to accurately, uniquely determine the reference position for defining the throat height, namely, the throat height zero position (the TH0 position), in order to control the throat height (TH) that is one of factors that determine the performance of the recording head. However, the comparison shown in FIG. 19B has a problem: that is, when frame plating is used to form the second pole front end portion 212A having a locally minimum width (e.g., 0.1 $\mu$m), an edge 212AT extending in the width direction of a rear edge portion of the portion 212A becomes rounded, so that a width of the second pole front end portion 212A becomes smaller in the rearward portion thereof. The reason is as follows: that is, when an attempt is made to perform selective light exposure of a region of a photoresist film having a locally minimum width in the step of forming a photoresist pattern for serving as a plating frame corresponding to a planar shape of the second pole front end portion 212A, the region is not sufficiently exposed to light at and near the edge thereof (more particularly, at the corner portions thereof, and this insufficient exposure results in a smaller exposed region of the photoresist film, so that the photoresist pattern cannot be formed with accuracy. In this case, it becomes impossible to uniquely determine the position (the throat height zero position) of the front edge of the insulator (the insulating films 13, 15 and 16) for coating the thin film coil 14, at the position of the rear edge of the second pole front end portion 212A.

On the other hand, in the embodiment, the second pole front end portion 12A is formed as a part of the precursory magnetic layer 112A (see FIGS. 2A, 2B and 12) which is formed so that the edge 112AT extending in the width direction of the rear edge portion forms the straight line, and therefore a part of the edge 112AT remains as it is and forms an edge 12AT of the second pole front end portion 12A as shown in FIG. 19A. Accordingly, the second pole front end portion 12A can be formed so as to have a locally minimum uniform width (e.g., 0.1 $\mu$m) and have the straight edge 12AT. As distinct from the comparison, the embodiment makes it possible to uniquely determine the position (the throat height zero position) of the front edge of the insulator (the insulating films 13, 15 and 16) at the position of a rear edge of the second pole front end portion 12A.

Incidentally, the above-described method of forming the second pole front end portion 12A and the advantage thereof can be applied not only to the formation of the second pole front end portion 12A for serving as a component of the thin film magnetic head, but also to the formation of a magnetic layer pattern having a locally minimum width in various types of fields other than the thin film magnetic head.

In the embodiment RIE is used as a method for etching the basic magnetic layer 112 in particular, so that an etched edge surface of the formed precursory magnetic layer 112A is a plane. More particularly, etching takes place so that the etched edge surface of the precursory magnetic layer 11A is perpendicular to the plane of the write gap layer 11, and thus a rear edge surface 12AM (see FIGS. 7A, 7B and 15) of the second pole front end portion 12A to be formed as a part of the precursory magnetic layer 112A also is a plane and becomes perpendicular to the plane of the write gap layer 11. In this case, it becomes easier to determine the throat height zero position.

The use of RIE as an etching method allows forming the precursory magnetic layer 112A with higher accuracy in a shorter time, as compared to the use of ion milling. The advantages of improving the forming accuracy and reducing the forming time, which are obtained when RIE is used as the etching method, hold true for the formation of the second pole front end portion 12A, the bottom pole 10 and so forth. More particularly, the etching process using RIE under the right etching conditions makes it possible to further reduce the time required to form the second pole front end portion 12A and so on.

In the embodiment, as shown in FIGS. 5A and 5B, the top magnetic layer 12C for functioning as a mask for etching the precursory magnetic layer 112A is formed so that the coupling position P2 (the second position) between the first pole front end portion 12C(1) and the middle portion 12C(2) is located rearward with respect to the position (the first position P1) of the rear edge of the precursory magnetic layer 112A, and therefore this also contributes to the improved accuracy in forming the second pole front end portion 12A for the following reason. FIGS. 20A and 20B are illustrations for describing a function associated with the position at which the top magnetic layer 12C is formed. FIG. 20A shows a planar structure of the second pole front end portion 12A and the top magnetic layer 12C in the case where the coupling position P2 between the first pole front end portion 12C(1) and the middle portion 12C(2) is located rearward with respect to the position of the rear edge of the second pole front end portion 12A as in the case of the embodiment. FIG. 20B shows a planar structure of the second pole front end portion 12A and the top magnetic layer 12C in the case where the coupling position P2 between the first pole front end portion 12C(1) and the middle portion 12C(2) is matched to the position of the rear edge of the second pole front end portion 12A In the case shown in FIG. 20B, in the process of forming the top magnetic layer 12C, a corner portion 12CN of a coupling portion between the first pole front end portion 12C(1) and the middle portion 12C(2) becomes rounded due to the same cause as the above-mentioned cause of deterioration in the accuracy in forming a photoresist pattern for forming the second pole front end portion 12A, and thus a width of the second pole front end portion 12A formed by the etching process using the top magnetic layer 12C as a mask becomes greater in the rearward portion thereof, on the other hand, in the case shown in FIG. 20A, even if the corner portion 12CN becomes rounded, the second pole front end portion 12A having a uniform width can be formed by the etching process using as a mask a portion of the first pole front end portion 12C(1) having a uniform width.

In the embodiment, the top magnetic layer 12C is formed on the plane of the write gap layer 11, and therefore the embodiment allows forming a photoresist pattern for forming the top magnetic layer 12C with higher accuracy, as distinct from the related art in which a top pole 112 is formed on an underlayer having an uneven structure. Accordingly, the top magnetic layer 12C can be formed with higher accuracy even through the use of frame plating.

In the embodiment, a magnetic material containing iron, nickel and cobalt, e.g., an iron-nickel-cobalt alloy (CoNiFe), is used as a material of the top magnetic layer 12C. In general, the etching rate for the iron-nickel-cobalt alloy is lower than the etching rate for Permalloy, iron nitride or the like because the iron-nickel-cobalt alloy is a magnetic material that is harder than a magnetic material such as Permalloy or nickel iron. Therefore, in the etching process for patterning the precursory magnetic layer 112A, the amount of etching of the top magnetic layer 12C (the first pole front end portion 12C(1)) can be smaller than the amount of etching of the precursory magnetic layer 112A, so that a film decrease of the top magnetic layer 12C (the first pole font end portion 12C(1)) can be prevented. To form the top magnetic layer 12C, it is, however, necessary to ensure a necessary and sufficient thickness of the top magnetic layer 12C after allowing for "a film decrease" in the etching process. The amount of etching of the top magnetic layer 12C (the first pole front end portion 12C(1)) (e.g., the amount of film decrease thereof) can be adjusted by changing the etching conditions such as the type of etching gas and the processing temperature.

Preferably, the iron-nickel-cobalt alloy is used as the material of the top magnetic layer 12C only when a film thickness of the top magnetic layer 12C to be formed is appropriately thin (e.g., 3.0 µm or less). The reason is as follows: for example, when the iron-nickel-cobalt alloy is used as the material to form the top magnetic layer 12C having a thickness of more than 3.0 µm, the iron-nickel-cobalt alloy partly cracks or delaminates due to storage of internal stress, and it is therefore difficult to normally form the top magnetic layer 12C. In the embodiment, the top magnetic layer 12C is formed so as to have a thickness of about 2.0 µm to 3.0 µm, and therefore, even when a hard magnetic material such as the iron-nickel-cobalt alloy is used, the above-mentioned "cracking" or "delamination" or the like can be avoided, so that the top magnetic layer 12C can be formed with stability.

In the embodiment, RIE is used as the etching method fir forming the pole portion 100, and therefore the pole portion 100 can be formed with higher accuracy in a shorter time, as is the case with the above-described second pole front end portion 12A. Also in this case, the time required to form the pole portion 100 can be further reduced through the optimization of the etching conditions.

In the embodiment, an organic insulating material such as a photoresist exhibiting fluidity during heating is used as a material of the insulating film 15 for filling the gap between the windings of the thin film coil 14 (including the coil connecting portion 14S), and therefore the insulating film 15 can fill up the gap between the windings of the thin film coil 14 and the like and can thus ensure that the windings are insulated, as distinct from an insulating film made of an inorganic insulating material such as alumina that does not exhibit fluidity during heating.

In the embodiment, an inorganic insulating material such as alumina is used as a material of the insulating film 16, and therefore the insulating film 16 can prevent the occurrence of clogging of a polishing surface of a CMP polishing disc and can form a smoother polished surface, as distinct from an insulating film made of a soft insulating material such as a photoresist.

Structure of Thin Film Magnetic Head

Next, the planar structure of the thin film magnetic head according to the embodiment will be described with reference to FIGS. 10A, 18 and 21.

FIG. 21 shows a schematic representation of the planar structure of the thin film magnetic head manufactured by the method of manufacturing a thin film magnetic head according to the embodiment. FIG. 21 does not show the insulating films 13, 15 and 16, the overcoat layer 17 and so on. The thin film coil 14, only a part of its outermost periphery, is shown in FIG. 21. FIG. 10A corresponds to a cross section viewed in the direction of the arrows along the line XA—XA of FIG. 21, The expressions of the X-axis, Y-axis and Z-axis directions in FIG. 21 are the same as the expressions thereof in FIGS. 1A to 18.

The position of the rear edge of the second pole front end portion 12A, i.e., the position of the front edge of the insulator (the insulating films 13, 15 and 16) for coating the thin film coil 14, is the reference position for determining the throat height (TH), i.e., the throat height zero position (the TH0 position). The throat height (TH) is defined as a length between the position (the TH0 position) of the front edge of the insulating film 13 and the air bearing surface 70. "An MRH0 position" in FIG. 21 represents the position of the rear edge of the MR film 6, i.e., an MR height zero position. An MR height (MRH) corresponds to a length between the MR height zero position and the air bearing surface 70. For example, the throat height zero position (the TH0 position) substantially matches the MR height zero position (the MRH0 position).

As described above, for example, the top pole 12 comprises the second pole front end portion 12A, the magnetic path connecting portion 12B and the top magnetic layer 12C, which are separately formed. In other words, the top pole 12 comprises a collection of these portions.

For example, the second pole front end portion 12A has a rectangular planar shape and has a uniform width throughout all of the portion 12A.

As described above, the top magnetic layer 12C includes the first pole front end portion 12C(1), the middle portion 12C(2), the rear end portion 12C(3) and the yoke portion 12C(4), which are located in this order when viewed at the side of the air bearing surface 70. Of these portions, the first pole front end portion 12C(1), the middle portion 12C(2) and the rear end portion 12C(3) have a rectangular planar shape, for example. The first pole front end portion 12C(1) has the same uniform width as the width of the second pole front end portion 12A and has a greater length than a length of the second pole font end portion 12A. The middle portion 12C(2) has a greater width than the width of the first pole front end portion 12C(1), for example, and the rear end portion 12C(3) has a greater width than the width of the middle portion 12C(2), for example. That is, the coupling portion between the first pole front end portion 12C(1) and the middle portion 12C(2) is stepped in the width direction The yoke portion 12C(4) serves to contain a magnetic flux generated by the thin film coil 14 and has a greater width than the width of the rear end portion 12C(3). For example, the width of the yoke portion 12C(4) is substantially uniform in the rearward portion thereof and is gradually narrower in the frontward portion thereof at a position closer to the air bearing surface 70. The centers of the portions constituting the top magnetic layer 12C match one another in the width direction.

As described above, the second pole front end portion 12A and the first pole front end portion 12C(1) constitute a portion for defining the write track width on the recording medium. That is, the portion for defining the write track width has a two-layer structure. For example, both the second pole front end portion 12A and the first pole front end portion 12C(1) are exposed to the air bearing surface 70.

For instance, the position of a step surface 12CD of the coupling portion between the first pole front end portion 12C(1) and the middle portion 12C(2) is located rearward with respect to the TH0 position. In the above-mentioned coupling portion, an angle γ of a corner portion at which a side edge surface of the first pole front end portion 12C(1) crosses the step surface 12CD is equal to 90 degrees, for example. The angle γ of the corner portion is not necessarily lifted to 90 degrees. Preferably, the angle γ lies between 90 and 120 degrees inclusive, for example. The reason is as follows: the angle γ within the above-mentioned range allows smoothing the flow of a magnetic flux from the middle portion 12C(2) into the pole front end portion 12C(1).

The second pole front end portion 12A lies on the plane of the write gap layer 11. The top magnetic layer 12C lies on the plane extending from on the second pole front end portion 12A to on the magnetic path connecting portion 12B. The top magnetic layer 12C is magnetically coupled to the bottom pole 10 with the magnetic path connecting portion 12B in between in the opening 11K That is, the top pole 12 (the second pole font end portion 12A, the magnetic path connecting portion 12B and the top magnetic layer 12C) is connected to the bottom pole 10, and thus a propagation path of a magnetic flux, namely, a magnetic pat, is formed.

As described above, the thin film coil 14 comprises the winding having a spiral planar shape. For example, the coil connecting portion 14S and a terminal 14X are formed at the inner and outer terminal ends of the thin film coil 14, respectively. Both the coil connecting portion 14S and the terminal 14X are integral with the thin film coil 14. The coil connecting wiring 12CH is formed on the coil connecting portion 14S, and the thin film coil 14 is electrically connected to the coil connecting wiring 12CH through the coil connecting portion 14S. Both the terminal 14X and a rear end portion (not shown) of the coil connecting with 12CH are connected to an external circuit (not shown) so that the external circuit can feed a current through the thin film coil 14. As shown in FIG. 10A, the the film coil 14 and the like are provided in a rearward region corresponding to a thickness of the second pole front end portion 12A, for instance.

Functions and Advantages of Thin Film Magnetic Head

Next, functions and advantages of the structure of the thin film magnetic head according to the embodiment will be described with reference to FIGS. 10A, 18 and 21.

Firstly, the brief description is now given with regard to the basic operation of the thin film magnetic head, that is, the recording operation of data on the recording medium and the reproducing operation of data from the recording medium.

The thin film magnetic head according to the embodiment operates in the following manner. In the recording operation of information, the external circuit (not shown) feeds a current through the thin film coil 14, and thus the thin film coil 14 generates a magnetic flux according to the current.

The generated magnetic flux propagates through the top magnetic layer 12C, that is, the yoke portion 12C(4), the rear end portion 12C(3), the middle portion 12C(2) and the first pole front end portion 12C(1) in sequence, and then the magnetic flux reaches to a tip portion of the first pole front end portion 12C(1) close to the air bearing surface 70. After the magnetic flux propagates to the first pole front end portion 12C(1), a part of the magnetic flux also propagates to the second pole front end portion 12A magnetically coupled to the first pole front end portion 12C(1), and then reaches to a tip portion of the second pole front end portion 12A. After reaching to the respective tip portions of the first pole front end portion 12C(1) and the second pole front end portion 12A, the magnetic flux generates a signal magnetic field for recording to the outside near the write gap layer 11. The signal magnetic field partly magnetizes a magnetic recording medium, thereby enabling information to be recorded on the magnetic recording medium. To ensure superior overwrite characteristics, it is necessary that the propagation of magnetic flux be smoothed in the process of propagation of magnetic flux so that a sufficient magnetic flux reaches to the tip portion of the second pole front end portion 12A, in particular.

In the reproducing operation, a sense current is fed through the MR film 6 of the reproducing head. Since the resistance of the MR film 6 changes according to a reproducing signal magnetic field from the magnetic recording medium, information recorded on the magnetic recording medium can be read out by detecting the resistance change according to a change in the sense current.

In the embodiment, the portion having a uniform width for defining the write track width on the recording medium has the two-layer structure (the second pole front end portion 12A and the first pole front end portion 12C(1)), and therefore the throat height (TH) can be adjusted by changing only the length of the second pole front end portion 12A without changing the structure of the top magnetic layer 12C constituting a main propagation path of a magnetic flux.

In the embodiment, the portion having a uniform width for defining the write track width on the recording medium has the two-layer structure (the second pole front end portion 12A and the first pole front end portion 12C(1)), an iron-nickel-cobalt alloy is used as a material of the first pole front end portion 12C(1) that is a top layer portion of the two-layer at and nickel iron is used as a material of the second pole front end portion 12A that is a bottom layer portion of the two-layer structure. Therefore, superior overwrite characteristics can be ensured for the following reason. That is, in general the iron-nickel-cobalt alloy to be used as the material of the first pole front end portion 12C(1) can be used as an etching mask because of its properties of high hardness as described above, whereas it is difficult to control the composition of the iron-nickel-cobalt alloy -for plating. When the composition is insufficiently controlled, variations in magnetic flux density may occur in part in the iron-nickel-cobalt alloy, and thus variations may occur in characteristics of propagation of magnetic flux. On the other hand, the composition of the nickel iron to be used as the material of the second pole front end portion 12A can be controlled with relative ease by using sputtering as a method of forming the second pole front end portion 12A. Therefore, even if the composition of the iron-nickel-cobalt alloy somewhat varies and thus variations occur in the characteristics of propagation of magnetic flux through the first pole front end portion 12C(1), the second pole front end portion 12A made of the nickel iron whose composition is properly controlled ensures that a magnetic flux smoothly propagates through the second pole front end portion 12A, so that a sufficient magnetic flux reaches to the tip portion of the second pole front end portion 12A The above-mentioned advantage becomes more marked, particularly when a magnetic material having a higher saturation magnetic flux density than a saturation magnetic flux density of a magnetic material (an iron-nickel-cobalt alloy) for constituting the top magnetic layer 12C is used as a magnetic material iron nitride) for constituting the second pole front end portion 12A.

In the embodiment, magnetic materials having a high saturation magnetic flux density (e.g., iron nitride and an iron-nickel-cobalt alloy) are used as both materials of the second pole front end portion 12A and the top magnetic layer 12C. Even when a pole width is locally minimized in order to increase a recording density, the phenomenon of saturation of magnetic flux is therefore prevented, so that the propagation of magnetic flux becomes smoothed. Accordingly, a sufficient amount of magnetic flux is supplied to the respective tip portions of the second pole front end portion 12A and the first pole front end portion 12C(1) of the top magnetic layer 12C, so that superior overwrite characteristics can be ensured.

In the embodiment, the widths of the yoke portion 12C(4), the rear end portion 12C(3), the middle portion 12C(2) and the first pole front end portion 12C(1), which constitute the top magnetic layer 12C, decrease in this order, so that the magnetic volumes of the portions 12C(4), 12C(3), 12C(2) and 12C(1), namely, the amounts of magnetic flux that can be contained in these portions, also decrease in the same order. Therefore, in the process in which a magnetic flux flowing into the top magnetic layer 12C propagates from the yoke portion 12C(4) to the first pole front end portion 12C(1), the magnetic flux gradually converges according to a gradual decrease in the magnetic volume, so that the phenomenon of saturation of magnetic flux is prevented in the process of propagation of magnetic flux. Accordingly, a sufficient amount of magnetic flux is supplied to the first pole front end portion 12C(1) and the second pole front end portion 12A, so that this also contributes to the ensured superior overwrite characteristics.

In the embodiment, the thickness of the frontward portion of the first pole front end portion 12C(1) of the top magnetic layer 12C is less than the thickness of the rearward portion of the first pole front end portion 12C(1), so that the first pole front end portion 12C(1) is stepped in the thickness direction between the frontward and rearward portions. In this case, a magnetic flux propagating through the first pole front end portion 12C(1) gradually converges according to a decrease in the magnetic volume caused by a decrease in "thickness", as in the case of the above-mentioned decrease in the magnetic volume caused by the decrease in "width", so that lie phenomenon of saturation of magnetic flux is prevented More particularly, the step surface 12CM of the above-mentioned stepped portion forms an inclined surface, so that the flow of magnetic flux through the first pole front end portion 12C(1) can become smoothed near the inclined surface portion.

In the embodiment, a boundary surface between the second pole front end portion 12A and the insulating film 16 is a plane, and therefore the embodiment allows uniquely determining the position of the front edge of the insulator (the insulating films 13, and 16) for coating the thin film coil 14, namely, the TH0 position, as distinct from the case where the above-mentioned boundary surface is not flat.

Modifications of First Embodiment

In the embodiment, the coupling position P2 (the second position) between the first pole front end portion 12C(1) and the middle portion 12C(2) is located rearward with respect to the position P1 (the first position) of the rear edge of the precursory magnetic layer 11A but the invention is not necessarily limited to this embodiment. The positions P2 and P1 may be matched to each other, if the corner portion 12CN (see FIGS. 20A and 20B) can avoid the phenomenon of becoming rounded and thus the accuracy in forming the top magnetic layer 12C can be sufficiently ensured.

In the embodiment, iron nitride or an amorphous alloy (a cobalt-iron alloy or the like) is used as a material of the basic magnetic layer 112 (the second pole front end portion 12A), but the invention is not necessarily limited to this embodiment. For example, Permalloy (e.g., Permalloy having the composition of 45 wt % Ni and 55 wt % Fe) may be used, or a magnetic material containing iron, nickel and cobalt (e.g., an iron-nickel-cobalt alloy) may be used. To properly control the composition of the basic magnetic layer 112 so as to ensure good characteristics of propagation of magnetic flux through the second pole front end portion 12A to be finally formed, it is preferable that the iron nitride or the amorphous alloy be used as the material of the basic magnetic layer 112. It is not always necessary to use sputtering and etching as a method of forming the basic magnetic layer 112, and, for example, frame plating may be used.

In the embodiment, after forming the basic magnetic layer 112, the basic magnetic layer 112 is patterned by means of etching to form the precursory magnetic layer 112A, but the invention is not necessarily limited to this embodiment, For example, frame plating rather than etching may be used to form the precursory magnetic layer 112A. Even when frame plating is used, the precursory magnetic layer 112A is, of course, formed so that the edge 112AT extending in the width direction of the rear edge portion of the precursory magnetic layer 112A forms the straight line.

In the embodiment, an iron-nickel-cobalt alley is used as a material of the top magnetic layer 12C, but the invention is not necessarily limited to this embodiment. For example, Permalloy (e.g., Permalloy having the composition of 45 wt % Ni and 55 wt % Fe), iron nitride or an amorphous alloy (e.g., a cobalt-iron alloy) may be used. To reduce the amount of film decrease of the top magnetic layer 12C for functioning as a mask for patterning the precursory magnetic layer 112A, it is preferable that the iron-nickel-cobalt alloy be used as the material of the top magnetic layer 12C as described by referring to the above-mentioned embodiment. It is not always necessary to use frame plating as a method of forming the top magnetic layer 12C, and, for example, sputtering and etching may be used in the same manner as the method of forming the bottom pole 10 and the like.

In the embodiment, magnetic materials having a high saturation magnetic flux density are used as both materials of the basic magnetic layer 112 (the second pole front end portion 12A) and the top magnetic layer 12C. The saturation magnetic flux densities of the magnetic materials to be used for forming the above-mentioned layers 112 (12A) and 12C can be optionally set. More specifically, for example, two types of magnetic materials having an equal saturation magnetic flux density may be used as the materials of the layers 112 (12A) and 12C, or two types of magnetic materials having different saturation magnetic flux densities may be used as the materials thereof In either of these cases, about the same advantages as the advantages of the above-described embodiment can be obtained. When the magnetic materials having different saturation magnetic flux densities are used, for example, it is preferable for the following reason that the saturation magnetic flux density of the magnetic material for constituting the basic magnetic layer 112 be higher than the saturation magnetic flus density of the magnetic material for constituting the top magnetic layer 12C. That is, in general, the operation of the thin film magnetic head (e.g., the recording of information, etc) is mainly executed by the action of a magnetic flux propagating through the second pole front end portion 12A which is closer to the write gap layer 11 than the first pole front end portion 12C(1) of the top magnetic layer 12C. When two types of magnetic materials having different saturation magnetic flux densities are used, it is therefore necessary to construct a profile of magnetic flux (hereinafter sometimes referred to as "a saturation magnetic flux density profile") so that, in the uniform width portion (the second pole front end portion 12A and the first pole front end portion 12C(1)) for defining the write track width on the recording medium, the second pole front end portion 12A for functioning as a bottom layer region of the uniform width portion has a higher saturation magnetic flux density than the fist pole front end portion 12C(1) for functioning as a top layer region of the uniform width portion. Conversely, two types of magnetic materials having different saturation magnetic flux densities are selectively used to form the uniform width portion having the two-layer structure, and thus the saturation magnetic flux density profile of the uniform width portion can be optionally adjusted.

In the embodiment, the stepped portion is provided in the first pole front end portion 12C(1) of the top magnetic layer 12C by utilizing an etching effect on a mask (a photoresist film) for the etching process for forming the second pole front end portion 12A or the like, but the invention is not necessarily limited to this embodiment, and the stepped portion may be eliminated. In this case, for example, the etching conditions (an etching gas, an etching temperature, etc.) are adjusted so that the etching rate for the top magnetic layer 12C (the first pole front end portion 12C(1)) is much lower than the etching rate for a peripheral region around the top magnetic layer 12C, thereby preventing the top magnetic layer 12C from being etched.

In the embodiment, a method of forming the bottom pole 10 involves forming a precursory layer (e.g., an iron layer) by means of sputtering and then patterning the precursory layer by means of etching, but the invention is not necessarily limited to this embodiment, and frame plating may be used. In this case, Permalloy having the composition of 80 wt % Ni and 20 wt % Fe, the composition of 45 wt % Ni and 55 wt % Fe, or the like, for example, may be used as a material of the bottom pole 10.

In the embodiment, electroplating is used as a method of forming the bottom shield layer 4 and the top shield layer 8, but the invention is not necessarily limited to this embodiment. For example, the same method as the method of forming the bottom pole 10 and the like, i.e., sputtering and etching, may be used as the method of forming the bottom shield layer 4 and/or the top shield layer 8. In this case, iron nitride, an amorphous alloy (e.g., a cobalt-iron alloy, a zirconium-cobalt-iron alloy oxide or a zirconium-iron alloy nitride) or the like, as well as the above-mentioned Permalloy, may be used as a material of the bottom shield layer 4 and the top shield layer 8. The use of the same method as the method of forming the bottom pole 10 and the like lows forming the bottom shield layer 3 and the top shield layer 8 with higher accuracy in a shorter time, and therefore this also contributes to the reduced time for manufacturing the whole thin film magnetic head.

In the embodiment, a photoresist is used as a material of the insulating film 15, but the invention is not necessarily limited to this embodiment, and, for example, a polyimide resin, SOG (spin on glass) or the like exhibiting fluidity during heating similarly to the photoresist may be used. Also, in this case, the same advantages as the advantages of the above-described embodiment can be obtained.

In the embodiment, the insulating film 15 is formed by film the gap between the windings of the thin film coil 14 with a flowing photoresist by means of heat treatment, but the invention is not necessarily limited to this embodiment, and, for example, the insulating film 15 made of alumina may be formed by means of CVD (chemical vapor deposition). The use of CVD allows fining the gap between the windings of the thin film coil 14 with alumina without the need for heat treatment or the like. When the insulating film 15 made of alumina is formed by means of CVD, the insulating film 15 may also function as the insulating film 16 to be formed in the following step. In this case, the number of manufacturing steps can become smaller than the number of manufacturing steps required to separately form the insulating films 15 and 16.

In the embodiment, alumina is used as a material of the write gap layer 11 and sputtering is used as a method of forming the write gap layer 11, but the invention is not necessarily limited to this embodiment. Besides alumina, an inorganic insulating material such as aluminum nitride (AlN), silicon oxide or silicon nitride may be used as the material of the write gap layer 11, or a nonmagnetic metal such as tantalum (Ta), titanium tungsten (WTi) or titanium nitride (TiN) may be used. Besides sputtering, CVD (chemical vapor deposition) may be used as the method of forming the write gap layer 11. The write gap layer 11 is formed by using this method, and thus the gap layer can be prevented from containing a pinhole or the like, so that the leakage of magnetic flux through the write gap layer 11 can be avoided. This advantage is effective, particularly when the thickness of the write gap layer 11 is reduced.

Figure 22:
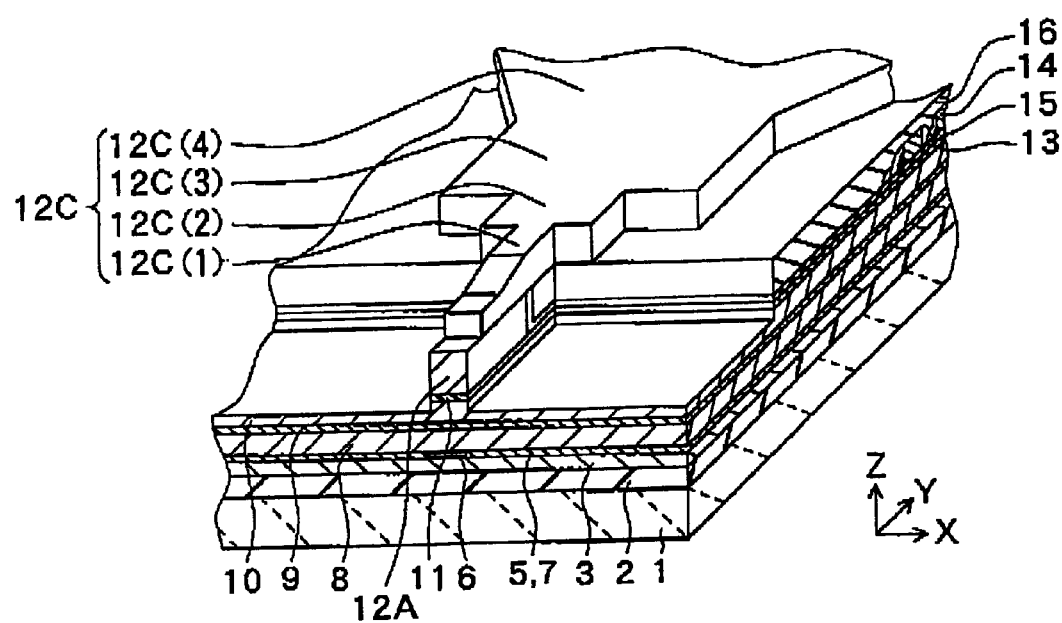
FIG. 22 is a perspective view of a modification of the structure of the thin film magnetic head according to the first embodiment of the invention.

In the embodiment, the position of a front edge of the first pole front end portion 12C(1) of the top magnetic layer 12C matches the position of a front edge of the second pole front end portion 12A as shown in FIG. 18, but the invention is not necessarily limited to this embodiment, and, for example, the position of the front edge of the first pole front end portion 12C(1) may be located rearward with respect to the position of the front edge of the second pole front end portion 12A as shown in FIG. 22. Since the operation of the thin film magnetic head is mainly executed by the action of a magnetic flux propagating through the second pole front end portion 12A as described above, about the same advantages as the advantages of the above-described embodiment (see FIG. 18) can be obtained also when the thin film magnetic head has a structure shown in FIG. 22. To form the structure shown in FIG. 22, for example, a frontward part of the first pole front end portion 12C(1) of the top magnetic layer 12C is etched and selectively removed (by means of ion milling or the like, for example), after forming the top magnetic layer 12C, the second pole front end portion 12A and so forth.

In the embodiment, the coil connecting portion 14S is located at the inner terminal end of the thin film coil 14, but the invention is not necessarily limited to this embodiment, and, for example, the coil connecting portion 14S may be located at the outer terminal end of the thin film coil 14. Also in this case, the coil connecting wiring 12CH is provided so as to be connected to the coil connecting portion 14S, and thus, about the same advantages as the advantages of the above-described embodiment can be obtained.

Second Embodiment

Next, a second embodiment of the invention will be described.

Figure 28:
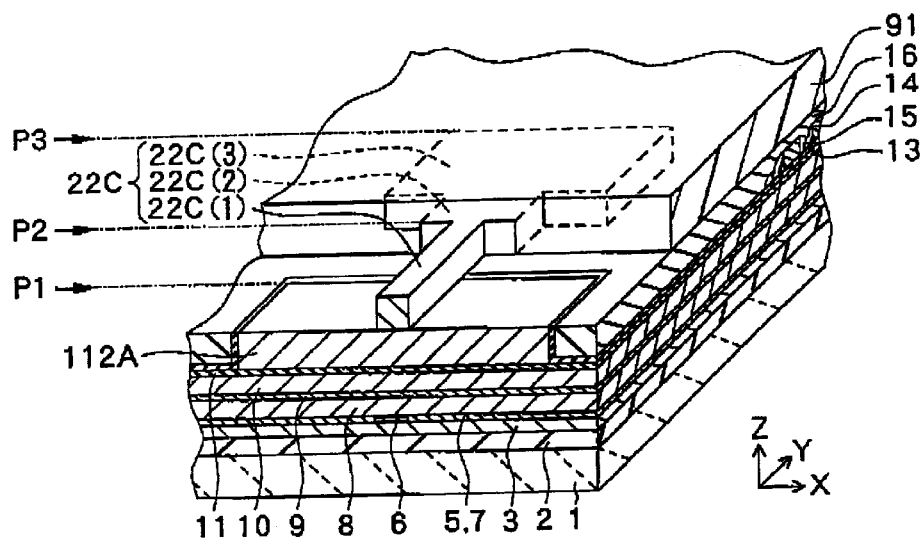
FIG. 28 is a perspective view corresponding to the cross sectional views shown in FIGS. 23A and 23B.
Figure 29:
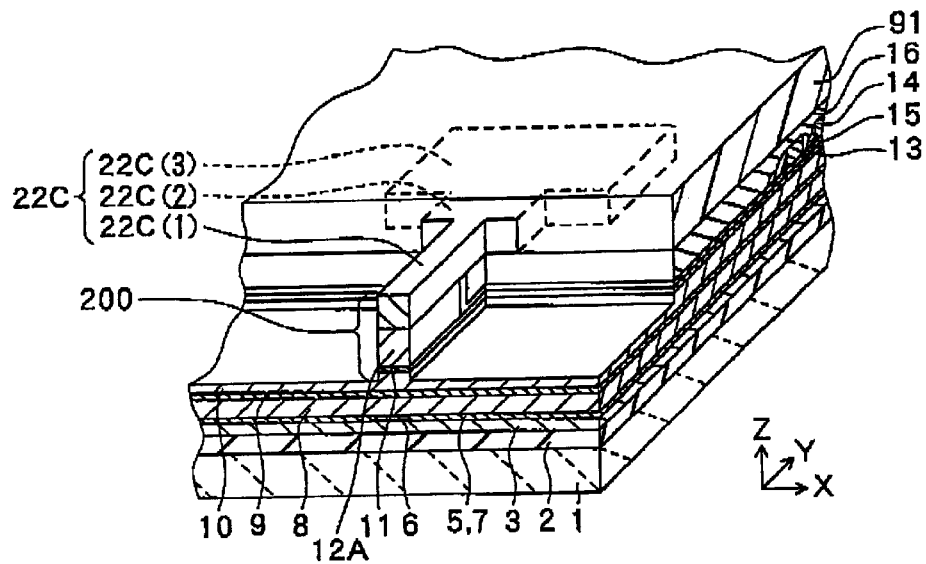
FIG. 29 is a perspective view corresponding to the cross sectional views shown in FIGS. 24A and 24B.
Figure 30:
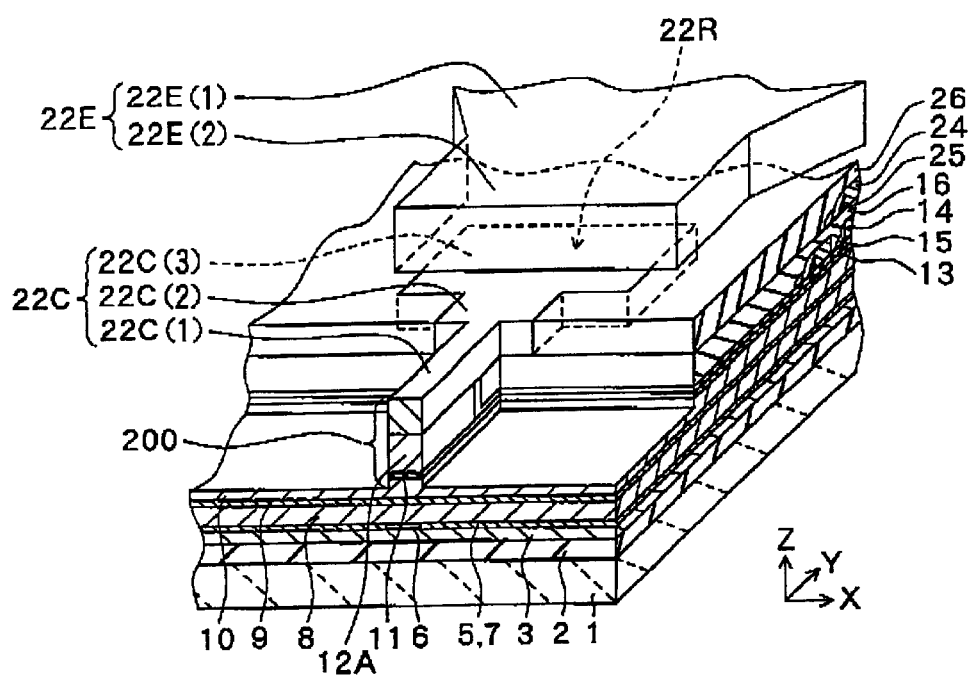
FIG. 30 is a perspective view corresponding to the cross sectional views shown in FIGS. 24A and 24B.

Firstly, the description is given with reference to FIGS. 23A to 30 with regard to a method of manufacturing a composite thin film magnetic head as a method of manufacturing a thin film magnetic head according to the second embodiment of the invention. FIGS. 23A, 24A, 25A, 26A and 27A show a cross section perpendicular to the air bearing surface, and FIGS. 23B, 24B, 25B, 26B and 27B show a cross section of a pole portion parallel to the air bearing surface. FIGS. 28 to 30 are perspective views corresponding to main manufacturing steps. FIG. 28 corresponds to a state shown in FIGS. 28A and 28B, FIG. 29 corresponds to a state shown in FIGS. 24A and 24B, and FIG. 30 corresponds to a state shown in FIGS. 27A and 27B. FIG. 30 does not show an overcoat layer 27 and the like shown in FIGS. 27A and 27B. The expressions of the X-axis, Y-axis and Z-axis directions in FIGS. 23A to 30 are the same as the expressions thereof in the above-described first embodiment. In FIGS. 23A to 30, the same parts as the elements of the above-described first embodiment are indicated by the same reference numerals.

Figures 23A, 23B:
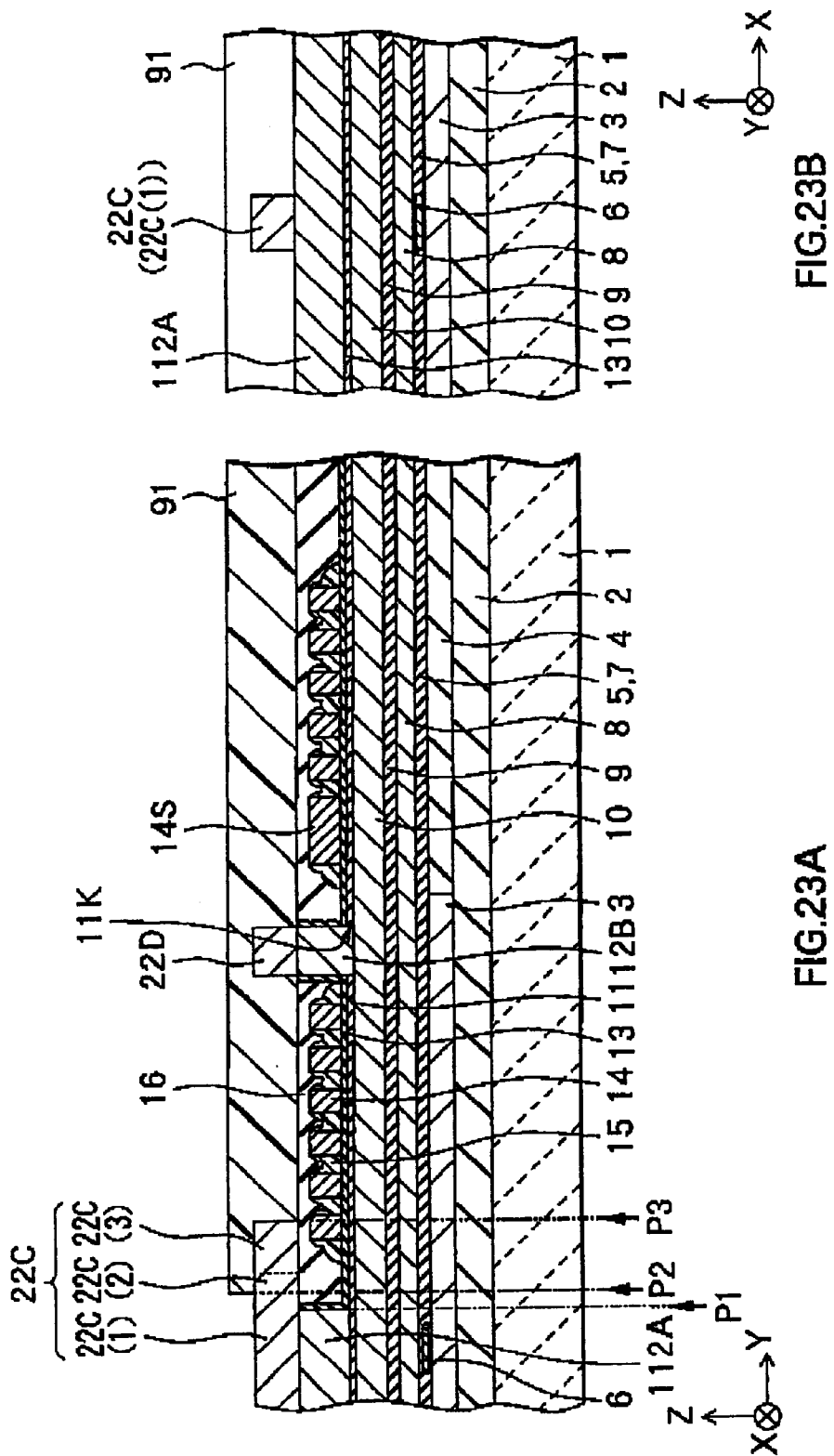
FIGS. 23A and 23B are cross sectional views for describing a step of a method of manufacturing a thin film magnetic head according to a second embodiment of the invention.

In the method of manufacturing a thin film magnetic head according to the second embodiment, the step of forming the insulating film 16 shown in FIGS. 23A and 23B and the preceding steps are the same as the step of forming the insulating film 16 shown in FIGS. 4A and 4B and the preceding steps in the above-described first embodiment, and thus the description thereof is omitted.

In the second embodiment, after forming the insulating film 16 by polishing and flattening the overall surface, a top magnetic layer 22C made of a magnetic material containing iron, nickel and cobalt and having a high saturation magnetic flux density, e.g., an iron-nickel-cobalt alloy (e.g., an iron-nickel-cobalt alloy having the composition of 45 wt % Co, 30 wt % Ni and 25 wt % Fe), is selectively formed with a thickness of about 1.0 $\mu$m to 2.0 $\mu$m on a flat region extending from on the precursory magnetic layer 112A to on the insulating film 16 by means of, for example, frame plating, as shown in FIGS. 23A, 23B and 28. At the same time when the top magnetic layer 22C is formed, a magnetic path connecting portion 22D is selectively formed on the magnetic path connecting portion 12B. Both the top magnetic layer 22C and the magnetic path connecting portion 22D constitute a part of a top pole 22. A material containing at least one of chromium (Cr), boron (B), gold (Au) and copper (Cu), as well as the above-mentioned three metallic elements, may be used as a material of the top magnetic layer 22C and the like.

Figure 31:
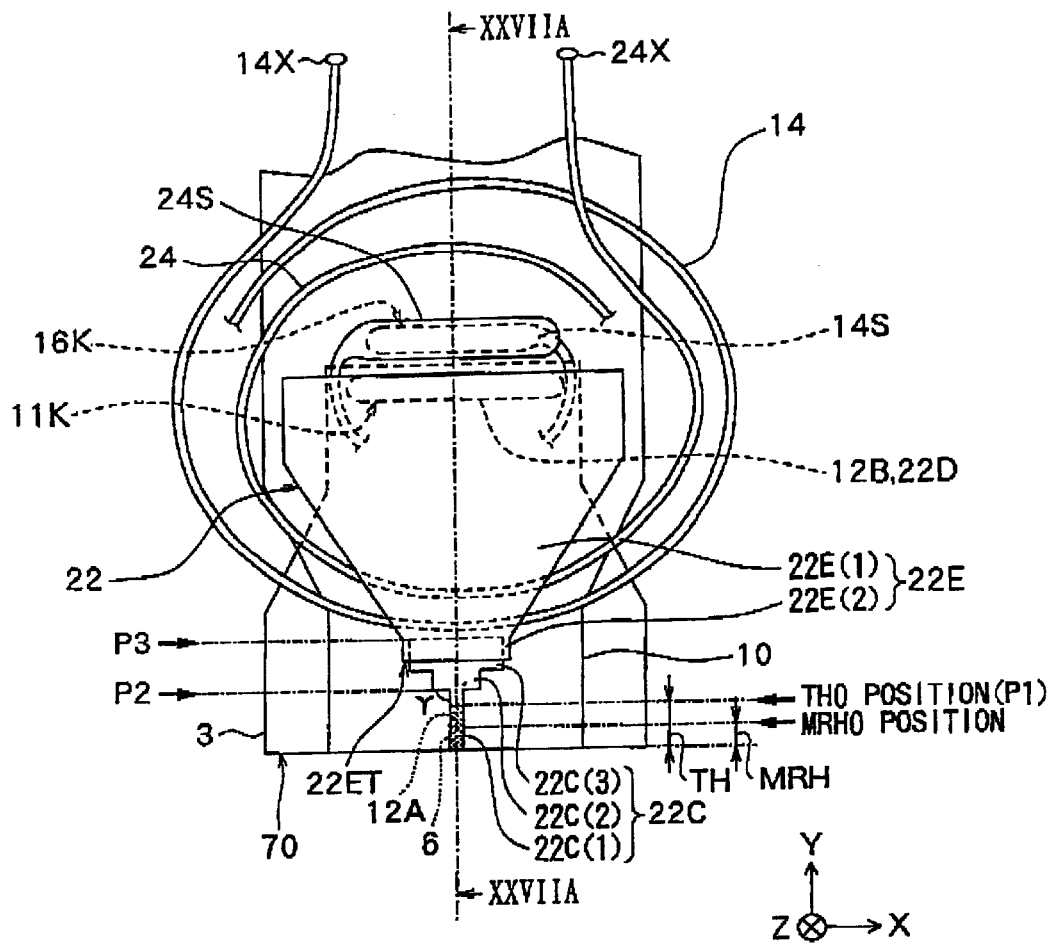
FIG. 31 is a plan view of a planar structure of a thin film magnetic head according to the second embodiment of the invention.

The top magnetic layer 22C is formed so as to include a first pole front end portion 22C(1), a middle portion 22C(2) and a rear end portion 22C(3), which are located in this order when viewed at the side to form the air bearing surface 70 in the following step (the left side in FIG. 23A), as shown in FIG. 31 to be described later, for example. In this case, the top magnetic layer 22C is positioned so that the coupling position P2 (the second position) between the first pole front end portion 22C(1) and the middle portion 22C(2) is located rearward with respect to the position (the first position) of the rear edge of the precursory magnetic layer 112A and so that the position P3 (the third position) of a rear edge of the rear end portion 22C(3) is located frontward with respect to the thin film coil 14. Structural features of the top magnetic layer 22C will be described later.

The first pole front end portion 22C(1) corresponds to a specific example of "a uniform width portion" of the thin film magnetic head according to the first aspect of the invention or the method of manufacturing a thin film magnetic head according to the first and second aspects of the invention, and corresponds to a specific example of "an etching mask" of the method of forming a magnetic layer pattern of the invention The middle portion 22C(2) and the rear end portion 22C(3) correspond to a specific example of "a widened portion" of the thin film magnetic head or the method of manufacturing the same according to the first and second aspects of the invention. The top magnetic layer 22C corresponds to a specific example of "a first magnetic layer portion" of the thin film magnetic head or the method of manufacturing the same according to the first and second aspects of the invention.

Next, as shown in FIGS. 23A and 23B, a photoresist film 91 is selectively formed so as to coat a region of the top magnetic layer 22C, more specifically, a region located rearward with respect to the coupling position P2 between the first pole front end portion 22C(1) and the middle portion 22C(2).

Next, the overall surface is subjected to the etching process by means of, for example, RIE using the top magnetic layer 22C and the photoresist film 91 as a mask. For the etching process using RIE, the etching conditions (the type of etching gas, the processing temperature and so on) are adjusted as in the case of the etching process for forming the second pole front end portion 12A and the pole portion 100 of the above-described first embodiment, for instance. The etching process removes the respective parts of the precursory magnetic layer 112A, the insulating films 13 and 16, the write gap layer 11 and the bottom pole 10 in a region located frontward with respect to the coupling position P2 between the first pole front end portion 22C(1) and the middle portion. 22C(2), whereby, as shown in FIGS. 24A, 24B and 29, the second pole front end portion 12A for constituting a part of the top pole 22 is formed, and a pole portion 200 having the trim structure is formed. For example, the etching conditions are adjusted so that the amount of etching of the top magnetic layer 22C is much smaller than the amount of etching of a peripheral region around the top magnetic layer 22C, so as to prevent a decrease in a film thickness of the top magnetic layer 22C. The first pole front end portion 22C(1) of the top magnetic layer 22C and the second pole front end portion 12A correspond to a specific example of "a track width defining portion" of the thin film magnetic head according to the second aspect of the invention.

Figures 25A, 25B:
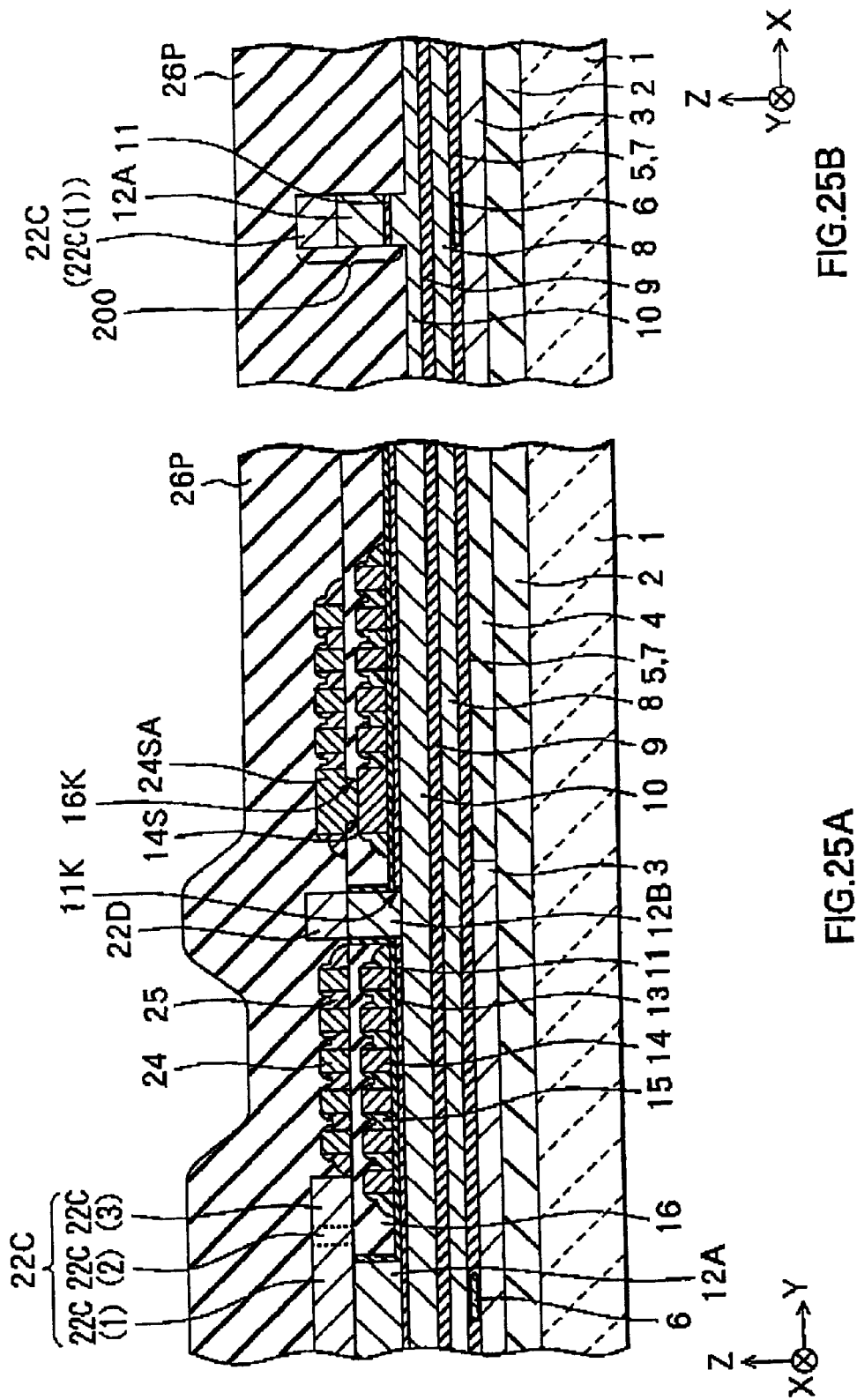
FIGS. 25A and 25B are cross sectional views for describing a step following the step of FIGS. 24A and 24B.

Next, as shown in FIGS. 25A and 25B, the insulating film 16 coating the coil connecting portion 14S is partly etched by means of, for example, RIE or ion milling, and thus the opening 16K for connecting the coil connecting portion 14S to a thin film coil 24 to be formed in the following step is formed.

Next, as shown in FIGS. 25A and 25B, the thin film coil 24 made of; for example, copper for an inductive recording head is selectively formed with a thickness of about 0.8 $\mu$m to 1.5 $\mu$m on the flat insulating film 16 in a region located rearward with respect to the region where the top magnetic layer 22C is located (except for a region where the magnetic path connecting portion 22D is located), by means of electroplating, for example. At the same time when the thin film coil 24 is formed, a coil connecting portion 24SA is integrally formed with the thin film coil 24 on the coil connecting portion 14S located at an inner terminal end of the thin film coil 24, for example. The thin film coils 14 and 24 are connected through the coil connecting portion 14S and 24SA in the opening 16K. The thin film coil 24 corresponds to a specific example of "a second thin film coil" of the thin film magnetic head according to the first aspect of the invention or the method of manufacturing a thin film magnetic head according to the second aspect of the invention. The thin film coils 14 and 24 correspond to a specific example of "a thin film coil" of the thin film magnetic head according to the first aspect of the invention or the method of manufacturing a thin film magnetic head according to the second aspect of the invention.

Next, as shown in FIGS. 25A and 25B, an insulating film 25 for providing insulation between windings of the thin film coil 24 and the lie is formed. A material of the insulating film 25, a method of forming the insulating film 25, structural features of the insulating film 25 and the like are substantially the same as those of the insulating Am 15 of the above-described first embodiment.

Next, as shown in FIGS. 25A and 25B, a layer made of an insulating material e.g., a precursory insulating layer 26P, is formed with a thickness of about 3.0 μm to 4.0 μm by means of; for instance, sputtering so as to coat the overall surface, and thus a region having an uneven structure comprising the top magnetic layer 22C, the magnetic path connecting portion 22D, the thin film coil 24, the coil connecting portion 24SA and so forth is filled with the precursory insulating layer 26P.

Figures 26A, 26B:
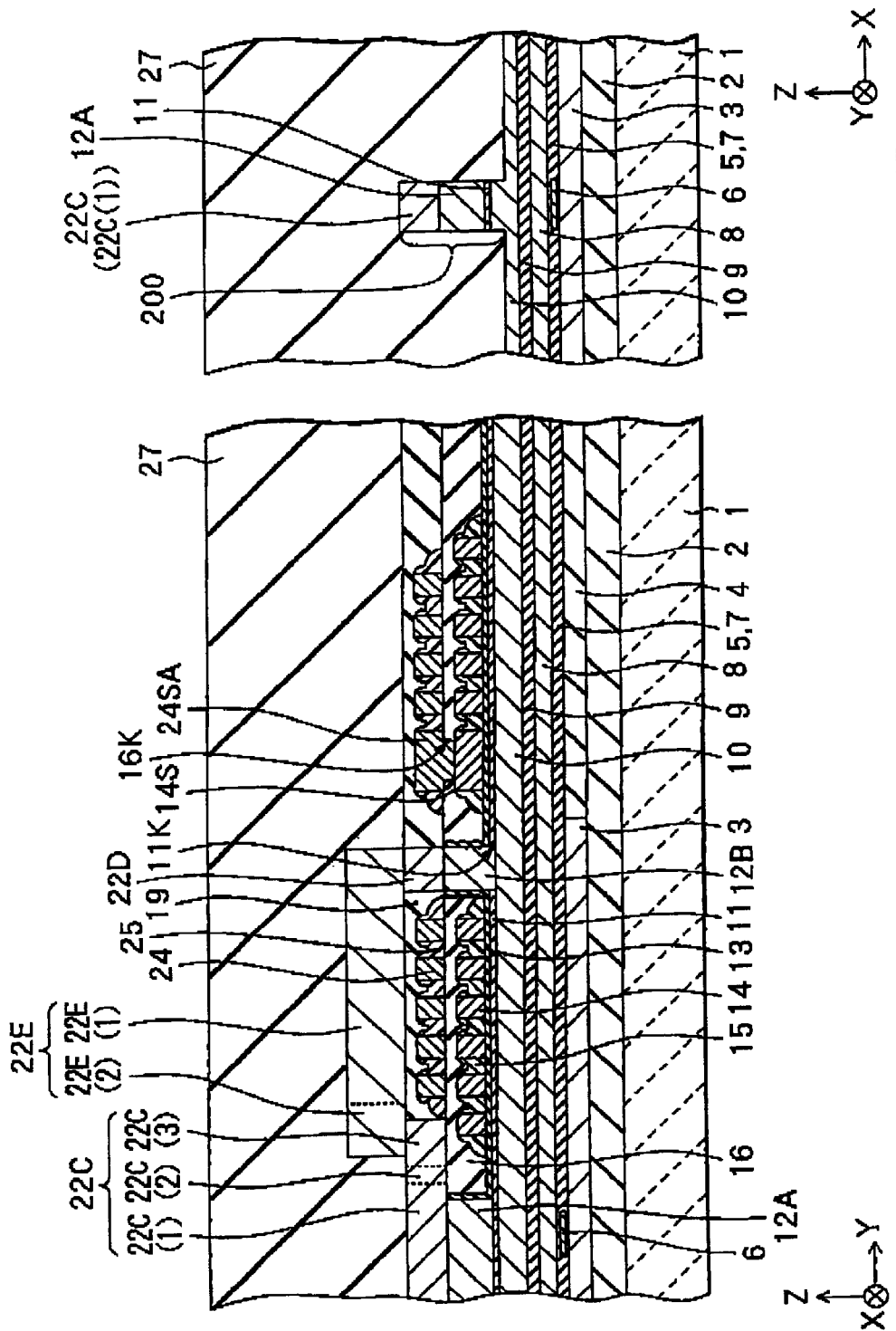
FIGS. 26A and 26B are cross sectional views for describing a step following the step of FIGS. 25A and 25B.

Next, the overall surface of the precursory insulating layer 26P is polished and flattened by means of CMP, for example. By this polishing, an insulating film 26 for coating the thin film coil 24 and so on is formed as shown in FIGS. 26A and 26B. The polishing takes place until at least the top magnetic layer 22C and the magnetic path connecting portion 22D are exposed. The insulating films 18, 15, 16, 25 and 26 correspond to a specific example of "an insulating layer" of the thin film magnetic head or the method of manufacturing the same according to the first and second aspects of the invention.

Next, as shown in FIGS. 26A and 26B, a top yoke 22E for constituting a part of the top pole 22 is selectively formed with a thickness of about 2.0 μm to 3.0 μm on a flattened region, e.g., a flat region extending from on the rear end portion 22C(3) of the top magnetic layer 22C to on the magnetic path connecting portion 22D. A material of the top yoke 22E and a method of forming the top yoke 22E are substantially the same as those of the top magnetic layer 12C of the above-described first embodiment, for instance. The top yoke 22E is formed so as to have a planar shape shown in FIG. 31 to be described later, for example. Structural features of the top yoke 22E will be described later. The top yoke 22E corresponds to a specific example of "a third magnetic layer portion" of the thin film magnetic head according to the first aspect of the invention. The top pole 22 comprising the second pole front end portion 12A, the top magnetic layer 22C, the magnetic path connecting portions 12B and 22D and the top yoke 22E corresponds to a specific example of "a first magnetic layer" of the thin film magnetic head or the method of manufacturing the same according to the first and second aspects of the invention.

Next, as shown in FIGS. 26A and 26B, the overcoat layer 27 made of an insulating material, e.g., an inorganic insulating material such as alumina, is formed with a thickness of about 20 μm to 40 μm so as to coat the overall surface. A structure around the top magnetic layer 22C is as shown in FIG. 30.

Finally, as shown in FIGS. 27A and 27B, the air bearing surface 70 of the recording head and the reproducing head is formed through the steps of machining and polishing, and thus a thin film magnetic head is completed.

FIG. 31 shows a schematic representation of a planar structure of the thin film magnetic head manufactured by the method of manufacturing a thin film magnetic head according to the second embodiment, In FIG. 31, the same parts as the elements of the above-described first embodiment shown in FIG. 21 are indicated by the same reference numeral, FIG. 31 does not show the insulating films 13, 15, 16, 25 and 26, the overcoat layer 27 and so on. The thin film coil 24, only a part of its outermost periphery, is shown in FIG. 31. FIG. 27A corresponds to a cross section viewed in the direction of the arrows along the line XXVIIA—XXVIIA of FIG. 31. The expressions of the X-axis, Y-axis and Z-axis directions in FIG. 31 are the same as the expressions thereof in FIGS. 23A to 30.

As described above, for example, the top pole 22 comprises the second pole front end portion 12A, the top magnetic layer 22C, the magnetic path connecting portions 12B and 22D and the top yoke 22E, which are separately formed.

As described above, the top magnetic layer 22C includes the first pole front end portion 22C(1), the middle portion 22C(2) and the rear end portion 22C(3), which are located in this order when viewed at the side of the air bearing surface 70. For example, each of these portions 22C(1), 22C(2) and 22C(3) has about the same structural features as each of the corresponding portions of the top magnetic layer 12C of the above-described first embodiment (e.g., the first pole front end portion 12C(1) corresponding to the first pole font end portion 22C(1)) has.

The top yoke 22E includes a yoke portion 22E(1) having a large area for containing a magnetic flux generated by the thin film coils 14 and 24, and a connecting portion 22E(2) having a uniform width smaller than a width of the yoke portion 22E(1). For example, the width of the yoke port 22E(1) is substantially uniform in the rearward portion thereof and is gradually narrower in the frontward portion thereof at a position closer to the air bearing surface 70. For example, the width of the connecting portion 22E(2) is greater than a width of the rear end portion 22C(3) of the top magnetic layer 22C. However, the relative widths of these portions 22E(2) and 22C(3) are not, necessarily limited to this example, and, for instance, the width of the connecting portion 22E(2) may be smaller than the width of the rear end portion 22C(3). For example, the position of a front edge surface 22ET of the top yoke 22E is located rearward with respect to the coupling position between the middle portion 22C(2) and the rear end portion 22C(3) of the top magnetic layer 22C. That is, the top yoke 22E is located apart from the air bearing surface 70. The position of the top yoke 22E is not necessarily limited to the above-mentioned position, and, for example, the top yoke 22E may be positioned so that the position of the edge surface 22ET substantially matches the coupling position between the middle portion 22C(2) and the rear end portion 22C(3). The centers of the top yoke 22E and the top magnetic layer 22C match each other in the width direction.

As shown in FIGS. 27A, 30 and 31, the top magnetic layer 22C lies on a flat region extending from on the second pole front end portion 12A to on the insulating film 16. The top yoke 22E lies on a flat region extending from on the rear end portion 22C(3) of the top magnetic layer 22C to on the insulating film 26. The top yoke 22E is magnetically coupled to the bottom pole 10 with the magnetic path connecting portions 12B and 22D in between in the opening 11K, and is also magnetically coupled to the second pole front end portion 12A with the top magnetic layer 22C in between. That is, the top pole 22 (the second pole front end portion 12A, the top magnetic layer 22C, the magnetic path connecting portions 12B and 22D and the top yoke 22E) is connected to the bottom pole 10, and thus a magnetic path is formed.

As shown in FIG. 31, the thin film coil 24 and the coil connecting portion 24SA have the same structural features as the thin film coil 14 and the coil connecting portion 14S of the above-described first embodiment have. The thin film coils 14 and 24 are connected through the coil connecting portions 14S and 24SA in the opening 16K. The terminal 14X formed at the outer terminal end of the thin film coil 14 and a terminal 24X formed at an outer terminal end of the thin film coil 24 are connected to an external circuit (not shown) so that the external circuit can feed a current through the thin film coils 14 and 24.

Structural features of the elements shown in FIG. 31, except for the above-mentioned elements, are the same as the structural features of the elements of the above-described first embodiment (see FIG. 21).

In the second embodiment, as shown in FIGS. 27A, 27B and 30, a part of the insulator (the insulating films 13 and 16) for coating the thin film coils 14 and 24 is located adjacent to the write gap layer 11 in an overlap area 22R where the top magnetic layer 22C overlaps the top yoke 22E, so that superior overwrite characteristics can be ensured for the following reason. That is, in the process of propagation of a magnetic flux flowing through the top pole 22, the magnetic flux flows through the overlap area 22R downward from the connecting portion 22E(2) of the top yoke 22E to the rear end portion 22C(3) of the top magnetic layer 22C. The part of the insulator made of a nonmagnetic material located in the overlap area 22R functions as a magnetic flux shield so as to prevent a magnetic flux from flowing from an upper region over the part to a lower region under the part. Therefore, the part of the insulator can prevent the magnetic flux flowing from the connecting portion 22E(2) into the rear end portion 22C(3) from propagating through the write gap layer 11 and to the bottom pole 10 (i.e., the leakage of magnetic flux). Accordingly, in the process of propagation of magnetic flux through the top magnetic layer 22C, a propagation loss of magnetic flux resulting from "the leakage of magnetic flux" is prevented, so that a necessary and sufficient amount of magnetic flux can be supplied to the respective tip portions of the first pole front end portion 22C(1) and the second pole front end portion 12A. The above-mentioned part of the insulator (the insulating films 13 and 16) can prevent a magnetic flux from propagating from the bottom pole 10 to the top magnetic layer 22C, as well as prevent a magnetic flux from propagating from the top magnetic layer 22C to the bottom pole 10.

In the second embodiment, the top magnetic layer 22C is formed on the flattened surface obtained through CMP, and therefore the top magnetic layer 22C can be formed with higher accuracy by the same function as the action of the above-described first embodiment in which the top magnetic layer 12C is formed on the flattened spice. The advantage of improving the accuracy in forming the top yoke 22E is also obtained, as in the case of the advantage of improving the accuracy in forming the top magnetic layer 22C.

Figures 32A, 32B:
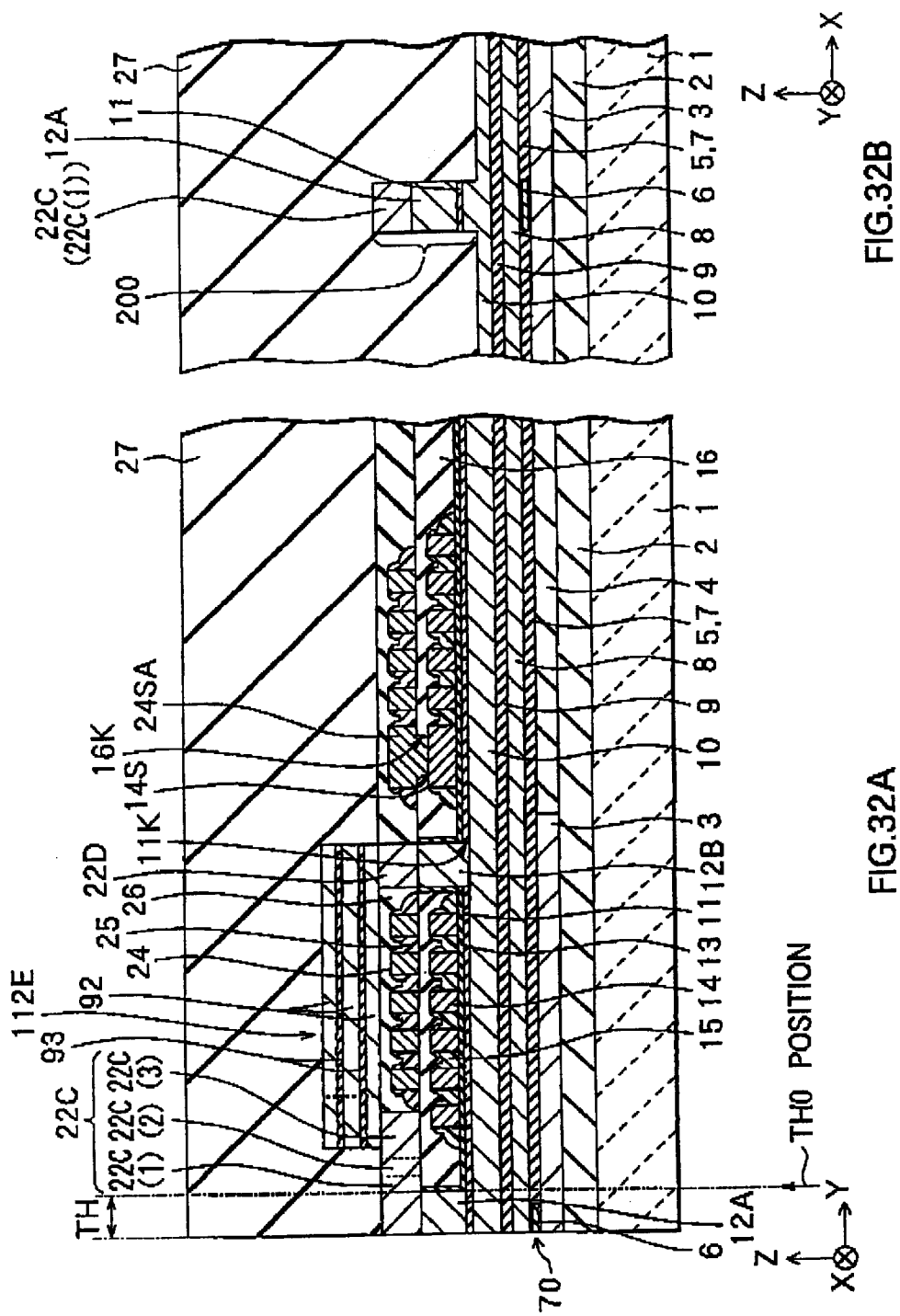
FIGS. 32A and 32B are cross sectional views of a modification of the structure of the thin film magnetic head according to the second embodiment of the invention.

In the second embodiment, the description is given with regard to the case where the top yoke (22E) has a single-layer structure of iron nitride (see FIGS. 27A and 27B), but the invention is not necessarily limited to this embodiment. For example, as shown in FIGS. 32A and 32B, a top yoke (112E) may have a stacked structure comprising a high saturation magnetic flux density material layer 92 such as iron nitride alternating with an inorganic insulating material layer 93 such as alumina. The top yoke having this structure can prevent the generation of eddy current in the magnetic path and thus improve RF characteristics. When RIE is used to form both the above-mentioned high saturation magnetic flux density material layer 92 and inorganic insulating material layer 98, the time required to form the layers 92 and 93 can be reduced. The parts shown in FIGS. 32A and 32B, except for the top yoke 112E, are the same as the above-described parts shown in FIGS. 27A and 27B.

Functions, advantages, modifications and the like of the structure of the thin film magnetic head and the method of manufacturing the same according to the second embodiment, except for the above-mentioned respects, are the same as those of the structure of the thin film magnetic head and the method of manufacturing the same according to the above-described first embodiment, and thus the description thereof is omitted.

Third Embodiment

Next, a third embodiment of the invention will be described

Figure 33A:
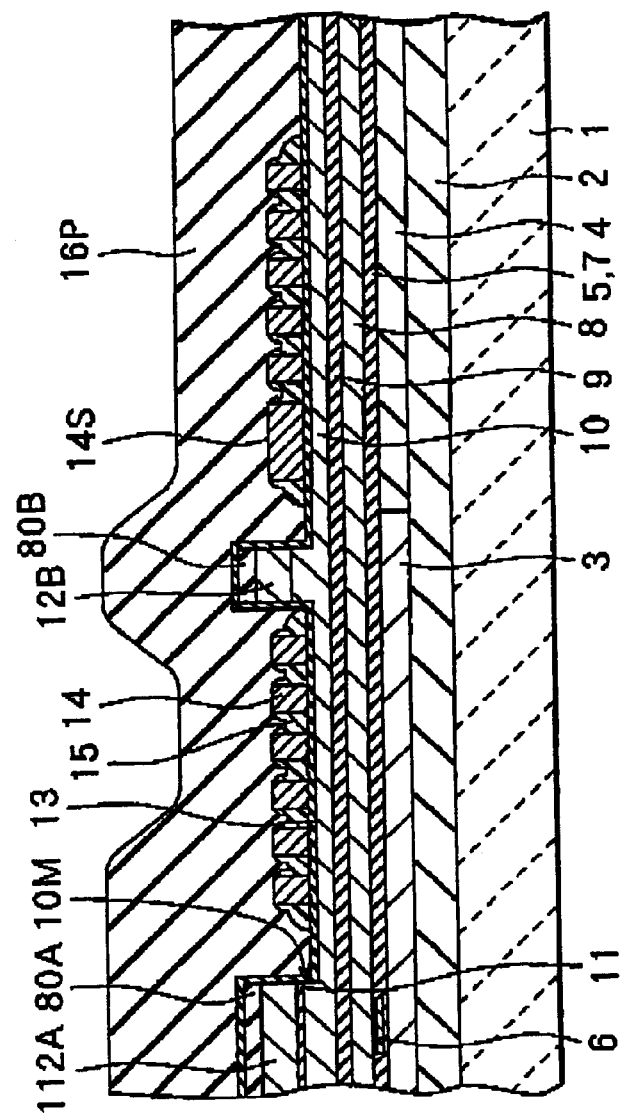
FIGS. 33A and 33B are cross sectional views for describing a step of a method of manufacturing a thin film magnetic head according to a third embodiment of the invention.
Figure 33B:
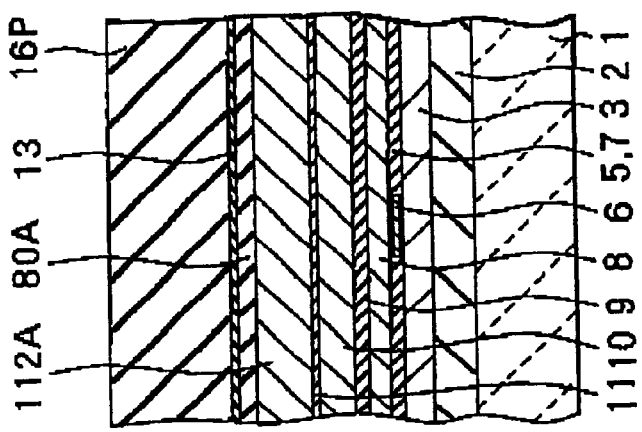
Figure 34A:
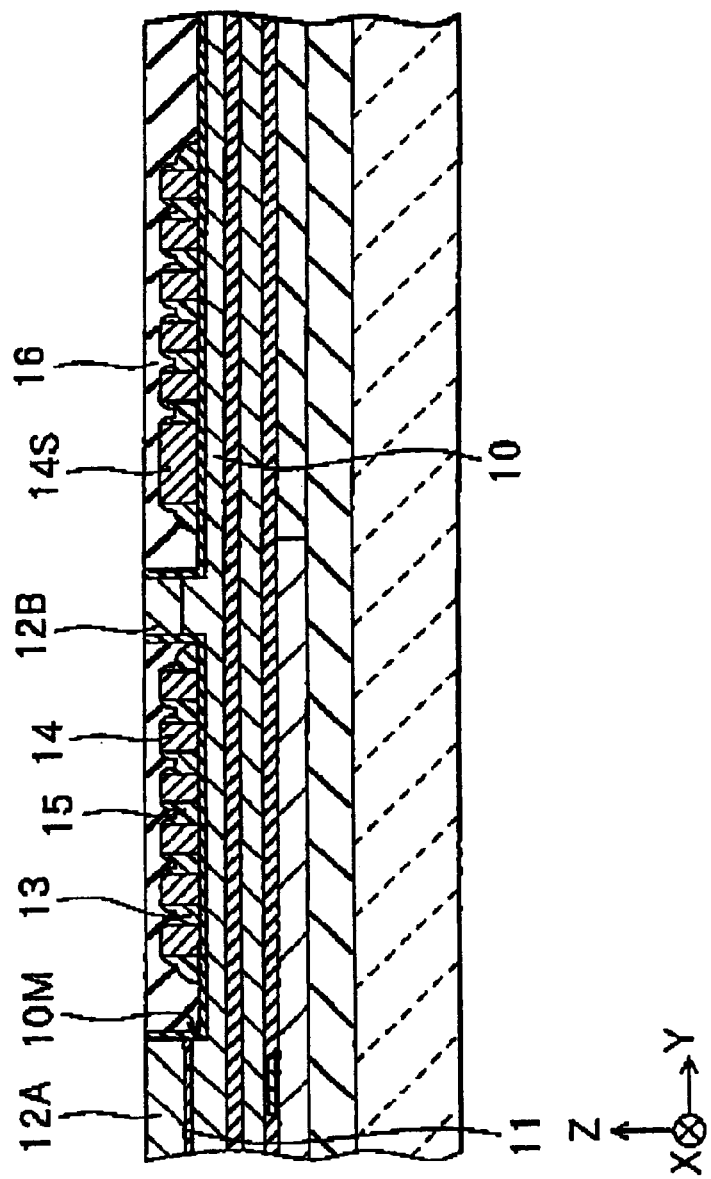
FIGS. 34A and 34B are cross sectional views for describing a step following the step of FIGS. 33A and 33B.
Figure 34B:
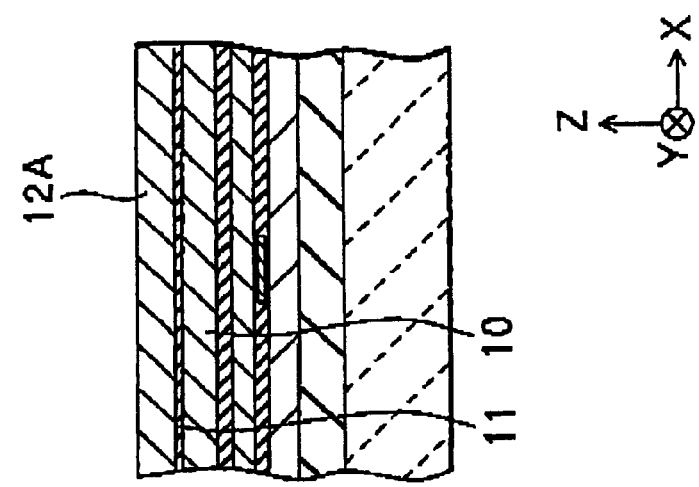
Figures 35A, 35B:
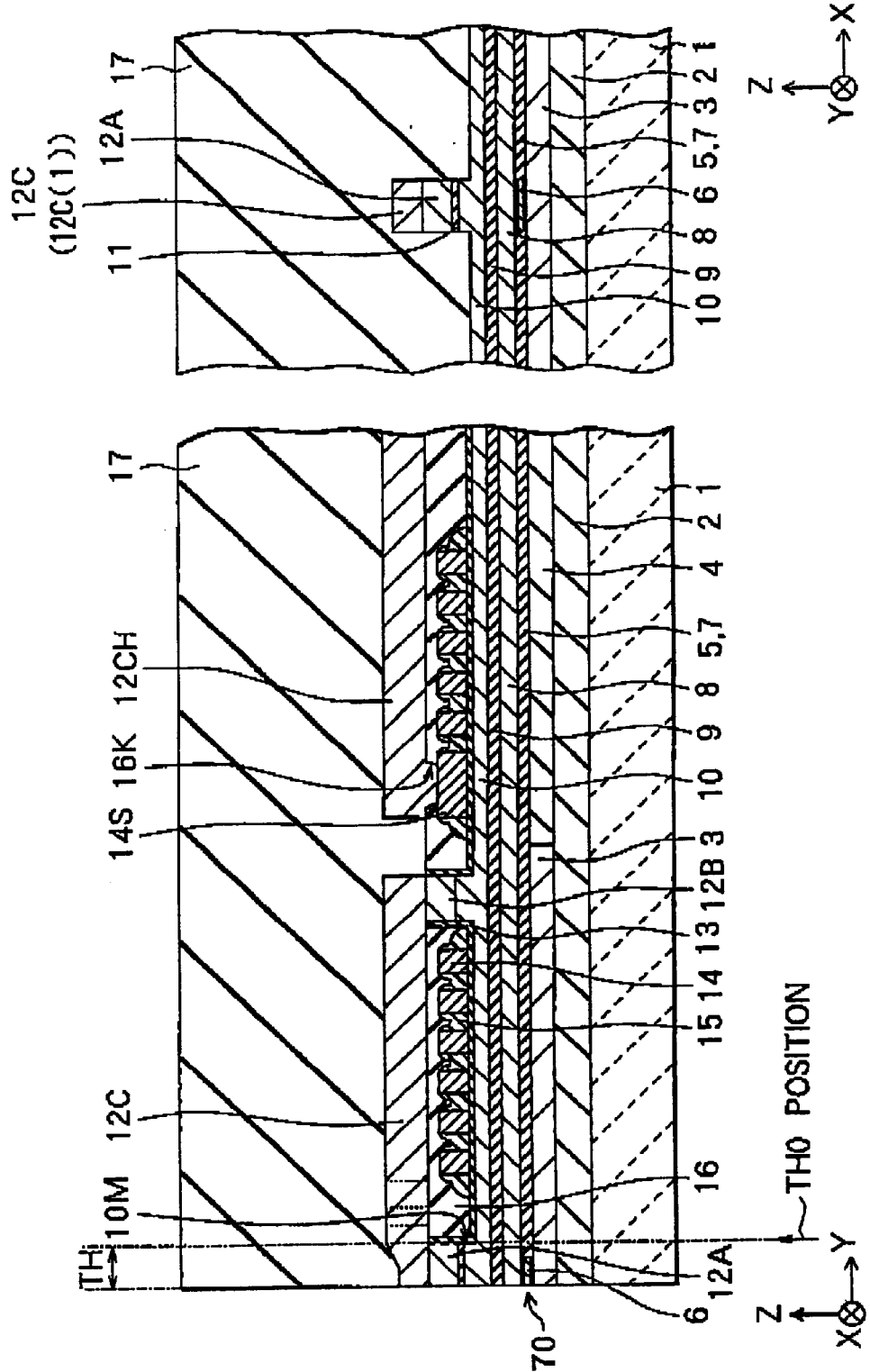
FIGS. 35A and 35B are cross sectional views for describing a step following the step of FIGS. 34A and 34B.

Firstly, the description is given with reference to FIGS. 33A to 35B with regard to a method of manufacturing a composite thin film magnetic head as a method of manufacturing a thin film magnetic head according to the third embodiment of the invention FIGS. 33A, 34A and 35A show a cross section perpendicular to the air bearing surface, and FIGS. 33B, 34B and 35B show a cross section of a pole portion parallel to the air bearing surface. The expressions of the X-axis, Y-axis and Z-axis directions in FIGS. 35A to 35B are the same as the expressions thereof in the above-described first embodiment. In FIGS. 33A to 35B, the same parts as the elements of the above-described first embodiment are indicated by the same reference numerals.

In the method of manufacturing a thin film magnetic head according to the third embodiment, the step of forming the precursory magnetic layer 112A shown in FIGS. 35A and 35B and the preceding steps are the same as the step of forming the precursory magnetic layer 112A shown in FIGS. 3A and 3B and the preceding steps in the above-described first embodiment, and thus the description thereof is omitted.

Figures 38A, 38B:
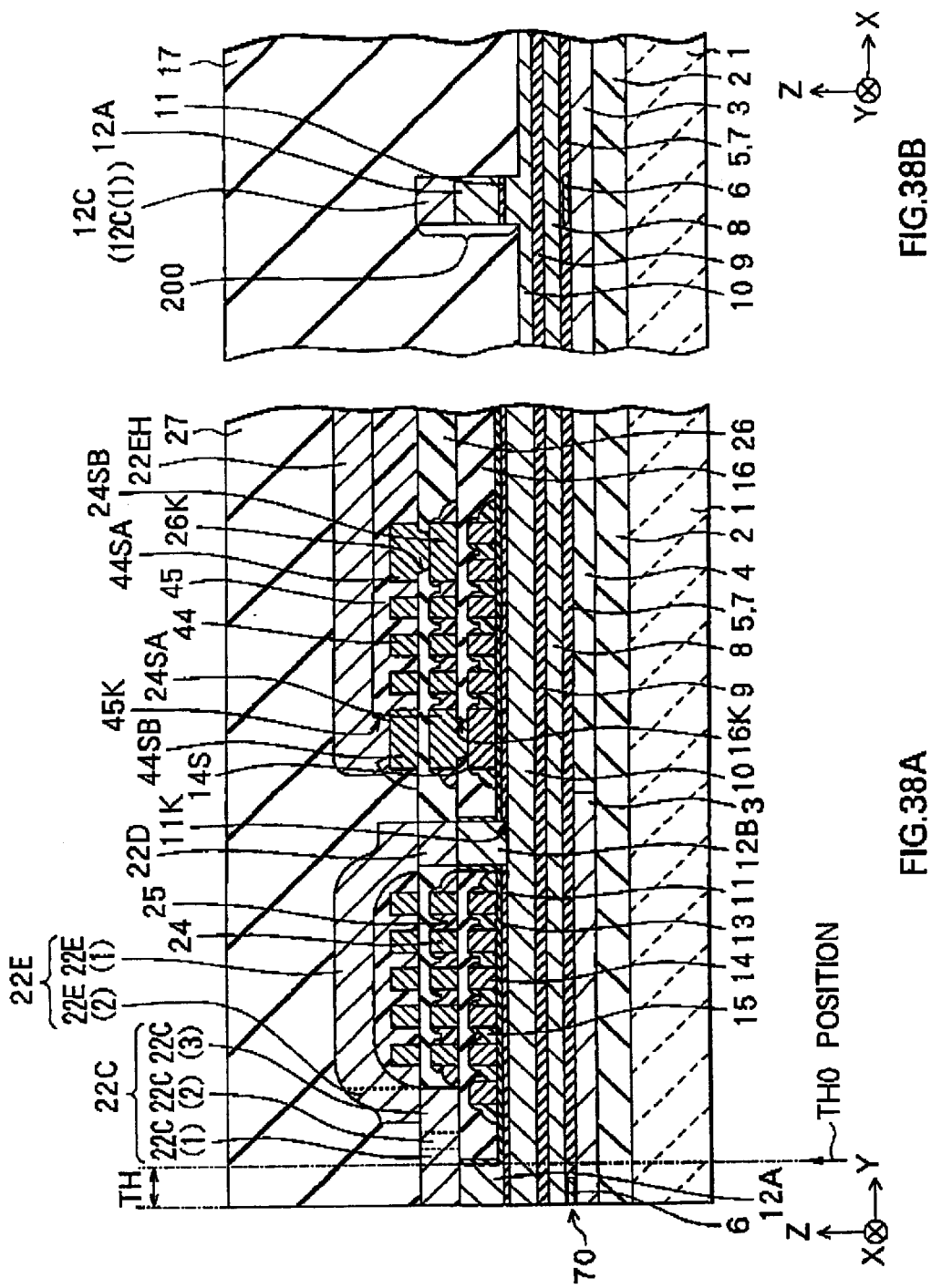
FIGS. 38A and 38B are cross sectional views of another modification of the structure of the thin film magnetic head according to the second embodiment of the invention.
Figure 39:
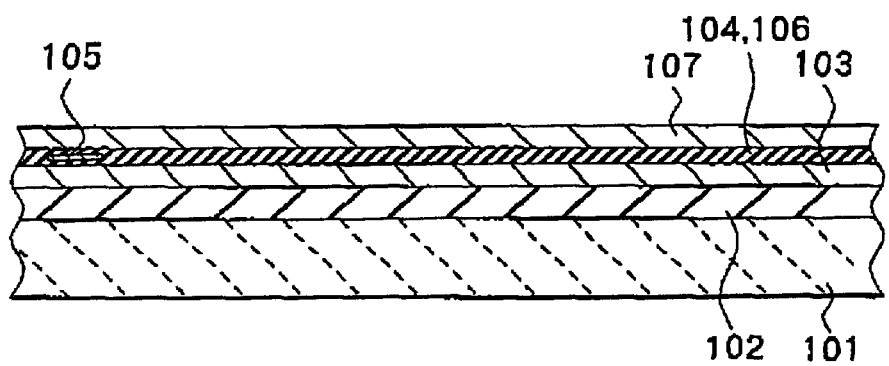
FIG. 39 is a cross sectional view for describing a step of a method of manufacturing a thin film magnetic head of the related art.
Figure 40:
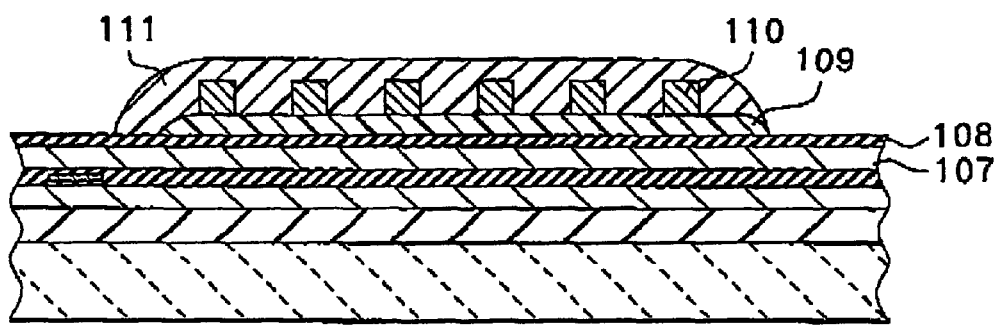
FIG. 40 is a cross sectional view for describing a step following the step of FIG. 39.
Figure 41:
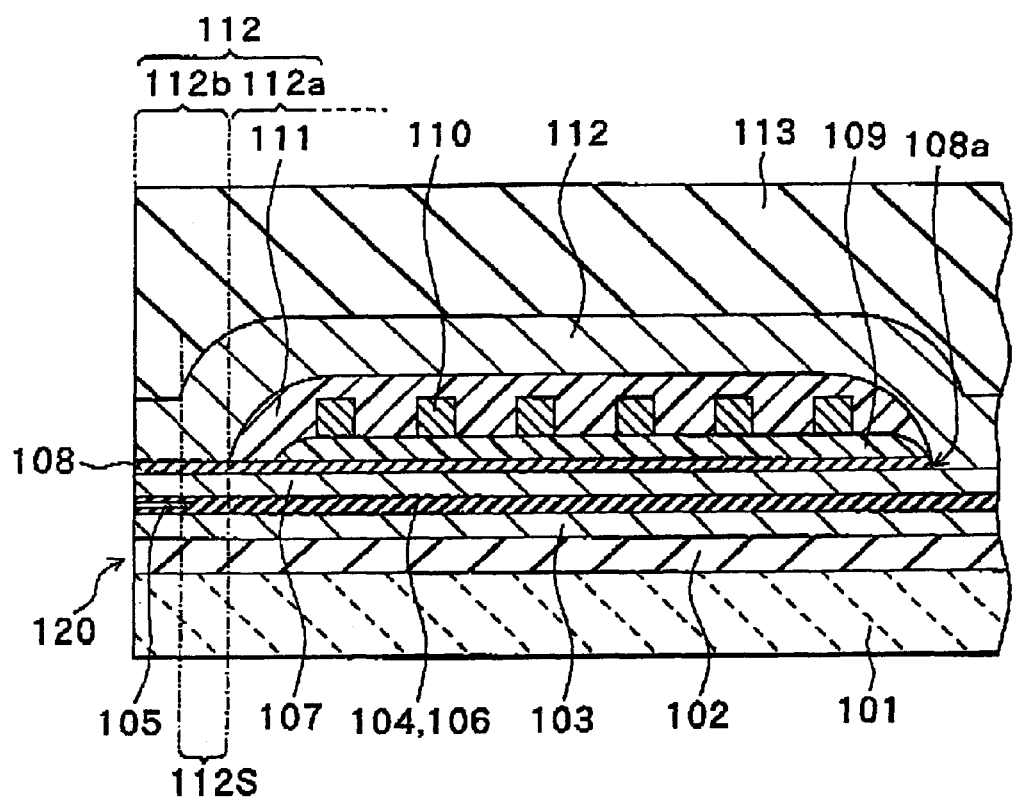
FIG. 41 is a cross sectional view for describing a step following the step of FIG. 40.
Figure 42:
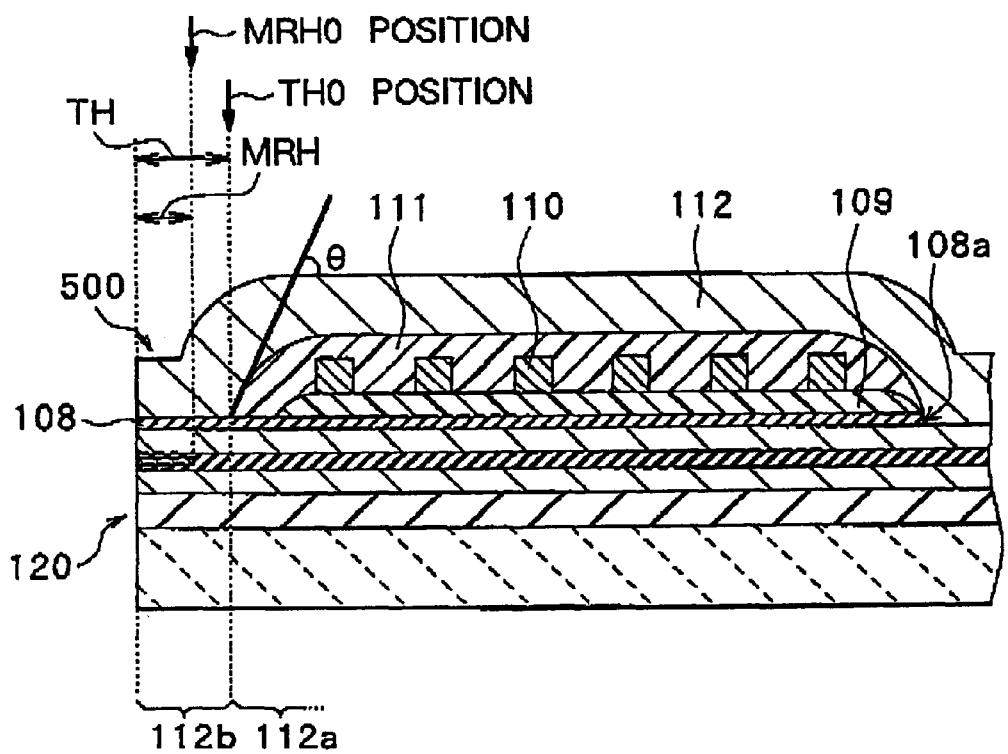
FIG. 42 is a cross sectional view of a principal structure of a thin film magnetic head of the related art.
Figure 43:
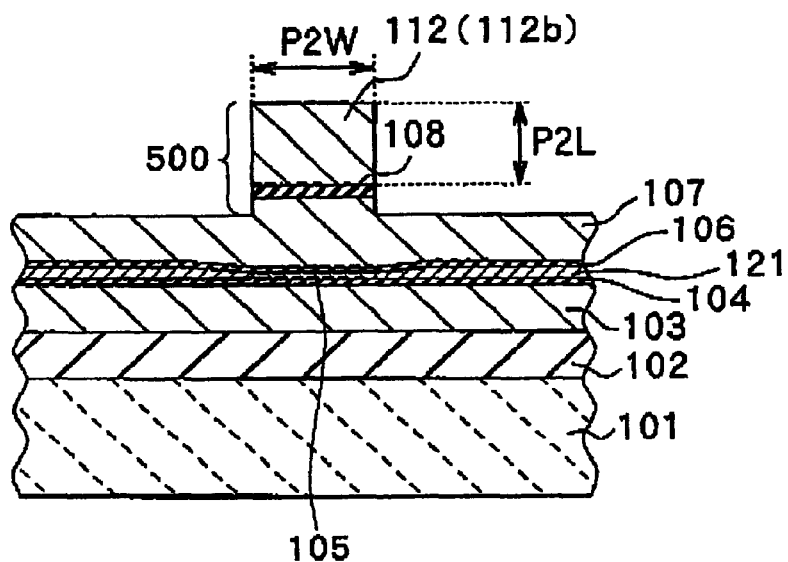
FIG. 43 is a cross sectional view showing a cross section of a pole portion of the thin film magnetic head shown in FIG. 42, parallel to an bearing surface.
Figure 44:
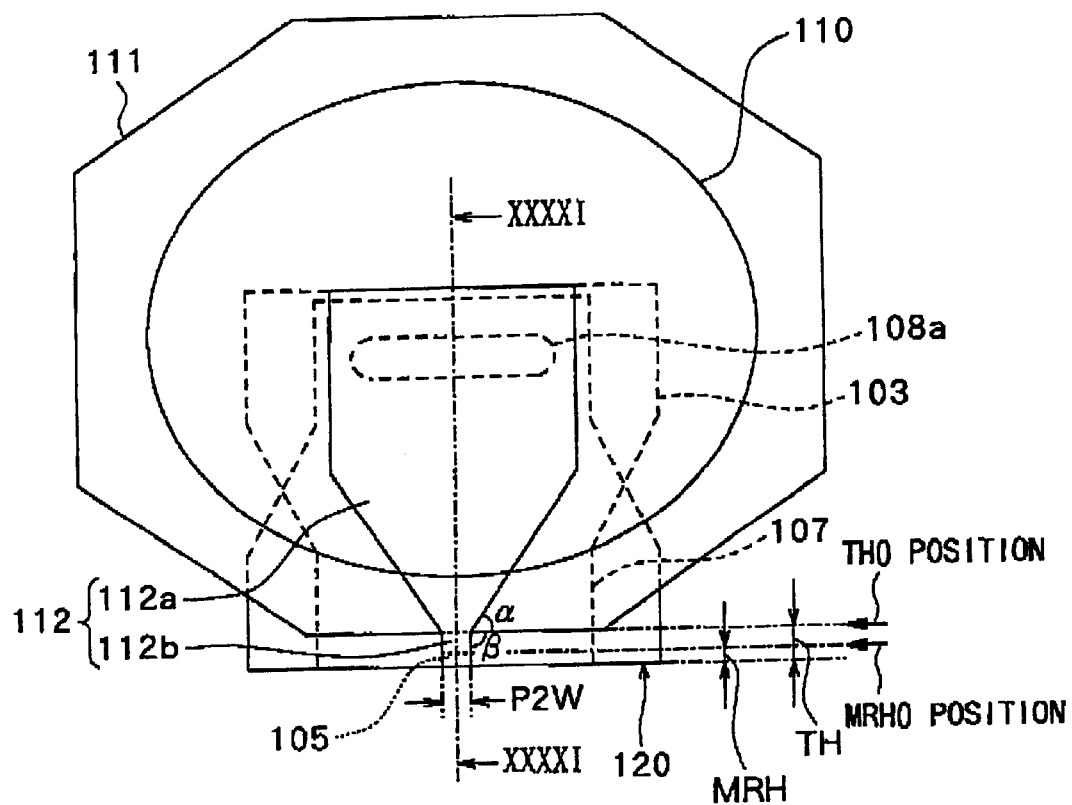
FIG. 44 is a plan view of a structure of the thin Film magnetic head of the related art.

In the third embodiment, after forming the precursory magnetic layer 112A, as shown in FIGS. 38A and 38B, the respective parts of the write gap layer 11 and the bottom pole 10, except for the regions where the masks 80A and 80B are formed, are selectively etched by means of RIE using the masks 80A and 80B under about the same conditions as the conditions under which the pole portion 100 is formed by the method of the above-described first embodiment, for example. This etching process removes a part of the bottom pole 10, thereby forming a recessed area 10M. The recessed area 10M is formed so as to have a depth of about 0.5 $\mu$m to 1.5 $\mu$m, for example.

Next, as shown in FIGS. 33A and 33B, the insulating film 13, the thin film coil 14, the insulating film 15 and the precursory insulating layer 16P are formed in sequence. The materials of these portions, the methods of forming these portions, the positions of these portions and the like are substantially the same as those of these portions of the above-described first embodiment. When the recessed area 10M is formed in the preceding Step, the position of the thin film coil 14 becomes lower than the position of the thin film coil 14 which is formed when the recessed area 10M is not formed.

Next, the overall surface of the precursory insulating layer 16P is polished and flattened by means of CMP, for example. By this polishing, the insulating film 16 for coating the thin film coil 14 and so on is formed as shown in FIGS. 34A and 34B. The polishing takes place until at least the precursory magnetic layer 112A and the magnetic path connecting portion 12B are exposed and the thickness of the precursory magnetic layer 112A reaches about 0.5 μm to 1.5 μm, for example.

After forming the insulating film 16, the steps of forming the top magnetic layer 12C and the like are the same as the steps of forming the top magnetic layer 12C and the like of the above-described first embodiment, and thus the description thereof is omitted. A sectional structure of the thin film magnetic head to be finally completed is as shown in FIGS. 35A and 35B.

In the third embodiment, the recessed area 10M is formed by etching and trenching a part of the bottom pole 10, and then the thin film coil 14 is formed in the recessed area 10M, so that the position of a surface of an underlayer on which the thin film coil 14 is to be formed becomes lower than the position of the surface of the underlayer which is obtained when etching does not take place. Therefore, the insulating film 16 having a sufficient thickness is formed on the thin film coil 14 in the following step, so that the insulating film 16 can ensure that the thin film coil 14 is insulated from the top magnetic layer 12C to be formed in the following step.

Lowering the position of the surface of the underlayer on which the thin film coil 14 is to be formed makes it possible to reduce the thickness of the precursory magnetic layer 11A, as well as ensure an appropriate thickness of the insulating film 16 on the thin film coil 14. In this case, the width of the second pole front end portion 12A to be formed in the following step can become uniform with higher accuracy for the following reason. That is, when the second pole front end portion 12A is formed by etching the precursory magnetic layer 112A by means of RIE, a greater thickness of the precursory magnetic layer 112A makes it more difficult to make the width of the second pole front end portion 12A uniform. The reason is as follows: a greater thickness of the precursory magnetic layer 112A leads to a larger amount of residues that are produced as the etching process proceeds, and the redeposition of the residues produced by etching causes a partial increase in the width of the second pole front end portion 12A. Conversely, a less thickness of the precursory magnetic layer 112A yields a smaller amount of residues to be produced during the etching process, and therefore enables the width of the second pole front end portion 12A to become uniform with higher accuracy.

Functions, advantages, modifications and the like of the structure of the thin film magnetic head and the method of manufacturing the same according to the third embodiment, except for the above-mentioned respects, are the same as those of the structure of the thin film magnetic head and the method of manufacturing the same according to the above-described first embodiment, and thus the description thereof is omitted.

Figures 36A, 36B:
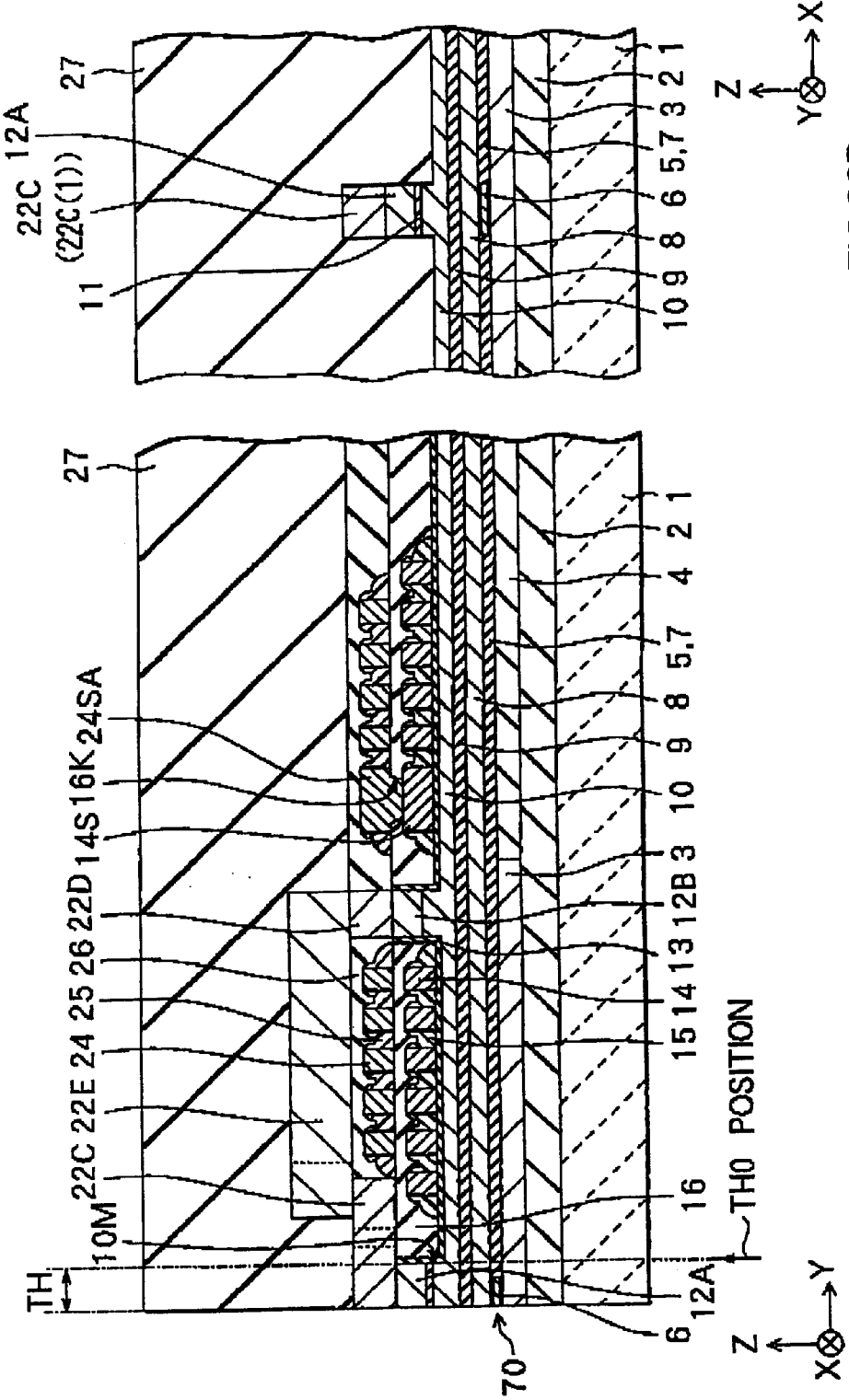
FIGS. 36A and 36B are cross sectional views of a thin film magnetic head which is manufactured when the method of manufacturing a thin film magnetic head according to the third embodiment of the invention is applied to the manufacture of the thin film magnetic head according to the second embodiment.

A modification relating to the provision of the recessed area 10M of the third embodiment may be applied to the above-described second embodiment. FIGS. 36A and 36B show a completed thin film magnetic head which is obtained by forming the recessed area 10M in the thin film magnetic head of the above-described second embodiment. FIGS. 36A and 36B correspond to FIGS. 27A and 27B, respectively. Also in this case, the same advantages as the advantages of the above-described embodiments can be obtained.

Although the invention is described above by referring to some embodiments, the invention is not limited to these embodiments and various modifications of the invention are possible.

For example, the method of manufacturing a composite thin film magnetic head is described by referring to the above-mentioned embodiments and the modifications thereof, but the invention may be applied to a record-only thin film magnetic head having an inductive magnetic transducer for writing or a thin film magnetic head having an inductive magnetic transducer for both recording and reproducing. The invention may be applied to a thin film magnetic head having a structure in which the element for writing and the element for reading are stacked in reverse order.

For example, the description is given by referring to the above-mentioned first embodiment with regard to the case where the portion of the top pole 12 having the uniform width for defining the write track width on the recording medium has the two-layer structure (the second pole front end portion 12A and the first pole front end portion 12C(1)), but the invention is not necessarily limited to this embodiment, and the portion having the uniform width may have a multilayer structure comprising three or more layers. Also in this case, the same advantages as the advantages of the above-described first embodiment can be obtained. When a plurality of magnetic materials having different saturation magnetic flux densities are used as the materials of the portions for constituting the top magnetic layer, it is preferable that the saturation magnetic flux density profile of the portion having the uniform width be adjusted so that the saturation magnetic flux density may become higher at a position farther from the top layer portion of the portion having the uniform width, i.e., a position closer to the bottom layer portion thereof, as described above. Of course, the saturation magnetic flux density profile of the portion having the uniform width may be optionally adjusted. A modification relating to the structure of the above-mentioned portion having the uniform width may be applied to the above-described second and third embodiments.

The planar shapes of the magnetic layer portions (the top magnetic layer, the top yoke, etc.) constituting the top pole described by referring to the above-mentioned embodiments are not necessarily limited to the planar shapes shown in FIGS. 21 and 31. The planar shapes can be optionally changed, as long as they allow the optimization of the magnetic volumes of the magnetic layer portions and thus permit a sufficient supply of a magnetic flux generated by the thin film coil to the tip portion of the front end portion.

Although the description is given by referring to the above-mentioned embodiments with regard to the structure of the thin film magnetic head having a one-layer or two-layer coil structure, the number of thin film coil layers of the embodiments can be optionally changed The increase of the number of thin film coil layers allows the increase of the amount of magnetic flux to be generated.

Figures 37A, 37B:
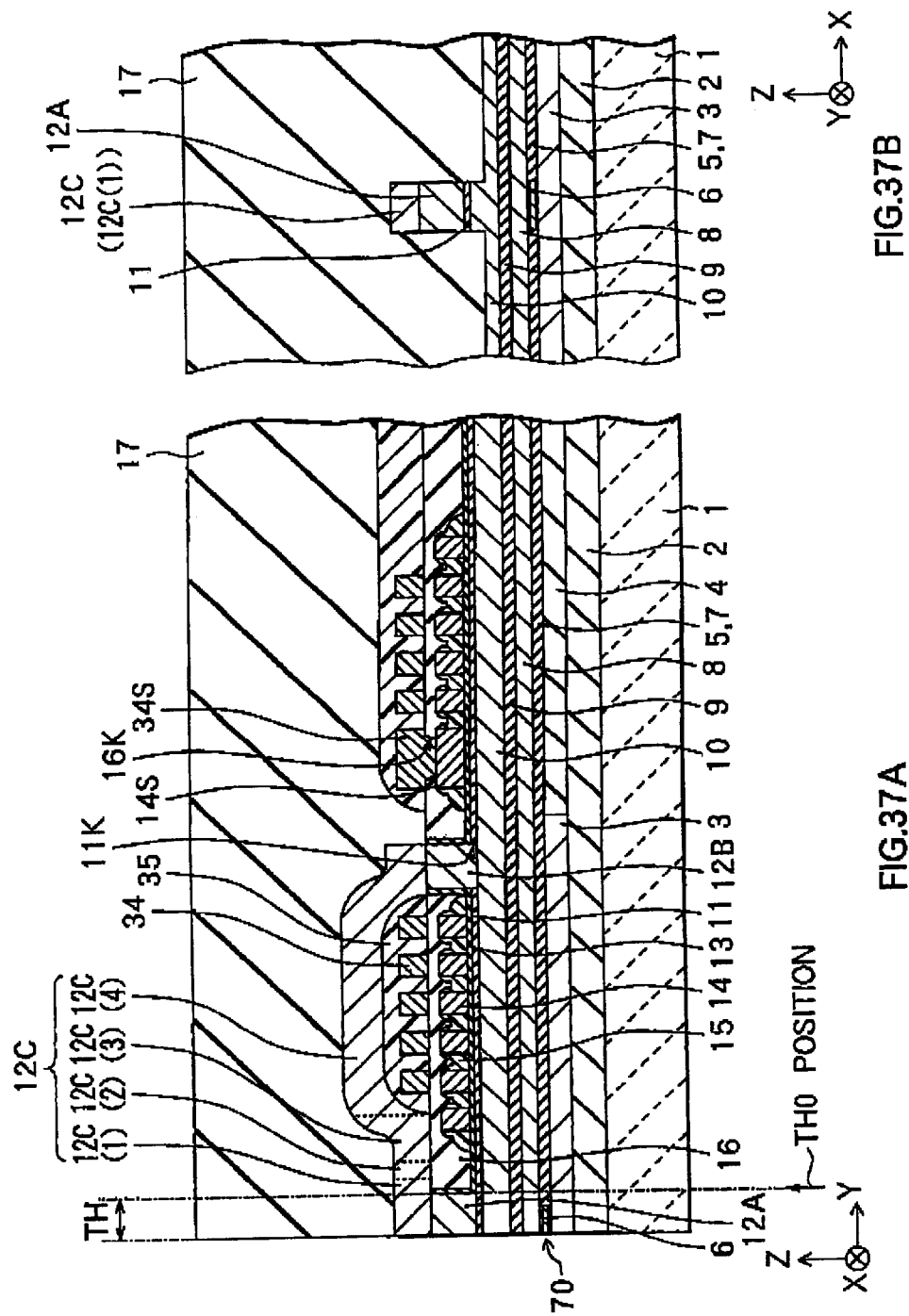
FIGS. 37A and 37B are cross sectional views of another modification of the structure of the thin film magnetic head according to the first embodiment of the invention.

For example, the description is given by referring to the above-mentioned first embodiment with regard to the structure of the thin film magnetic head having the one-layer coil structure (the thin film coil 14), but the invention is not necessarily limited to this embodiment, and the thin film magnetic head may have a two-layer coil structure as shown in FIGS. 37A and 37B. FIGS. 37A and 37B show a modification of the structure of the thin film magnetic head of the above-described first embodiment and correspond to FIGS. 10A and 10B, respectively. The thin film magnetic head includes a second-layer thin film coil 34, as well as the first-layer thin film coil 14. For instance, the thin film coil 34 has about the same structural features as the thin film coil 24 of the above-described second embodiment, and the thin film coil 34 is connected to the thin film coil 14 through the coil connecting portions 14S and 34S in the opening 16K.

The thin film coil 34 and the coil connecting portion 34S are coated with an insulating film 35 made of, for example, a photoresist, and the top magnetic layer 12C is provided so as to coat an apex portion formed of the insulating film 35.

For example, the description is given by referring to the above-mentioned second embodiment with regard to the structure of the thin film magnetic head hang the two-layer coil structure (the thin film coils 14 and 24), but the invention is not necessarily limited to this embodiment, and the thin film magnetic head may have a three-layer coil structure as shown in FIGS. 38A and 38B. FIGS. 38A and 38B show a modification of the structure of the thin film magnetic head of the above-described second embodiment and correspond to FIGS. 27A and 27B, respectively. The thin film magnetic head includes a third-layer thin film coil 44, as well as the first-layer thin film coil 14 and the second-layer thin film coil 24. Coil connecting portions 44SA and 44SB are provided at outer and inner terminal ends of the thin film coil 44, respectively, and the thin film coil 44 and the coil connecting portions 44SA and 44SB are coated with an insulating film 45 made of; for example, a photoresist. The top yoke 22E is provided so as to coat an apex portion formed of the insulating film 45, and a coil connecting wiring 22EH is provided rearward with respect to the top yoke 22E. The thin film coils 24 and 44 are connected through the coil connecting portions 24SB and 44SA in an opening 26K, and the thin film coil 44 and the coil connecting wiring 22EH are connected via an opening 45K. The terminal 14X (not shown in FIGS. 38A and 38B) (see FIG. 21) formed at the outer terminal end of the thin film coil 14 and a rear end portion of the coil connecting wiring 22EH are connected to an external connected circuit so that the connected circuit can be used to feed a current through the thin film coils 14, 24 and 44. The materials of the thin film coil 84 and the insulating film 35, the methods of forming the same, the structural features of the same and the like are substantially the same as those of the thin film coil 24 and the insulating film 25 of the above-described second embodiment.

As described above, according to the thin film magnetic head of the first aspect of the invention or the method of manufacturing a thin film magnetic head of the second aspect of the invention, the second magnetic layer portion extends adjacent to the gap layer from the recording-medium-facing surface to a first position, while maintaining a uniform width for defining a write track width on the recording medium, and the first magnetic layer portion includes a uniform width portion and a widened portion, the uniform portion extending from the recording-medium-facing surface or its neighborhood to a second position located at or near the first position, while maintaining the same width as the uniform width of the second magnetic layer portion the widened portion extending from the second position to a third position, and having a width greater than the width of the uniform width portion. Therefore, the throat height, which is one of factors that determine the performance of the recording head, can be adjusted by changing only the length of the second magnetic layer portion without changing the structure or size of the first magnetic layer portion constituting a main propagation path of a magnetic flux.

According to the thin film magnetic head of the first aspect of the invention, a thickness of an end, close to the recording-medium-facing surface, of the uniform width portion of the first magnetic layer portion is less than a thickness of an end, far from the recording-medium-facing surface, of the uniform width portion. Therefore, a magnetic flux propagating through the uniform width portion converges gradually according to a decrease in the magnetic volume resulting from a decrease in the thickness of the uniform width portion, so that the phenomenon of saturation of magnetic flux is prevented. Accordingly, this so contributes to the superior overwrite characteristics.

According to the thin film magnetic head of the first aspect of the invention, a boundary surface between the second magnetic layer portion and the insulating layer, which is located at the first position, is a plane. Therefore, the thin film magnetic head can uniquely determine the position of the insulating layer close to the recording-medium-facing surface, namely, the throat height zero position which is one of factors that determine the performance of the recording head, as distinct from a thin film magnetic head in which the above-mentioned boundary surface is not flat.

According to the thin film magnetic head of the first aspect of the invention, the thickness of the second magnetic layer portion is larger than a thickness of the first thin film coil, so that the insulator having a sufficient thickness is formed on the first thin film coil. Therefore, the insulator can ensure that the first thin film coil is insulated from a region over the first thin film coil.

According to the thin film magnetic head of the first aspect of the invention or the method of manufacturing a thin film magnetic head of the second aspect of the invention, a recessed area is provided on a surface of the second magnetic layer close to the first magnetic layer, and the first thin film coil is located in the recessed area. Therefore, the position of the surface of the underlayer on which the first thin film coil is to be formed becomes lower than the position of the surface of the underlayer which is not provided with the recessed area. In this case, the insulator having a more sufficient thickness is formed on the first thin film coil. Therefore, the insulator can further ensure that the first thin film coil is insulated from the region over the first thin film coil.

According to the thin film magnetic bead of the first aspect of the invention, a part of the insulating layer is located adjacent to the gap layer in an overlap area in which the first magnetic layer portion overlaps the third magnetic layer portion. Therefore, the part of the insulating layer can prevent the leakage of magnetic flux from an upper region over the part to a lower region under the part, and can thus reduce the propagation loss of magnetic flux in the process of propagation of magnetic flux.

According to the thin film magnetic head of the first aspect of the invention, a magnetic material of the second magnetic layer portion has a saturation magnetic flux density equal to or higher than that of a magnetic material of the first magnetic layer portion. Therefore, the second magnetic layer portion ensures that a magnetic flux smoothly propagates through the second magnetic layer portion, even if variations occur in characteristics of propagation of magnetic flux through the first magnetic layer portion. Accordingly, this also contributes to the superior overwrite characteristics.

According to the thin film magnetic head of the second aspect of the invention, the first magnetic layer includes a track width defining portion extending adjacent to the gap layer away from the recording-medium-facing surface and defining a write track width on the recording medium, and the track width defining portion has a multilayer structure comprising a plurality of magnetic layers. Therefore, the throat height, which is one of factors that determine the performance of the recording head, can be adjusted by changing only the length of the undermost magnetic layer.

According to the method of manufacturing a thin film magnetic head of the first aspect of the invention, the step of forming the first magnetic layer includes: a first step of selectively forming a precursory magnetic layer having a width greater than the uniform width of the second magnetic layer portion and a straight edge extending in a width direction of the second magnetic layer portion at the first position, and functioning as a preparatory layer for the second magnetic layer portion, on the gap layer in a region from a position nearby which the recording-medium-facing surface is to be formed to the first position; a second step of forming a precursory insulating layer covering at least the precursory magnetic layer and a periphery thereof and functioning as a preparatory layer for a part of the insulating layer; a third step of polishing and flattening the precursory insulating layer until at least the precursory magnetic layer is exposed thereby forming the part of the insulating layer; a fourth step of selectively forming the first magnetic layer portion on a polished and flattened surface so that the second position of the uniform width portion is located farther from the recording-medium-facing surface than the first position; and a fifth step of selectively etching the precursory magnetic layer with the uniform width portion of the first magnetic layer portion as a mask, thereby forming the second magnetic layer portion. Therefore, the second magnetic layer portion, which has a minute uniform width and has a straight edge line extending in the width direction without curving, at the end far from the recording-medium-facing surface, can be formed.

According to the method of manufacturing a thin film magnetic head of the first aspect of the invention, the fifth step includes using reactive ion etching to form the second magnetic layer portion, and therefore the second magnetic layer portion can be firmed with higher accuracy in a shorter time.

According to the method of manufacturing a thin film magnetic head of the first aspect of the invention, the first step includes using reactive ion etching to form the precursory magnetic layer, and therefore the precursory magnetic layer whose edge face far from the recording-medium-facing surge is flat and perpendicular to the underlayer can be formed. Moreover, the use of reactive ion etching allows the precursory magnetic layer to be formed with higher accuracy in a shorter time.

According to the method of manufacturing a thin film magnetic bead of the fist aspect of the invention, the precursory magnetic layer is formed by steps of depositing a magnetic material layer on the gap layer with sputtering and selectively etching the magnetic material layer. Therefore, the composition of the material of the precursory magnetic layer can be properly controlled.

According to the method of forming a magnetic layer pattern of the invention, the method includes the steps of selectively forming, on the underlayer, a precursory magnetic layer having a width greater than the uniform width of the magnetic layer pattern and a straight edge extending in a width direction of the magnetic layer pattern and functioning as a preparatory layer for the magnetic layer pattern; homing a nonmagnetic layer covering at least the precursory magnetic layer and a periphery thereof, polishing and flattening the nonmagnetic layer until at least the precursory magnetic layer is exposed; selectively forming, on a polished and flattened surface, an etching mask which crosses the straight edge of the precursory magnetic layer, extends from a surface region of the nonmagnetic layer to a surface region of the precursory magnetic layer and has the same width as the uniform width of the magnetic layer pattern to be formed, and selectively etching the precursory magnetic layer with the etching mask, thereby forming the magnetic layer pattern. Therefore, the magnetic layer pattern, which has a uniform width and has a straight line, extending in the width direction without curving, can be formed.

Obviously many modifications and variations of the present invention are possible in the light of the above teachings. It is therefore to be understood that within the scope of the appended claims the invention may be practiced otherwise than as specifically described.

What is claimed is:

1. A thin film magnetic head including: a first magnetic layer and a second magnetic layer magnetically coupled to each other and having two magnetic poles facing each other with a gap layer in between near and in a recording-medium-facing surface to be faced with a recording medium; a thin film coil provided between the first and second magnetic layers; and an insulating layer for insulating the thin film coil from the first and second magnetic layers, wherein the first magnetic layer includes a laminate of a first magnetic layer portion and a second magnetic layer portion, the first magnetic layer portion being located away from the gap layer and the second magnetic layer portion being located close to the gap layer, the second magnetic layer portion extends adjacent to the gap layer from the recording-medium-facing surface to a first position, while maintaining a uniform width for defining a write track width on the recording medium, and the first magnetic layer portion includes a uniform width portion and a widened portion, the uniform portion extending from the recording-medium-facing surface or its neighborhood to a second position located at or near the first position, while maintaining the same width as the uniform width of the second magnetic layer portion, the widened portion extending from the second position to a third position, and having a width greater than that of the uniform width portion.

2. A thin film magnetic head according to claim 1, wherein an edge, on the recording-medium-facing surface side, of the uniform width portion of the first magnetic layer portion falls on the recording-medium-facing surface.

3. A thin film magnetic head according to claim 1, wherein an edge on the recording-medium-facing surface side of the uniform width portion of the first magnetic layer portion falls on a position away from the recording-medium-facing surface.

4. A thin film magnetic head according to claim 1, wherein a thickness of an end, close to the recording-medium-facing surface, of the uniform width portion of the first magnetic layer portion is less than a thickness of an end, far from the recording-medium-facing surface, of the uniform width portion.

5. A thin film magnetic head according to claim 1, wherein a boundary surface between the first magnetic layer portion and the second magnetic layer portion is a plane.

6. A thin film magnetic head according to claim 1, wherein the insulating layer is in contact with the second magnetic layer portion at the first position.

7. A thin film magnetic head according to claim 6, wherein a boundary surface between the second magnetic layer portion and the insulating layer, which is located at the first position, is a plane.

8. A thin film magnetic head according to claim 7, wherein the boundary surface between the second magnetic layer portion and the insulating layer is perpendicular to a direction in which the second magnetic layer portion extends.

9. A thin film magnetic head according to claim 1, wherein the thin film coil includes a first thin film coil, most of the first thin film coil being included in a space defined by a thickness of the second magnetic layer portion.

10. A thin film magnetic head according to claim 9, wherein the thickness of the second magnetic layer portion is larger than a thickness of the first thin film coil.

11. A thin film magnetic head according to claim 9, wherein a recessed area is provided on a surface of the second magnetic layer close to the first magnetic layer, and the first thin film coil is located in the recessed area.

12. A thin film magnetic head according to claim 9, wherein the thin film coil further includes a second thin film coil electrically connected to the first thin film coil, most of the second thin film coil being included in a space defined by a thickness of the first magnetic layer portion.

13. A thin film magnetic head according to claim 9, wherein the third position is located between the recording-medium-facing surface and the first thin film coil, and the first magnetic layer further includes a third magnetic layer portion partially overlapping and magnetically coupled to the first magnetic layer portion.

14. A thin film magnetic head according to claim 13, wherein a part of the insulating layer is located adjacent to the gap layer in an overlap area in which the first magnetic layer portion overlaps the third magnetic layer portion.

15. A thin film magnetic head according to claim 1, wherein a magnetic material of the second magnetic layer portion has a saturation magnetic flux density equal to or higher than that of a magnetic material of the first magnetic layer portion.

16. A thin film magnetic head according to claim 15, wherein the first magnetic layer portion is made of a magnetic material containing iron, nickel and cobalt, and the second magnetic layer portion is made of a magnetic material containing either a nickel-iron alloy or a cobalt-iron alloy.

17. A thin film magnetic head according to claim 1, wherein at least one of the first and second magnetic layer portions is made of a magnetic material containing iron nitride, a nickel-iron alloy or an amorphous alloy.

18. A thin film magnetic head according to claim 17, wherein the amorphous alloy is a cobalt-iron alloy, a zirconium-cobalt-iron alloy oxide or a zirconium-iron alloy nitride.

19. A thin film magnetic head according to claim 1, wherein at least one of the first and second magnetic layer portions is made of a magnetic material containing iron, nickel and cobalt.

20. A method of manufacturing a thin film magnetic head including a first magnetic layer and a second magnetic layer magnetically coupled to each other and having two magnetic poles facing each other with a gap layer in between near and in a recording-medium-facing surface to be faced with a recording medium, a thin film coil provided between the first and second magnetic layers, and an insulating layer for insulating the thin film coil from the first and second magnetic layers, the first magnetic layer including a laminate of a first magnetic layer portion and a second magnetic layer portion, the first magnetic layer portion being located away from the gap layer and the second magnetic layer portion being located close to the gap layer, the second magnetic layer portion extending adjacent to the gap layer from the recording-medium-facing surface to a first position while maintaining a uniform width for defining a write track width on the recording medium, the first magnetic layer portion including a uniform width portion and a widened portion, the uniform width portion extending from the recording-medium-facing surface or its neighborhood to a second position located at or near the first position, while maintaining the same width as the uniform width of the second magnetic layer portion, and the widened portion extending from the second position to a third position and having a width greater than that of the uniform width portion, wherein the step of forming the first magnetic layer includes:
a first step of selectively forming a precursory magnetic layer having a width greater than the uniform width of the second magnetic layer portion and a straight edge extending in a width direction of the second magnetic layer portion at the first position, and functioning as a preparatory layer for the second magnetic layer portion, on the gap layer in a region from a position nearby which the recording-medium-facing surface is to be formed to the first position;
a second step of forming a precursory insulating layer covering coating at least the precursory magnetic layer and a periphery thereof and functioning as a preparatory layer for a part of the insulating layer;
a third step of polishing and flattening the precursory insulating layer until at least the precursory magnetic layer is exposed, thereby forming the part of the insulating layer;
a fourth step of selectively forming the first magnetic layer portion on a polished and flattened surface so that the second position of the uniform width portion is located farther from the recording-medium-facing surface than the first position; and
a fifth step of selectively etching the precursory magnetic layer with the uniform width portion of the first magnetic layer portion as a mask, thereby forming the second magnetic layer portion.

21. A method of manufacturing a thin film magnetic head according to claim 20, wherein the fifth step includes using reactive ion etching to form the second magnetic layer portion.

22. A method of manufacturing a thin film magnetic head according to claim 20, wherein the first step includes using reactive ion etching to form the precursory magnetic layer.

23. A method of manufacturing a thin film magnetic head according to claim 20, wherein the fifth step includes removing the gap layer and the second magnetic layer to a predetermined depth in a thickness direction, except for a region where the uniform width portion of the first magnetic layer portion is formed.

24. A method of manufacturing a thin film magnetic head according to claim 20, wherein the precursory magnetic layer is formed by steps of depositing a magnetic material layer on the gap layer with sputtering and selectively etching the magnetic material layer, the first magnetic layer portion is formed with plating.

25. A method of manufacturing a thin film magnetic head including:
a first magnetic layer and a second magnetic layer magnetically coupled to each other and having two magnetic poles facing each other with a gap layer in between near and in a recording-medium-facing surface to be faced with a recording medium; a thin film coil provided between the first and second magnetic layers; and an insulating layer for insulating the thin film coil from the first and second magnetic layers, wherein a step of forming the first magnetic layer includes a step of forming a laminate including a first magnetic layer portion and a second magnetic layer portion, the first magnetic layer portion being located away from the gap layer and the second magnetic layer portion being located close to the gap layer, the second magnetic layer portion is formed so as to extend adjacent to the gap layer from the recording-medium-facing surface to a first position with a uniform width for defining a write track width on the recording medium, and the first magnetic layer portion is formed so as to include a uniform width portion and a widened portion, the uniform width portion extending from the recording-medium-facing surface or its neighborhood to a second position located at or near the first position, while maintaining the same width as the uniform width of the second magnetic layer portion, the widened portion extending from the second position to a third position, and having a width greater than that of the uniform width portion.

26. A method of manufacturing a thin film magnetic head according to claim 25, wherein, when the thin film coil includes a first thin film coil, the first thin film coil is formed so that most of the first thin film coil is included in a space defined by a thickness of the second magnetic layer portion.

27. A method of manufacturing a thin film magnetic head according to claim 26, wherein a recessed area is formed on a surface of the second magnetic layer close to the first magnetic layer by etching a part of the second magnetic layer to a predetermined depth, and the first thin film coil is formed in the recessed area.

28. A method of manufacturing a thin film magnetic head according to claim 26, wherein, when the thin film coil further includes a second thin film coil electrically connected to the first thin film coil, the second thin film coil is formed so that most of the second thin film coil is included in a space defined by a thickness of the first magnetic layer portion.

* * * * *